US 7,109,684 B2

(12) United States Patent
Takaoka et al.

(10) Patent No.: US 7,109,684 B2
(45) Date of Patent: *Sep. 19, 2006

(54) SECONDARY CELL CHARGER AND CHARGING METHOD

(75) Inventors: Hiromi Takaoka, Hyogo (JP); Shigetomo Matsui, Hyogo (JP); Yutaka Iuchi, Hyogo (JP); Taneo Nishino, Hyogo (JP); Osamu Nakamura, Osaka (JP)

(73) Assignees: The New Industry Research Organization, Kyogo (JP); Techno Core International Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/481,691

(22) PCT Filed: May 16, 2003

(86) PCT No.: PCT/JP03/06168

§ 371 (c)(1),
(2), (4) Date: Jul. 2, 2004

(87) PCT Pub. No.: WO03/098774

PCT Pub. Date: Nov. 27, 2003

(65) Prior Publication Data

US 2004/0257043 A1 Dec. 23, 2004

(30) Foreign Application Priority Data

| May 17, 2002 | (JP) | ............................. 2002-142598 |
| May 17, 2002 | (JP) | ............................. 2002-142599 |
| May 17, 2002 | (JP) | ............................. 2002-142605 |
| May 17, 2002 | (JP) | ............................. 2002-142606 |
| Jul. 23, 2002 | (JP) | ............................. 2002-213625 |

(51) Int. Cl.
*H02J 7/00* (2006.01)
(52) U.S. Cl. ...................................................... 320/132
(58) Field of Classification Search ................ 320/132, 320/106, 112, 116, 117, 128, 157, 108; 363/97
See application file for complete search history.

(56) References Cited

U.S. PATENT DOCUMENTS

| 4,849,682 A | * | 7/1989 | Bauer et al. ................ 320/106 |
| 5,341,285 A | * | 8/1994 | Wakefield et al. ............ 363/97 |
| 5,594,318 A | * | 1/1997 | Nor et al. ................... 320/108 |
| 5,726,555 A | * | 3/1998 | Takamoro ................... 320/157 |
| 5,926,007 A | * | 7/1999 | Okada ........................ 320/132 |
| 6,064,178 A | * | 5/2000 | Miller ........................ 320/117 |

(Continued)

FOREIGN PATENT DOCUMENTS

JP 63-28235 2/1988

(Continued)

*Primary Examiner*—Pia Tibbits
(74) *Attorney, Agent, or Firm*—Knobbe, Martens, Olson & Bear, LLP

(57) ABSTRACT

An equipment and method for charging a secondary battery are provided to quickly and surely charge a secondary battery (secondary batteries) while preventing the secondary battery (batteries) from overcharging or insufficient charging. Special charging voltage $E_s$ is applied to a secondary battery for a predetermined time, and then the applied voltage is switched to equilibrium voltage $E_{eq}$ for establishing equilibrium cell potential of the secondary battery in its fully charged condition, wherein the special charging value $E_s$ is larger than the equilibrium value $E_{eq}$. Electric current i is detected while application of the equilibrium voltage $E_{eq}$. If the detected electric current i is larger than standard electric current J for finishing charging, the above detection and charging are repeated; otherwise, charge of the secondary battery 1 is halted.

44 Claims, 32 Drawing Sheets

U.S. PATENT DOCUMENTS

| | | | |
|---|---|---|---|
| 6,169,386 B1 * | 1/2001 | Okada | 320/128 |
| 6,204,632 B1 * | 3/2001 | Nierescher et al. | 320/116 |
| 6,326,766 B1 * | 12/2001 | Small | 320/112 |
| 2005/0231163 A1 * | 10/2005 | Takaoka et al. | 320/130 |

FOREIGN PATENT DOCUMENTS

| | | | |
|---|---|---|---|
| JP | 07-031037 | | 1/1995 |
| JP | 08-009563 | | 1/1996 |
| JP | 08-033212 | | 2/1996 |
| JP | 8185898 | * | 7/1996 |
| JP | 08-298728 | | 11/1996 |
| JP | 9117067. | * | 5/1997 |
| JP | 10-172616 | | 6/1998 |
| JP | 2002-199607 | | 7/2002 |

* cited by examiner (a)

(b)

(a)

(b)

SECONDARY CELL CHARGER AND CHARGING METHOD

This application is the U.S. National Phase under 35 U.S.C. §371 of International Application PCT/JP03/06168, filed on May 16, 2003, which claims priority of Japanese Patent Application Nos. 2002-142598, 2002-142599, 2002-142605, 2002-142606, which were filed on May 17, 2002 and 2002-213625, filed on July 23, 2002. The International Application was published under PCT Article 21(2) in a language other than English.

FIELD OF THE ART

The present invention relates to a charging equipment and charging method for a secondary battery, such as a storage battery, a nickel-cadmium battery, a nickel metal hydride battery, a lithium-ion battery, and the like.

BACKGROUND ART

Recently, the range of use of a secondary battery is remarkably increasing. For example, the secondary battery is used as power source of an electrical appliance, e.g., a digital camera, a digital video camera, and a notebook computer; a communication device, e.g., a cellular phone; a power apparatus, e.g., an electric power tool and a vacuum cleaner; or the like. The term "the secondary battery" means a rechargeable battery that can repeat charge and discharge cycles, and during charge, electrical energy is transformed into chemical energy stored in the secondary battery. The stored chemical energy is converted back into electrical energy so as to be used. A nickel-cadmium battery, a nickel metal hydride battery, a lithium ion battery, a NAS battery, etc. are listed as practically used secondary batteries.

Incidentally, the electromotive reaction and the discharge reaction inside the secondary battery include chemical reaction, electric reaction, and complicated energy conversion and energy transfer where the chemical reaction and the electric reaction are mutually concerned. There lies time element among these various reactions. Accordingly, the secondary battery must be charged in consideration of the reactions, and when excessive current flows through the secondary battery in the process of charge, the internal structure of the secondary battery is sometimes damaged by irreversible chemical reactions, including unexpected exothermic reaction, swelling reaction, or the like. Even if the internal structure of the secondary battery is not damaged, it is degraded so that the battery life becomes shorter, and effective cycle of the battery is decreased.

Conventionally, as disclosed in many patent applications, to charge the secondary battery appropriately, a program for changing voltage to the secondary battery with the passage of charging time is programmed into a charge control device of a charging equipment for the secondary battery, so that the voltage controlled according to the program is applied to the secondary battery. The end of charge of a battery is judged and controlled on the basis of detection of the battery voltage as a variable controlled by a charging equipment, where a voltage detection device for detecting voltage of the secondary battery is provided.

For example, the charging equipment for a secondary battery disclosed in the Japanese Patent Laid Open Gazette Hei. 8-9563 comprises a voltage detection circuit for detecting the minus potential difference of charging voltage applied to a battery with constant current, a temperature detection circuit for detecting change of the battery temperature per unit time (temperature differential value) generated in the charged battery with constant current, and a charge control circuit for controlling an on-off switching for charging basing on comparing the minus potential difference detected by the voltage detection circuit and the temperature differential value detected by the temperature detection circuit with their respective preset standard values. If the minus potential difference and the temperature differential value reach their preset standard values thereof respectively, charging of the battery is halted. In this way, there is such well-known conventional charging control device which observes the charged condition of a battery on the basis of detection the battery voltage or the temperature serving as a controlled variable and judges whether charge of the charging battery should be finished or not.

However, when the method for deciding end of charging basing the above-mentioned variable is simply applied in disregard of the charged condition of the secondary battery, various problems arise as follows: The characteristic property of the secondary battery during its charging varies according to variation of an electrode, an electrolyte, a structure, or another element of the charged secondary battery. Even if the secondary batteries are of the same kind or marked with the same type code, the characteristic property thereof varies with the difference of an environmental condition during charge, a use history, an electrochemical itinerancy in the secondary battery, and the like. Therefore, a battery charged according to the conventional control method may be overcharged, where the problem arises that abnormal chemical reactions (irreversible chemical reactions) occurs inside the secondary battery so as to generate heat, that is, electrical energy is transformed into heat energy, whereby the charging efficiency may be decreased, and gas may be generated in the secondary battery so as to increase the internal pressure thereof and cause the leak of liquid from the secondary battery. Therefore, the solid internal structure of the secondary battery required for repeating charge and discharge cycles is so damaged as to decrease effective battery cycles of the secondary battery.

Moreover, it is desirable that the charging time of the secondary battery is as short as possible. However, as mentioned above, the conventional charging control device using the fixed charge control pattern applies the same voltage to any type of secondary. Therefore, if a secondary battery is charged by voltage lower than its rated voltage, it takes quite a long time to fully charge the secondary battery. In addition, the conventional device inconveniently has no means for informing a user how much electricity the secondary battery to be charged stores, and how long it takes to charge the secondary battery.

SUMMARY OF THE INVENTION

It is a general object of the invention to provide a charging equipment for a secondary battery, which can charge a secondary battery or various kinds of secondary batteries rapidly and certainly preventing the secondary battery or batteries from overcharging or insufficient charging, or which is easy to use.

A first aspect of a charging equipment for a secondary battery according to the present invention comprises: a voltage supply means for applying voltage to the secondary battery; a current detection means for detecting electric current flowing through the secondary battery; and a charge control device for controlling charge of the secondary battery. The charge control device includes: a storage means storing equilibrium voltage and special charging voltage corresponding to the secondary battery to be charged; a switching means; and a judging means. The equilibrium voltage is provided for establishing equilibrium cell potential of the secondary battery in a fully charged condition, and the special charging voltage is provided for supplying the secondary battery with charging electric current of peak or almost peak value. The special charging voltage is larger than the equilibrium voltage and does not reach a region of voltage causing irreversible chemical reaction in the secondary battery. The switching means is provided for switching voltage supplied by the voltage supply means between the equilibrium voltage and the special charging voltage. The judging means is provided for judging whether electric current detected by the current detection means during application of the equilibrium voltage is larger than a preset standard electric current for finishing charging or not.

The charge control device controls charge of a secondary battery by first to fourth steps:

the first step of applying the special charging voltage to the secondary battery set in the charging equipment for a predetermined time;

the second step of switching voltage applied to the secondary battery from the special charging voltage to the equilibrium voltage;

the third step of detecting electric current flowing through the secondary battery by the current detection means while applying the equilibrium voltage to the secondary battery for a short time; and the fourth step of returning to the first step and repeating the above steps if the judging means judges that the detected electric current is larger than the standard electric current for finishing charging; otherwise, halting the secondary battery.

The charging equipment of the first aspect can remarkably increase effective battery cycles of a secondary battery because it can charge the secondary battery appropriately without causing excessive damaging chemical reaction (oxidation-reduction reaction) in the secondary battery until the secondary battery is fully charged. Particularly, the charging equipment can reduce charge time because it mainly applies the predetermined charging voltage, which is larger than the equilibrium voltage, so as to supply a secondary battery with pretty large charging current. Furthermore, the charging equipment can accurately bring the secondary battery into the fully charged condition because it periodically applies the equilibrium voltage to the secondary battery to check the charged condition of the secondary battery.

A second aspect of a charging equipment for a secondary battery according to the present invention is similar with that of the first aspect except that the storage means of the charge control device previously stores the equilibrium voltages and the special charging voltages corresponding to various kinds of secondary batteries. When data of a kind of secondary battery to be charged is inputted to the charge control device, the equilibrium voltage and special charging voltage in correspondence to the kind of secondary battery to be charged are selected from a table of the storage means so as to charge the kind of secondary battery basing on the selected equilibrium voltage and special charging voltage.

By the charging equipment of the second aspect, a user can manually select the suitable equilibrium voltage and special charging voltage in correspondence to the kind of secondary battery to be charged from a table of the storage means, thereby ensuring appropriate charge of electricity to the kind of secondary battery without causing excessive chemical reaction (oxidation-reduction reaction) in the secondary battery until the secondary battery is fully charged. As a result, the charging equipment does not give any damage to the internal structure of the secondary battery, so that it can further increase effective battery cycles of the secondary battery. Particularly, the charging equipment can reduce charge time because it supplies the secondary battery with pretty large charging current by mainly applying the special charging voltage larger than the equilibrium voltage. Furthermore, the charging equipment can accurately bring the secondary battery into the fully charged condition because it periodically applies the equilibrium voltage to the secondary battery to check the charging state of the secondary battery.

A third aspect of a charging equipment for a secondary battery according to the present invention is almost the same apparatus as that of the first aspect, but the storage means of the charge control device of the third aspect previously stores the n (n is a natural number larger than 1) equilibrium voltages and the n special charging voltages corresponding to n kinds of secondary batteries. The charge control device controls charge of a secondary battery by first to eighth steps:

the first step of initializing a counter variable k ($k=1,2,\ldots,n$) to 1;

the second step of applying the kth smallest voltage of the n special charging voltages to the secondary battery set in the charging equipment for a predetermined time;

the third step to jumping to the sixth step if k is equal to n;

the fourth step of detecting voltage applied to the secondary battery by the voltage detection means while applying the kth smallest special charging voltage to the secondary battery for the predetermined time;

the fifth step of incrementing k by 1 and returning to the second step if the voltage judging means judges that the detected voltage is larger than the kth smallest special charging voltage; otherwise, passing to the sixth step;

the sixth step of switching voltage applied to the secondary battery to the kth smallest voltage of the n equilibrium voltages;

the seventh step of detecting electric current flowing through the secondary battery by the current detection means while applying the kth smallest equilibrium voltage to the secondary battery for a short time; and the eighth step of returning to the second step and repeating the above steps if the current judging means judges that the detected electric current is larger than the standard electric current for finishing charging; otherwise, halting charge of the secondary battery The charging equipment of the third aspect gives the same effect as that of the first aspect to each kind of the secondary batteries to be charged. Additionally, the charging equipment of the third aspect automatically identifies the kind of secondary battery in the process of charge and it gives appropriate charge of electricity to the kind of secondary battery basing on the selected equilibrium voltage and special charging voltage without causing excessive damaging chemical reaction (oxidation-reduction reaction) in the secondary battery until the kind of secondary battery is fully charged.

A fourth aspect of a charging equipment for a secondary battery according to the present invention is almost the same apparatus as that of the third aspect, but the charge control device of the charging equipment of the fourth aspect further includes a voltage difference judging means for judging whether a difference of voltage detected by the voltage detection means during application of the special charging voltage between a present value and a past value is within a preset range or not, and it controls charge of a secondary battery by first to eighth steps:

the first step of initializing a counter variable k (k=1,2, . . . ,n) to 1;

the second step of applying the kth smallest voltage of the n special charging voltages to the secondary battery set in the charging equipment for a predetermined time;

the third step of jumping to the sixth step if k is equal to n; the fourth step of detecting voltage applied to the secondary battery by the voltage detection means while applying the kth smallest special charging voltage to the secondary battery for the predetermined time;

the fifth step of passing to the sixth step if the voltage detection is the first time or the voltage difference judging means judges that the detected voltage difference is within the range; otherwise, incrementing k by 1 and returning to the second step;

the sixth step of switching voltage applied to the secondary battery from the kth smallest special charging voltage to the kth smallest voltage of the n equilibrium voltages;

the seventh step of detecting electric current flowing through the secondary battery by the current detection means while applying the kth equilibrium voltage to the secondary battery for a short time; and the eighth step of returning to the second step and repeating the above steps if the current judging means judges that the detected electric current is larger than the standard value of electric current for finishing charging; otherwise, halting charge of the secondary battery.

The charging equipment of the fourth aspect has the same effect as that of the first aspect. Additionally, the charging equipment of the fourth aspect automatically identifies the kind of secondary battery in the process of charge and it gives appropriate charge of electricity to the kind of secondary battery basing on the selected equilibrium voltage and special charging voltage without causing excessive damaging chemical reaction (oxidation-reduction reaction) in the secondary battery until the kind of secondary battery is fully charged.

A fifth aspect of a charging equipment for a secondary battery according to the present invention comprises: a voltage supply means for applying voltage to the secondary battery; a voltage detection means for detecting open-circuit voltage of the secondary battery; and a charge control device for controlling charge of the secondary battery. The charge control device includes: a storage means storing special charging voltage for supplying the secondary battery with charging electric current of peak or almost peak value, wherein the special charging voltage is larger than equilibrium voltage for establishing equilibrium cell potential of the secondary battery in a fully charged condition and does not reach a region of voltage causing irreversible chemical reaction in the secondary battery; and a voltage difference judging means for judging whether a voltage difference between the charging voltage and the open-circuit voltage of the secondary battery is larger than a preset standard value or not. The charge control device controls charge of a secondary battery by first to third steps:

the first step of applying the special charging voltage to the secondary battery set in the charging equipment for a predetermined time, and then shutting off the charging voltage from the secondary battery;

the second step of detecting the open-circuit voltage of the secondary battery by the voltage detection means, and computing the voltage difference between the special charging voltage and the open-circuit voltage of the secondary battery; and the third step of returning to the first step and repeating the above steps if the voltage difference judging means judges that the computed voltage difference is larger than the standard value; otherwise, halting charge of the secondary battery.

The charging equipment of the fifth aspect remarkably increases effective battery cycles of the secondary battery because it can charge the secondary battery appropriately without causing excessive damaging chemical reaction (oxidation-reduction reaction) in the secondary battery until the secondary battery is fully charged. Additionally, by computing the voltage difference between the special charging voltage, which is larger than the equilibrium voltage, and the open-circuit voltage of the secondary battery, the charging equipment can further accurately judge whether the secondary battery reaches the fully charged condition or not. Furthermore, the charging equipment can reduce charge time because it mainly applies the special charging voltage, which is larger than the equilibrium voltage, so as to supply the secondary battery with pretty large charging current.

A sixth aspect of a charging equipment for a secondary battery according to the present invention is almost the same apparatus as that of the fifth aspect, but the charge control device of the charging equipment of the sixth aspect has a judging means for judging whether the open-circuit voltage of the secondary battery detected by the voltage detection means is larger than the equilibrium voltage as a standard value or not, instead of the above-mentioned voltage difference judging means. The charge control device of the sixth aspect controls charge of a secondary battery by first to third steps:

the first step of applying the special charging voltage to the secondary battery set in the charging equipment for a predetermined time, and then shutting off the charging voltage from the secondary battery;

the second step of detecting the open-circuit voltage of the secondary battery by the voltage detection means, and computing the voltage difference between the special charging voltage and the open-circuit voltage of the secondary battery; and the third step of returning to the first step and repeating the above steps if the judging means judges that the detected open-circuit voltage is smaller than the equilibrium voltage as the standard voltage; otherwise, halting charge of the secondary battery.

The charging equipment of the sixth aspect can remarkably increase effective battery cycles of the secondary battery because it can charge the secondary battery appropriately without causing excessive damaging chemical reaction (oxidation-reduction reaction) in the secondary battery until the secondary battery is fully charged. Additionally, the charging equipment can reduce charge time because it mainly applies the special charging voltage larger than the equilibrium voltage so as to supply the secondary battery with pretty large charging current.

A seventh aspect of a charging equipment for a secondary battery according to the present invention comprises: a voltage supply means for applying predetermined voltage to the secondary battery; a current detection means for detecting electric current flowing through the secondary battery while applying the predetermined voltage to the secondary battery; and a charge time predicting means for estimating a time required for fully charging the secondary battery basing on the detected electric current.

By the easy method of detecting electric current, the charging equipment of the seventh aspect can decide the time required for fully charging the secondary battery, thereby being useful.

The time required for fully charging the secondary battery may be defined as a time for the electric current detected by the current detection means to reach standard electric current for finishing charging. The charging equipment of this type may stop charging the secondary battery when the detected electric current is not larger than the standard electric current for finishing charging.

The charging equipment can remarkably increase effective battery cycles of the secondary battery because it periodically checks the charging state of the secondary battery so as to charge the secondary battery appropriately without causing excessive damaging chemical reaction (oxidation-reduction reaction) in the secondary battery until the secondary battery is fully charged.

Alternatively, the charging equipment may stop charging the secondary battery simply after the passage of the time required to fully charge the secondary.

An eighth aspect of a charging equipment for a secondary battery according to the present invention comprises: a voltage supply means for applying predetermined voltage to the secondary battery; a current detection means for detecting electric current flowing through the secondary battery when applying the predetermined voltage to the secondary battery; and a charging rate computing means for computing the charging rate of the secondary battery at the moment when the current detection means detects the electric current.

The charging equipment of the eighth aspect is useful because it decides how much the secondary battery is charged at present by the easy method of detecting a value of electric current.

In each of the charging equipments of the seventh and eighth aspects, the voltage supply means applies charging voltage, which is larger than the above-mentioned predetermined voltage, to the secondary battery for a determined time, and then the switching means switches applied voltage from the charging voltage to the predetermined voltage, and the current detection means detects electric current flowing through the secondary battery for the moment during application of the predetermined voltage to the secondary battery.

Consequently, each of the charging equipments can reduce charge time because it mainly applies the charging voltage which is larger than the predetermined voltage so as to supply the secondary battery with pretty large charging current.

A ninth aspect of a charging equipment for a secondary battery according to the present invention comprises: a voltage supply means for applying voltage to the secondary battery; a current detection means for detecting electric current flowing through the secondary battery; and a charge control device for controlling charge of the secondary battery. The charge control device includes: a storage means storing equilibrium voltage and special charging voltage corresponding to the secondary battery to be charged; a switching means; and a charge time predicting means. The equilibrium voltage is provided for establishing equilibrium cell potential of the secondary battery in a fully charged condition. The special charging voltage is provided for supplying the secondary battery with charging electric current of peak or almost peak value. The special charging voltage is larger than the equilibrium voltage and does not reach a region of voltage causing irreversible chemical reaction in the secondary battery. The switching means is provided for switching voltage supplied by the voltage supply means between the equilibrium voltage and the special charging voltage. The charge time predicting means is provided for estimating a time required for fully charging the secondary battery basing on the detected electric current. The charge control device controls charge of a secondary battery by first to sixth steps:

the first step of applying the special charging voltage to the secondary battery set in the charging equipment for a predetermined time;

the second step of switching voltage applied to the secondary battery from the special charging voltage to the equilibrium voltage;

the third step of detecting electric current flowing through the secondary battery by the current detection means while applying the equilibrium voltage to the secondary battery for a short time;

the fourth step of predicting a time required for fully charging the secondary battery by the charge time predicting means basing on the detected electric current;

the fifth step of switching voltage applied to the secondary battery from the equilibrium voltage to the special charging voltage; and the sixth step of halting charge of the secondary battery after the lapse of the time required to fully charge the secondary.

The charging equipment of the ninth aspect can reduce charge time because it mainly applies the special charging voltage, which is larger than the equilibrium voltage, so as to supply the secondary battery with pretty large charging current. The charging equipment is available because it facilitates easy check of the fully charged condition of any kind of secondary battery because electric current detected by the current detection means is substantially zero if a secondary battery detected by the current detection means while being supplied with the equilibrium voltage reaches its fully charged condition, and because it can precisely predict the time required for fully charging the secondary battery. Since the charging equipment stops changing the secondary battery just after the passage of the predicted time so as to helps cycle life of the secondary battery become far and away longer, the secondary battery is appropriately charged without excessive damaging chemical reaction (oxidation-reduction reaction) therein until its fully charged condition, thereby increasing its effective battery cycles.

A tenth aspect of a charging equipment for a secondary battery according to the present invention comprises: a voltage supply means for applying voltage to the secondary battery; a current detection means for detecting electric current flowing through the secondary battery; and a charge control device for controlling charge of the secondary battery. The charge control device includes: a storage means storing equilibrium voltage and special charging voltage; a switching means; a charging rate computing means; and a judging means. The equilibrium voltage is provided for establishing equilibrium cell potential of the secondary battery balanced in a fully charged condition. The special charging voltage is provided for supplying the secondary battery with charging electric current of peak or almost peak value. The special charging voltage is larger than the equilibrium voltage and does not reach a region of voltage causing irreversible chemical reaction in the secondary battery. The switching means is provided for switching voltage supplied by the voltage supply means between the equilibrium voltage and the special charging voltage. The charging rate computing means is provided for computing a charging rate of the secondary battery at the moment when the current detection means detects electric current. The judging means is provided for judging whether the charging rate computed by the charging rate computing means is larger than a preset standard value or not. The charge control device controls charge of a secondary battery by first to fifth steps:

the first step of applying the special charging voltage to the secondary battery set in the charging equipment for a predetermined time;

the second step of switching voltage applied to the secondary battery from the special charging voltage to the equilibrium voltage;

the third step of detecting electric current flowing through the secondary battery by the current detection means while applying the equilibrium voltage to the secondary battery for a short time;

the fourth step of computing the charging rate of the secondary battery by the charging rate computing means at the moment when the electric current is detected; and the fifth step of returning to the first step and repeating the above steps if the judging means judges that the computed charging rate is not larger than the standard value; otherwise, halting charge of the secondary battery.

The charging equipment of the tenth aspect can reduce charge time because it mainly applies the special charging voltage, which is larger than the equilibrium voltage, so as to supply the secondary battery with pretty large charging current. The charging equipment is available because it facilitates easy check of the fully charged condition of any kind of secondary battery because electric current detected by the current detection means is substantially zero if a secondary battery detected by the current detection means while being supplied with the equilibrium voltage reaches its fully charged condition, and because it can precisely predict the present charging rate of the secondary battery. Since the charging equipment stops changing the secondary battery just after the passage of the predicted time so as to helps cycle life of the secondary battery become far and away longer, the secondary battery is appropriately charged without excessive damaging chemical reaction (oxidation-reduction reaction) therein until its fully charged condition, thereby increasing its effective battery cycles.

An eleventh aspect of a charging equipment for a secondary battery according to the present invention comprises: a circuit for connecting a secondary battery and a capacitor to a power supply in parallel; and a switching means for making/breaking a closed loop circuit for connecting the secondary battery to the capacitor. The charging equipment brakes the closed loop circuit for a predetermined time and applies voltage to the capacitor from a power source so as to store up electricity in the capacitor, and then, the charging equipment makes the closed loop circuit so as to transmit the electricity stored in the capacitor to the secondary battery.

The charging equipment of the eleventh aspect facilitates for easily measuring how much electricity is charged into the secondary battery. Additionally, by using the capacitor as a charging medium, the charging equipment can charge much electricity, i.e., large electric current to the secondary battery for a short time, thereby reducing charge time. Moreover the charging equipment can economically charge without an expensive high-current circuit, and control its charging very easily, thereby improving its reliability.

A twelfth aspect of a charging equipment for a secondary battery according to the present invention comprises: a checking power supply for applying special charging voltage to the secondary battery; a current detection means for detecting electric current flowing to the secondary battery; and a current judging means for judging whether electric current detected by the current detection means during application of the special charging voltage is larger than a preset standard electric current for finishing charging. While the closed loop circuit is broken, the check power source applies the secondary battery with the special charging voltage, and electric current flowing to the secondary battery from the check power source is detected and compared with the standard electric current for finishing charging. If the detected electric current is larger than the standard electric current for finishing charging, said storage of electricity in the capacitor and transmission of electricity to the secondary battery are repeated; otherwise, charge of the secondary battery is halted.

The charging equipment of the twelfth aspect can increase effective battery cycles of the secondary battery because it charges the secondary battery appropriately without causing excessive damaging chemical reaction (oxidation-reduction reaction) in the secondary battery until the secondary battery is fully charged. The charging equipment can further reduce charge time because it makes the charged condition of the secondary battery observable while the capacitor stores electric charge.

Preferably, equilibrium voltage for equilibrium cell potential of the secondary battery in a fully charged condition serves as the special charging voltage. Accordingly, the charging equipment can easily and accurately decide whether a secondary battery is fully charged or not because any secondary battery can be decided to be fully charged when the detected electric current is not larger than zero.

A thirteenth aspect of a charging equipment for a secondary battery according to the present invention further comprises: a voltage detection means for detecting open-circuit voltage of the secondary battery; and a voltage judging means for judging whether the open-circuit voltage of the secondary battery detected by the voltage detection means is larger than equilibrium voltage for equilibrium cell potential of the secondary battery in a fully charged condition. While the closed loop circuit is broken, the open-circuit voltage of the secondary battery is detected and compared with the equilibrium voltage. If the open-circuit voltage is smaller than the equilibrium voltage, said storage and transmission are repeated; otherwise, charge of the secondary battery is halted.

The charging equipment of the thirteenth aspect can increase effective battery cycles of the secondary battery because it charges the secondary battery appropriately without causing excessive damaging chemical reaction (oxidation-reduction reaction) in the secondary battery until the secondary battery is fully charged. The charging equipment can further reduce charge time because it makes the charged condition of the secondary battery observable while the capacitor stores electric charge.

A fourteenth aspect of a charging equipment for a plurality of secondary batteries according to the present invention comprises: a charging voltage control means for applying charging voltage to a secondary battery; a control means for monitoring a charged condition of the secondary battery; and a battery switching means for switching a secondary battery selected among the plurality of secondary batteries to be charged basing on a signal for finishing charging issued from the control means.

The charging equipment of the fourteenth aspect can surely charge each secondary battery by monitoring the charged condition of the secondary battery, thereby causing neither insufficiently charged secondary battery nor overcharged secondary battery, which may be damaged by its inner excessive chemical reaction (oxidation-reduction reaction). Consequently, effective battery cycles of each secondary battery can be remarkably increased.

The charging equipment of the fourteenth aspect may further comprise: a checking voltage control means for applying equilibrium voltage to a secondary battery while monitoring a charged condition of the secondary battery, the equilibrium voltage for equilibrium cell potential of the secondary battery in a fully charged condition; a voltage switching means for switching voltage between the charging voltage and the equilibrium voltage, that is, checking voltage; and a current detection means for detecting electric current flowing through the secondary battery to which the check voltage is applied. The control means monitors a charged condition of the secondary battery basing on the signal from the current detection means.

When charging each secondary battery, this charging equipment can grasp the charged condition of the secondary battery by the easy method of detecting electric current while periodically applying the checking voltage thereto. Therefore, the charging equipment can charge each secondary battery appropriately without causing excessive chemical reaction (oxidation-reduction reaction) therein until the secondary battery is fully charged, whereby no insufficiently charged secondary battery occurs.

Alternatively, the charging equipment of the fourteenth aspect may further comprise: a voltage switching means for switching on/off application of charging voltage to the secondary battery; and a voltage detection means for detecting open-circuit voltage of a secondary battery while switching off application of charging voltage thereto. The above-mentioned control means monitors how much the secondary battery is charged basing on the signal from the voltage detection means.

When charging each secondary battery, the charging equipment can grasp the state of charge of each of the secondary batteries by the easy method of detecting open-circuit voltage while periodically stopping applying charging voltage. Therefore, the charging equipment can charge each secondary battery appropriately without causing excessive chemical reaction (oxidation-reduction reaction) therein until the secondary battery is fully charged, whereby no insufficiently charged secondary battery remains.

Further alternatively, in the charging equipment of the fourteenth aspect, the charging voltage may be set to a special charging voltage for supplying the secondary battery with charging electric current of peak or almost peak value, wherein the special charging voltage is larger than equilibrium voltage for equilibrium cell potential of the secondary battery in a fully charged condition and does not reach a region of voltage causing irreversible chemical reaction in the secondary battery.

Consequently, the charging equipment mainly applies the special charging voltage, which is larger than the equilibrium voltage, to the secondary battery so as to supply the secondary battery with pretty large charging current. Therefore, even by using the method for charging the plurality of secondary batteries one by one, the time for charging each secondary battery is reduced, thereby reducing the time for charging all of the secondary batteries.

A fifteenth aspect of a charging equipment for a plurality of secondary batteries according to the present invention comprises a battery switching means for switching a secondary battery to be charged from the last charged secondary battery to an uncharged secondary battery, so as to charge the secondary batteries one by one.

The charging equipment of the fifteenth aspect can be easily controlled so as to surely charge all of the secondary batteries because it charges the secondary batteries one by one.

Preferably, the charging equipments of each of the foregoing aspects may further comprise an informational means for giving information of a time required to fully charge the secondary battery, charging rate of the secondary battery, or a charged condition of the secondary battery for deciding whether charge of the secondary battery is finished or not, thereby being more available.

A sixteenth aspect of a charging equipment for a plurality of secondary batteries according to the present invention comprises a voltage supply means for applying voltage to a secondary battery, wherein a group of the plurality of secondary batteries are connected to the voltage supply means in series. The charging equipment charges the secondary batteries of the group one by one, switching from the last charged secondary battery to the next uncharged secondary battery.

The charging equipment of the sixteenth aspect can surely charge each of the secondary batteries of the group so as to prevent them from being overcharged or insufficiently charged even if the secondary batteries have different characteristics. Therefore, each of the secondary batteries charged by the charging equipment can provide its full capacity. Additionally, the charging equipment can increase effective battery cycles of the secondary batteries (or a packed power supply consisting of the plurality of the secondary batteries) and stably drive an apparatus to which the packed power supply gives electric power.

The concept of the sixteenth aspect is applicable for each of the forgoing charging equipments of the type which switches applied voltage between high voltage for high electric current and low voltage. For example, the charging equipment of the first aspect improved according to the sixteenth aspect can charge each of a plurality of secondary batteries appropriately without overcharging and damaging its inner structure, thereby contributing for increasing effective battery cycles of each secondary battery and cost-saving. Moreover, the charging equipment can reduce the time for charging each secondary battery by supplying the secondary battery with pretty large charging current, thereby remarkably reduce total charge time for all of the secondary batteries in the packed power supply. The packed power supply charged by the charging equipment can reduce dead time when any apparatus to which the packed power supply applies electric power cannot work because of shortage of battery, thereby enhancing availability of the apparatus.

Additionally, the charging equipment of the sixteenth aspect may have a plurality of the above-said groups connected to the voltage supply means in parallel, wherein all secondary batteries of one group are completely charged, and then each secondary battery of another next group is charged.

This charging equipment can surely all the secondary batteries of the plurality of groups connected to the voltage supply means in parallel so as to provide a packed power supply capable of supplying large output voltage.

Preferably, the charging equipment of the sixteenth aspect can simultaneously charge the plurality of groups of secondary batteries.

This charging equipment can simultaneously start charging the groups of secondary batteries and further reduce total charge time for charging all the secondary batteries. Consequently, the packed power supply charged by the charging equipment can reduce dead time when any apparatus to which the packed power supply applies electric power cannot work because of shortage of battery, thereby enhancing availability of the apparatus.

The charging equipment of the sixteenth aspect may be applied for using the plurality of groups of secondary batteries in either series or parallel.

Accordingly, the groups of secondary batteries may be selectively used in either series or parallel corresponding to load. The charging equipment prevents the secondary batteries in each of the groups from being overcharged and insufficiently charged, thereby ensuring that all the secondary batteries provide their full capacities and prolong their lives.

Of the above-mentioned charging equipments of various aspects, there are some charging equipments of a type which stores equilibrium voltage and special charging voltage for charging a secondary battery and switching voltage between the equilibrium voltage and the special charging voltage, wherein the equilibrium voltage is provided for establishing equilibrium cell voltage of the secondary battery in a fully charged condition, wherein the special charging voltage is provided for supplying the secondary battery with charging electric current of peak or almost peak value, and wherein the special charging voltage is larger than the equilibrium voltage and does not reach a region causing irreversible chemical reaction in the secondary battery. This type of charging equipment may be provided with a short-circuit means for short-circuiting the secondary battery between its terminals after applying the special charging voltage to a secondary battery and before switching voltage to the equilibrium voltage.

The short-circuit means clears the electrode interface of a secondary battery of electric charge, so that the charging equipment may switch charging voltage to the equilibrium voltage smoothly and stably supply charging electric current after the switching so as to accurately detect a value of electric current, thereby charging the secondary battery appropriately.

A seventeenth aspect of a charging equipment for a secondary battery according to the present invention comprises: a voltage supply means for applying voltage to the secondary battery; a voltage detection means for detecting voltage of the secondary battery; and a judging means for judging whether voltage applied to the secondary battery detected by the voltage detection means is larger than recharging voltage. The recharging voltage is smaller than equilibrium voltage for equilibrium cell voltage of the secondary battery in a fully charged condition. If the judging means judges that the detected voltage is not larger than the recharging voltage, the charging equipment recharges the secondary battery by supplying the secondary battery with the charging voltage from the voltage supply means.

A secondary battery charged up by the charging equipment of the seventeenth aspect necessarily has effective voltage equal to or higher than the recharging voltage just when it is picked out from the charging equipment, thereby being available.

In the process of recharging, the charging equipment charges a secondary battery appropriately without causing excessive damaging chemical reaction (oxidation-reduction reaction) in the secondary battery until the secondary battery is fully charged, thereby remarkably increasing effective battery cycles of the secondary battery and reducing the time for the secondary battery to be fully charged.

An eighteenth aspect of a charging equipment for a secondary battery according to the present invention repeats a charging operation cycle including check of a charged condition of a secondary battery and application of special charging voltage to the secondary battery for a predetermined time, wherein a relaxation time is established between the charging operation cycles, and halts charge of the secondary battery when it is judged at the check that the secondary battery is fully charged.

By establishing the relaxation time between the charging operation cycles, this charging equipment can accurately check the charged condition of the secondary battery in the next charging operation cycle so as to decide whether the secondary battery is fully charged or not, thereby being improved in reliability.

A nineteenth aspect of a charging equipment for charging a plurality of secondary batteries according to the present invention repeats a charging turn for charging the plurality of secondary batteries, and halts charge of each secondary battery when it is judged at the check that the secondary battery is fully charged. The charging turn serves as a series of the charging operation cycles each of which is performed for each uncharged secondary battery. The charging operation cycles are performed one by one for the respective secondary batteries. The relaxation time is established between the final charging operation cycle in one charging turn and the first charging operation cycle in the next charging turn.

The charging equipment of the nineteenth aspect stops charging for the relaxation time between the charging operation cycle in one charging turn and the first charging operation cycle in the next charging turn, so as to bring a surface of an electrode of the secondary battery into a stable condition, thereby accurately checking the charged condition of the secondary battery in the nest charging turn so as to decide whether the secondary battery is fully charged or not.

Complementarily speaking, in the process of charging a secondary battery, electrode reaction occurs on an electrode surface touching electrolyte. In this electrode reaction are simultaneously performed movement of reactant to the electrode surface from the electrolyte, movement of electron between the reactant and the electrode, and movement of product into the electrolyte from the electrode surface. It takes quite a long time for these movements so that the secondary battery, if the charged state thereof is checked immediately after pausing charge of the secondary battery, may be misread as if it reached the fully charged condition because of ion and the like being electrophoresed around the electrode surface. The relaxation time is advantageous for preventing such misreading. The charging equipment of the nineteenth aspect rationally and effectively establishes the relaxation time as a partial process in a cycle of charging each of secondary batteries.

Each of the above-mentioned charging equipments of various aspects may further comprise a cooling means for cooling an exothermic section in it. This cooling means prevents the exothermic section such as an exothermic element from generating heat, which is unexpectedly transmitted to the secondary battery so as to promote excessive chemical reaction (oxidation-reduction reaction) in the secondary battery or to mislead the heat of the secondary battery to be regarded as heat generated by the secondary battery itself. Consequently, the secondary battery is charged appropriately without damage of its inner structure until it is fully charged, thereby remarkably increasing its effective battery cycles.

A twentieth aspect of a charging equipment for a secondary battery according to the present invention comprises a take-off means for taking off the secondary battery from a seat of the charging equipment by one-touch operation, thereby being convenient for a user to take out the secondary battery from the seat of the charging equipment easily.

In the charging equipment of the twentieth aspect, the take-off means may preferably comprise: an operation member to be pushed down by a user; a boost member for pushing up the secondary battery set on the seat; a pivot shaft for rotatably supporting the boost member; and an energization means attached to the shaft, wherein the energization means energizes the boost member opposite to the direction of the boost member being pushed up, and wherein, by operating the operation member, a part of the boost member arises or sinks above and below the seat.

Therefore, a user can easily pick up the charged secondary battery from the seat of the charging equipment by one-touchingly operating the operation member for raising or sinking a part of the boost member.

Further, in the charging equipment for a secondary battery of the twentieth aspect, the seat may be preferably recessed at one side in its longitudinal direction so as to serve as the take-off means.

By using this convenient charging equipment, a user can easily take out the secondary battery set on the seat of the charging equipment by one-touch operation. When a user pushes down one side part of the secondary battery in its longitudinal direction, the other side part of the secondary battery arises so as to separate its both terminals from the seat.

It is another general object of the invention to provide a charging method for charging a secondary battery or a plurality of secondary batteries rapidly and certainly preventing the secondary battery or batteries from overcharging or insufficient charging.

A first aspect of a charging method for a secondary battery according to the present invention comprises the steps of:

(1) previously storing equilibrium voltage and special charging voltage for charging the secondary battery, the equilibrium voltage equaling electromotive force of the secondary battery in a fully charged condition, and the special charging voltage supplying the secondary battery with charging electric current of peak or almost peak value, wherein the special charging voltage is larger than the equilibrium voltage and does not reach a region of voltage causing irreversible chemical reaction in the secondary battery;

(2) applying the special charging voltage to the secondary battery for a determined time;

(3) switching voltage applied to the secondary battery from the special charging voltage to the equilibrium voltage;

(4) detecting electric current flowing through the secondary battery while applying the equilibrium voltage to the secondary battery for a short time;

(5) comparing the detected value of electric current with a standard value of electric current for finishing charging; and (6) returning to the step (2) and iterating the above steps when the detected electric current is larger than standard electric current; otherwise halting charge of the secondary battery.

By the charging method of the first aspect, a secondary battery can be charged appropriately without excessive damaging chemical reaction (oxidation-reduction reaction) therein until it is fully charged, thereby remarkably increasing its effective battery cycles. Particularly, by the charging method, the special charging voltage, which is larger than the equilibrium voltage, is mainly applied to the secondary battery so as to supply it with pretty large charging current, thereby reducing charging time.

A second aspect of a charging method for a secondary battery according to the present invention comprises:

previously storing n (n is a natural number more than 1) equilibrium voltages and n special charging voltages for charging n different kinds of secondary batteries, each of the equilibrium voltage equaling electromotive force of the secondary battery in a fully charged condition, and each of the special charging voltages supplying the secondary battery with charging electric current of peak or almost peak value, wherein each of the special charging voltages is larger than the corresponding equilibrium voltage and does not reach a region of voltage causing irreversible chemical reaction in the corresponding secondary battery; and charging a secondary battery by first to eighth steps, the first step of initializing a counter variable k (k=1,2, . . . ,n) to 1;

the second step of applying the kth smallest special charging voltage of the n special charging voltages to the secondary battery for a predetermined time;

the third step of jumping to the sixth step if k is equal to n;

the fourth step of detecting voltage applied to the secondary battery while applying the kth smallest special charging voltage to the secondary battery for the predetermined time;

the fifth step of incrementing k by 1 and returning to the second step if the detected voltage is larger than the kth smallest special charging voltage; otherwise passing to the sixth step;

the sixth step of switching voltage applied to the secondary battery from the kth smallest special charging voltage to the kth smallest equilibrium voltage of the n equilibrium voltages; and the seventh step of detecting electric current flowing through the secondary battery while applying the kth smallest equilibrium voltage to the secondary battery for a short time; and the eighth step of returning to the second step and iterating the above steps if the detected electric current is larger than standard electric current for finishing charging; otherwise, halting charge of the secondary battery.

The charging method of the second aspect has the same effect as that of the first aspect. Additionally the charging method of the second aspect automatically identifies the kind of secondary battery in the process of charging so as to rapidly and appropriately charge electricity to the kind of secondary battery basing on the selected equilibrium voltage and special charging voltage without overcharging and causing excessive chemical reaction (oxidation-reduction reaction) in the secondary battery until the kind of secondary battery is fully charged.

A third aspect of a charging method for a secondary battery according to the present invention comprises:

previously storing n (n is a natural number more than 1) equilibrium voltages and n special charging voltages for charging n different kinds of secondary batteries, each of the equilibrium voltages equaling electromotive force of the secondary battery in a fully charged condition, and each of the special charging voltages supplying the secondary battery with charging electric current of peak or almost peak value, wherein each of the special charging voltages is larger than the corresponding equilibrium voltage and does not reach a region of voltage causing irreversible chemical reaction in the corresponding secondary battery; and charging a secondary battery according to first to eighth steps, the first step of initializing a counter variable k (k=1,2, . . . ,n) to 1;

the second step of applying the kth smallest special charging voltage of the n special charging voltages to the secondary battery for a predetermined time;

the third step of jumping to the sixth step if k is equal to n;

the fourth step of detecting voltage applied to the secondary battery while applying the kth smallest special charging voltage to the secondary battery for the predetermined time;

the fifth step of passing to the sixth step if the voltage detection is the first time or a voltage difference between present and past voltages detected during application of the kth smallest special charging voltage is within a preset range; otherwise, incrementing k by 1 and returning to the second step;

the sixth step of switching voltage applied to the secondary battery from the kth smallest special charging voltage to the kth smallest equilibrium voltage of the n equilibrium voltages; and the seventh step of detecting electric current flowing through the secondary battery while applying charging voltage of the kth smallest equilibrium voltage to the secondary battery for a short time; and the eighth step of returning to the second step and iterating the above steps if the detected electric current is larger than standard electric current for finishing charging; otherwise, halting charge of the secondary battery.

The charging method of the third aspect also has the same effect as that of the first aspect. Additionally the charging method of the second aspect automatically identifies the kind of secondary battery in the process of charging so as to rapidly and appropriately charge electricity to the kind of secondary battery basing on the selected equilibrium voltage and special charging voltage without overcharging and causing excessive chemical reaction (oxidation-reduction reaction) in the secondary battery until the kind of secondary battery is fully charged.

A fourth aspect of a charging method for a secondary battery according to the present invention comprises: observing voltage of the secondary battery completed in charging; and recharging the secondary battery if the observed voltage is not larger than recharging voltage established to be smaller than equilibrium voltage equaling electromotive force of the secondary battery in a fully charged condition.

A secondary battery charged up by the charging method of the fourth aspect necessarily has effective voltage equal to or higher than the recharging voltage just when it is picked out from the charging equipment, thereby being available.

Furthermore, by the method, a secondary battery is recharged appropriately without causing excessive damaging chemical reaction (oxidation-reduction reaction) therein until it is fully charged, thereby remarkably increasing its effective battery cycles and reducing the time to be fully charged.

A fifth aspect of a charging method for a secondary battery according to the present invention comprises: repeating a charging operation cycle including check of a charged condition of the secondary battery and application of charging special charging voltage to the secondary battery for a determined time, wherein a relaxation time is established between the charging operation cycles; and halting charging the secondary battery when it is judged at the check that the secondary battery is fully charged.

By the charging method of the fifth aspect, the relaxation time established between the charging operation cycles leads accurate check of the charged condition of a secondary battery in the next charging operation cycle thereof, thereby enhancing the reliability of charging.

A sixth aspect of a charging method for a plurality of secondary batteries according to the present invention comprises: performing a charging turn as a series of the charging operation cycles each of which is performed for each uncharged secondary battery, wherein the charging operation cycles are performed one by one for the respective secondary batteries; repeating the charging turn for charging the plurality of secondary batteries, wherein the relaxation time is established between the final charging operation cycle in one charging turn and the first charging operation cycle in the next charging turn; and halting charge of each secondary battery when it is judged at the check that the secondary battery is fully charged.

By the charging method of the sixth aspect, charging is stopped for the relaxation time between the charging operation cycle in one charging turn and the first charging operation cycle in the next charging turn, so as to bring a surface of an electrode of the secondary battery into a stable condition, thereby accurately checking the charged condition of the secondary battery in the nest charging turn so as to decide whether the secondary battery is fully charged or not.

Complementarily speaking, in the process of charging a secondary battery, electrode reaction occurs on an electrode surface touching electrolyte. In this electrode reaction are simultaneously performed movement of reactant to the electrode surface from the electrolyte, movement of electron between the reactant and the electrode, and movement of product into the electrolyte from the electrode surface. It takes quite a long time for these movements so that the secondary battery, if the charged state thereof is checked immediately after pausing charge of the secondary battery, may be misread as if it reached the fully charged condition because of ion and the like being electrophoresed around the electrode surface. The relaxation time is advantageous for preventing such misreading. By the charging method of the sixth aspect, the relaxation time as a partial process in a cycle of charging each of secondary batteries is established rationally and effectively.

BEST MODE FOR CARRYING OUT THE INVENTION

A charging method by the charging equipment for a secondary battery in the present invention explained below is characterized in that high electric current is supplied to a secondary battery by applying the highest voltage (a predetermined charging voltage) out of a region of charging voltage causing irreversible chemical reaction in the secondary battery so as not to damage the internal structure of the secondary battery, and that the secondary battery is periodically checked whether the secondary battery is fully charged or not (whether charge of the secondary battery is finished or not). For this check, equilibrium charging voltage for equilibrium cell potential of the secondary battery in a fully charged condition is applied to facilitate quick and accurate judge whether the secondary battery precisely is fully charged or not. By this charging method, the time for fully charging a secondary battery can be reduced to thirty minutes or less. Furthermore, by the method, electricity can be appropriately charged to the secondary battery appropriately without causing excessive damaging chemical reaction (oxidation-reduction reaction) in the secondary battery till the secondary battery is fully charged, thereby increasing effective battery cycles of the secondary battery to five thousands times or more.

First of all, a fundamental composition of a charging equipment for a secondary battery according to the present invention will be explained referring to FIG. 1.

Figure 1:
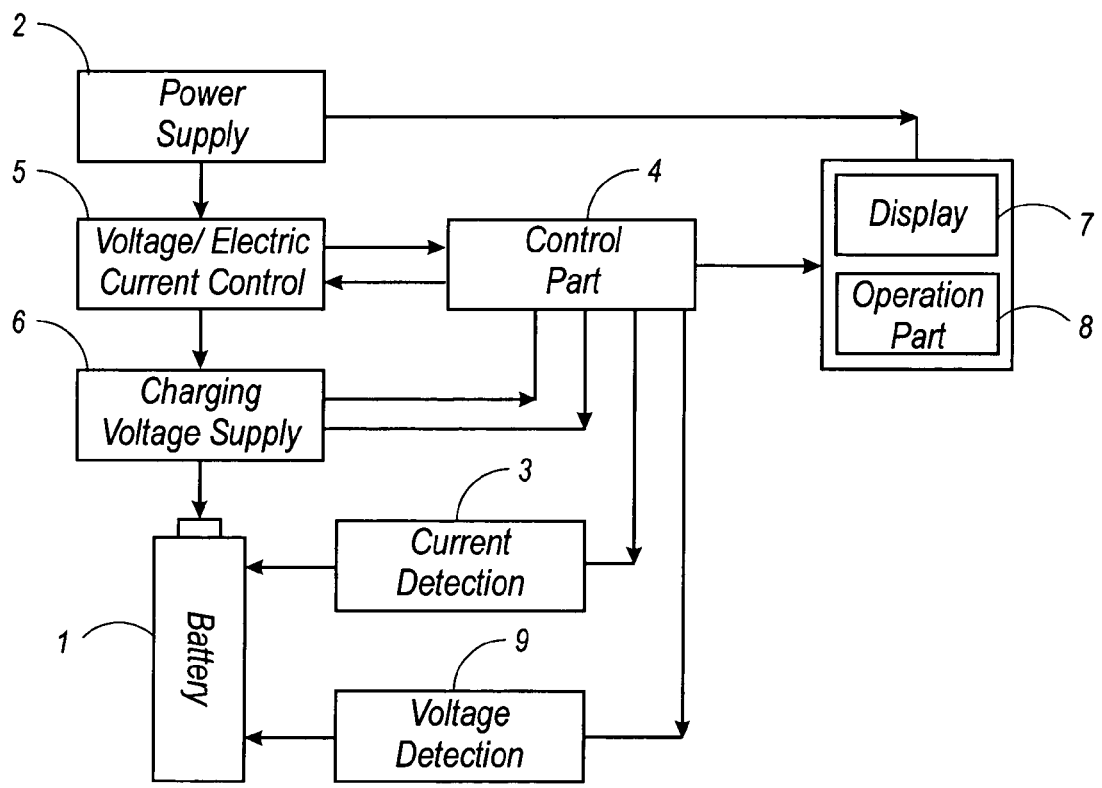
FIG. 1 is a block diagram of a charging equipment for a secondary battery 1 according to any of first to seventh embodiments of the present invention.

The charging equipment shown in FIG. 1 is provided for charging a secondary battery 1. The charging equipment comprises a power supply part 2, a current detection part 3, a voltage detection part 9, and a control part 4 for programming and calculating. The power supply part 2 includes a transformer-rectifier circuit for changing commercial alternating current into direct current. The current detection part 3 detects a value of charting electric current flowing through the secondary battery 1. The voltage detection part 9 detects a value of voltage applied in the secondary battery 1, or a value of charging voltage supplied to the secondary battery 1. The control part 4 is charge control means for controlling charge of the secondary battery 1. The value of electric current detected by the current detection part 3 and the value of voltage detected by the voltage detection part 9 are transmitted to the control part 4.

Figure 3:
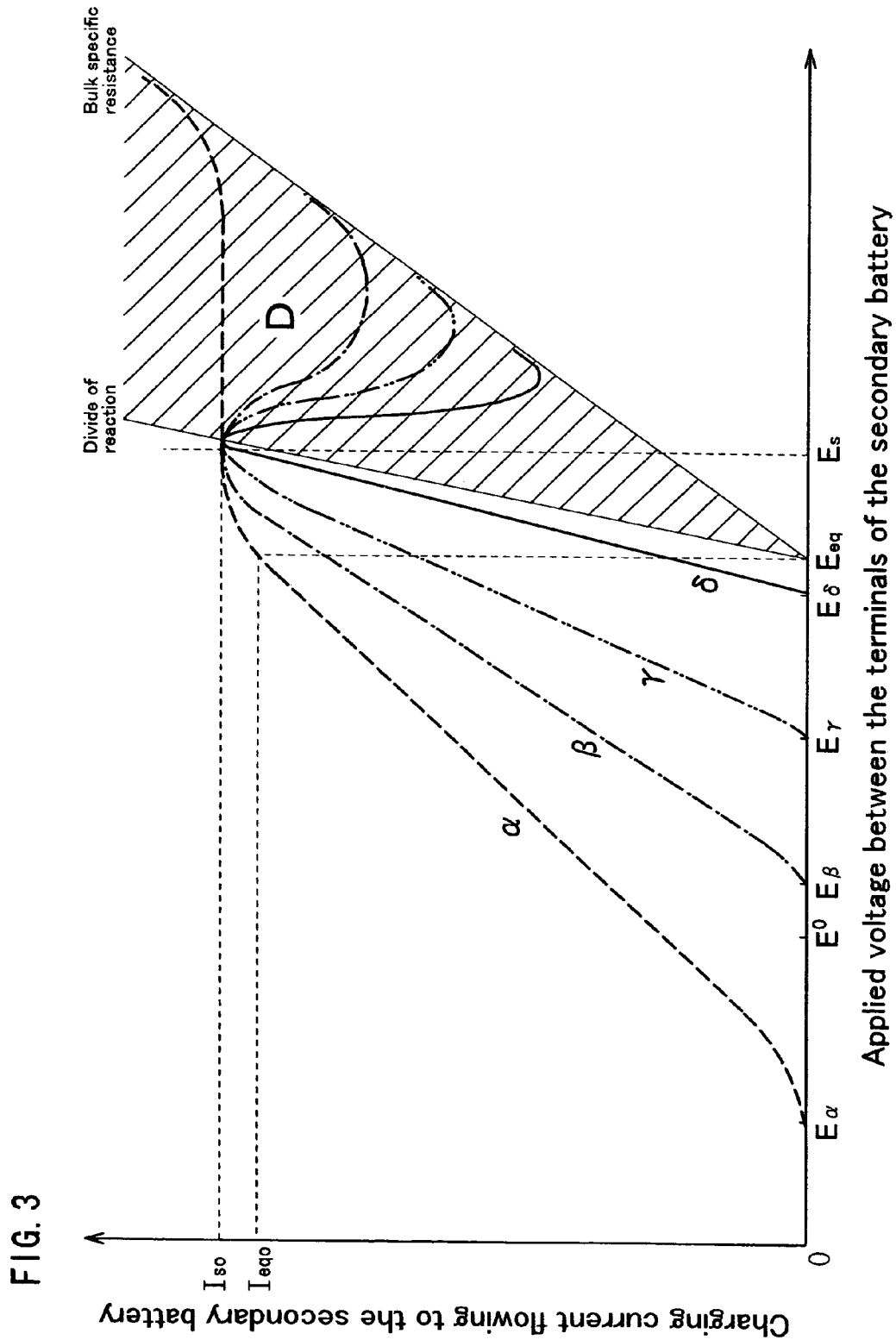
FIG. 3 illustrates current-voltage graphs of a secondary battery 1 in different charging rates.

The control part 4 serving as the charge control means comprises a storage means (memory), which previously stores two values of charging voltage: equilibrium voltage $E_{eq}$ provided for equilibrium cell voltage of the secondary battery 1 in a fully charged condition (see FIG. 3) and special voltage $E_s$ larger than the equilibrium voltage $E_{eq}$ (as showing FIG. 3, the special charging voltage $E_s$ corresponds to the peak value of electric current $I_{so}$ which is reached when charging current is not increased any more. When the secondary battery 1 whose charging rate is almost 0% is charged, the increasing rate of charging current to increasing applied voltage ($\Delta I \Delta E$) is decreased just before the charging current reaches the peak value. The special charging voltage $E_s$ relative to electric current does not reach a region thereof causing irreversible chemical reaction (an irreversible chemical reaction D).

The control part 4 also stores several programs such as a judging program for judging whether the secondary battery 1 is fully charged or not, and a charge time predicting program for estimating necessary time t to fully charge the secondary battery.

A reference numeral 5 in FIG. 1 designates a voltage/electric current control part, which controls change of voltage and electric current flowing through the secondary battery 1 according to a command from the control part 4. In other words, the voltage/electric current control part 5 comprises a switching means for switching charging voltage between the equilibrium voltage $E_{eq}$ and the special voltage $E_s$.

A reference numeral 6 designates a charging voltage supply part, which supplies the charging voltage set by the voltage/electric current control part 5 according to a starting command, and finishes charging according to an ending command from the control part 4. A reference numeral 7 designates a display part for displaying a necessary time t to fully charge the secondary battery 1, and others, which are calculated in the control part 4. A reference numeral 8 designates an operation part, which is operated by a user for starting and the like.

As for the following embodiments, the charging equipment comprises the display part 7 as a visual monitor for indicating the necessary time t to fully charge the secondary battery 1 and others to a user. However, instead of the visual type display part 7, the charging equipment may have any type monitor device using sound etc.

A herein-said secondary battery means a rechargeable battery, which can repeat charge-discharge cycles. In the charging process, electrical energy is transformed into chemical potential energy, which is stored in the secondary battery. The stored chemical potential energy is converted back into electrical energy when the need arises.

Typical and practical batteries serving as the secondary battery 1 are a nickel-cadmium battery, a nickel metal hydride battery, a lithium ion battery, a NAS battery, and the like.

A nickel-cadmium battery serving as the secondary battery 1 charged by the charging equipment of each embodiment will now be explained.

A nickel-cadmium battery is a storage battery which comprises a hermetically sealed cell container filled with alkali electrolyte, a separator made of synthetic resins for separating the cell container into two rooms, a positive electrode made of nickel oxyhydroxide (Ni(OOH)) in one room, and a negative electrode made of cadmium (Cd) in the other room.

The electrolyte is an aqueous solution whose main ingredient is potassium hydroxide with high electric conductivity. If needed, lithium hydroxide, sodium hydroxide, etc. may be added to this aqueous solution in order to raise the capacity of the positive electrode.

In electromotive reaction of the nickel-cadmium battery, the chemical reaction on the positive electrode is expressed by the following formula.

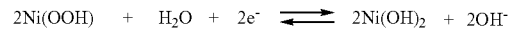

The chemical reaction on the negative electrode is expressed by the following formula.

In its discharging process, oxyhydroxide (Ni(OOH)) reacts with water ($H_2O$) and electron ($e^-$) from the positive electrode to form hydroxylation nickel (Ni(OH)$_2$) on the positive electrode.

On the other hand, cadmium (Cd) reacts with hydroxylation ion (OH$^-$) generated from the positive electrode and entering the negative electrode room through the separator to form hydroxylation cadmium (Cd(OH)$_2$) and electron ($e^-$) on the negative electrode. This electron ($e^-$) passes through external load and is supplied to the positive electrode.

In this cycle, the electron ($e^-$) passing through the external load is used for work. Therefore, this cycle requires the following conditions for its smooth performance: Plenty of water ($H_2O$) involving hydroxylation nickel (Ni(OH)$_2$) as production in low concentration exists around the positive electrode, and hydroxylation cadmium (Cd(OH)$_2$) in low concentration around the negative electrode. This relation can be expressed by the following formula.

$$E_{emf} = E^0 + ((R*T)/F)*\ln(C_{aq}(C_N*C_C))$$

$E^0$ is standard electromotive force. $E^0$ is a constant decided according to materials of the positive and negative electrodes regardless of quantity of the substances. For example, the standard electromotive force $E^0$ of the nickel-cadmium battery is about 1.2V(Volt). R is the gas constant, T is absolute temperature, and F is Faraday constant.

The above-mentioned formula shows that, at the positive electrode, the higher the concentration ($C_{aq}$) of water ($H_2O$) is and the lower the concentration ($C_N$) of hydroxylation nickel (Ni(OH)$_2$) is, the larger the Electromotive force $E_{emf}$ becomes, and at the negative electrode, the lower the concentration ($C_c$) of hydroxylation cadmium (Cd(OH)$_2$) is, the larger the electromotive force $E_{emf}$ becomes. It means that the larger the electromotive force $E_{emf}$ is, the larger the capacity of accumulation of electricity in the secondary battery becomes.

Figure 2:
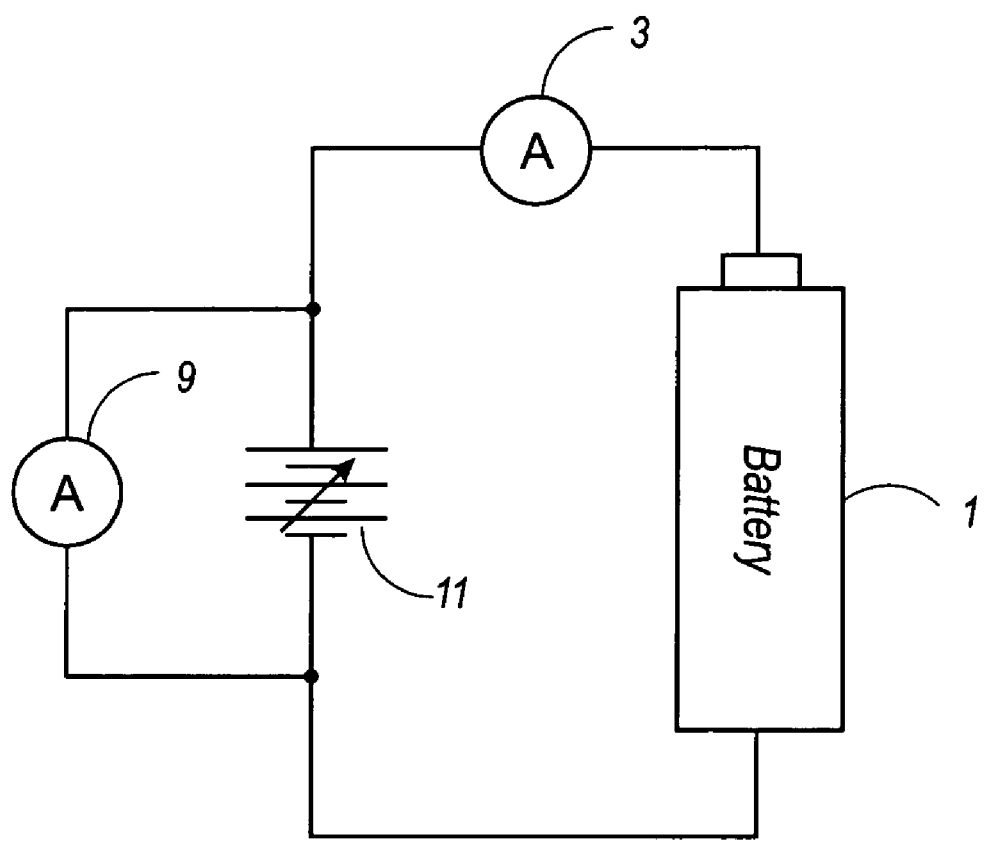
FIG. 2 is a circuit diagram for detecting electromotive force of a secondary battery 1.

Incidentally, a circuit shown in FIG. 2 may be made so as to know the charged condition of the secondary battery 1 exactly. In the circuit, a variable power supply 11 is connected to the secondary battery 1, and an electrical potential of the variable power supply 11 is adjusted to a potential equaling the electromotive force E of the secondary battery 1. That is, the variable power supply 11 is adjusted so that a value of the electric current detected by the current detection part 3 may be set to $\pm 0$ mA, whereby the electromotive force $E_{emf}$ of the secondary battery 1 is measured indirectly. In this way, for charging various types of secondary batteries 1, the electromotive force $E_{emf}$ of each of the secondary batteries 1 in their fully charged condition is previously inputted into the control part 4 serving as the storage means.

Next, referring to the graph of FIG. 3, a characteristic of relation between voltage and current for charging the secondary battery 1 will be explained, which is a fundamental theory underling hereinafter description of the present charging method.

FIG. 3 shows voltage-current characteristic curves in a charged secondary battery 1 corresponding to different charging rates, with battery terminal voltage (applied voltage) as the abscissa, and charging current as the y-axis.

A graph α drawn in a dashed line expresses a voltage-current characteristic during charge of the secondary battery 1 when its charging rate is approximately 0%. In this case, even if the voltage $E_\alpha$ lower than the standard voltage (nominal voltage) $E^0$ is applied, electric current starts flowing to be charged. (The applied voltage (battery terminal voltage) when electric current begins flowing to be charged is defined as open-circuit voltage.)

The larger the charging rate is, the higher the open-circuit voltage becomes. A graph β drawn with a long dashed short dashed line in FIG. 3 expresses a voltage-current characteristic during charge of the secondary battery 1 when its charging rate is approximately 50%. Open-circuit voltage $E_\beta$ for starting flow of electric current to be charged is applied higher than the open-circuit voltage $E_\alpha$ for charging the secondary battery 1 when its charging rate is approximately 0%. A graph γ drawn in a long dashed double-short dashed line in FIG. 3 expresses a voltage-current characteristic during charge of the secondary battery 1 when its charging rate is approximately 90%, requiring open-circuit voltage $E_\gamma$ higher than $E_\beta$. A graph δ drawn in a continuous line in FIG. 3 expresses a voltage-current characteristic during charge of the secondary battery 1 when its charging rate is approximately (less than) 100%, requiring open-circuit voltage $E_\delta$ higher than $E_\gamma$. Open-circuit voltage for the secondary battery 1 when its charging rate is just 100% is equal to the equilibrium voltage $E_{eq}$ which is higher than $E_\delta$.

Electric current charged in the secondary battery 1 is increased substantially in proportion to increase of applied voltage higher than open-circuit voltage E $E_\alpha$, $E_\beta$, $E_\gamma$, $E_\delta$ etc. corresponding to its initial charging rate. When the applied voltage passes over a certain voltage (an inflection point of the voltage-current curve), the increase rate of charging electric current to applied voltage (ΔI ΔE) begins to decrease. Finally, charging electric current reaches peak electric current $I_{so}$ and does not increase any more even if applied voltage is increased.

Applied voltage corresponding to the peak electric current $I_{so}$, which is charging electric current when the increase rate of charging electric current to applied voltage (ΔI ΔE) becomes zero, is the special voltage $E_s$ peculiar to each secondary battery 1, determined by a kind, a degraded state, and other element of the secondary battery 1 to be charged.

If voltage higher than the special voltage $E_s$ is applied to the secondary battery 1, oxidation-reduction reaction of active substance is further promoted so as to cause electrolysis reaction in the secondary battery 1, whereby the characteristic of negative resistance appears. In the worst case, the internal structure of the secondary battery 1 may be destroyed by unexpected abnormalities such as exothermic reaction and swelling reaction. Even if such the worst case does not happen, applied voltage higher than the special voltage $E_s$ promotes irreversible chemical reaction leading to reduction of effective battery cycles of the secondary battery 1. The irreversible chemical reaction region D hatched in FIG. 3 is a region of the relationship between charging electric current and applied voltage such as to cause irreversible chemical reaction which is harmful to the secondary battery 1.

The graph α corresponding to the secondary battery 1 when its charging rate is approximately 0% shows that the charged peak electric current $I_{so}$ is still kept in spite of increasing applied voltage in the region D. Each of the graphs β, γ and δ shows that, in the region D, as applied voltage is increased, charging electric current is decreased and the decreasing rate of charging electric current is increased. Finally, the characteristic of negative resistance of the secondary battery 1 in the region D, which appears as the irreversible chemical reaction, is turned as the bulk specific resistance increasing in proportion to the rise of applied voltage.

Therefore, it is necessary for charging a secondary battery 1 to control voltage applied to the secondary battery 1 lest the charging electric current relative to applied voltage should enter the irreversible chemical reaction region D before the secondary battery 1 is fully charged (the state of its charging rate 100%).

Incidentally, FIG. 3 shows that the minimum voltage in the irreversible chemical reaction region D (on the border of the reaction region D) becomes smaller according to increase of charging rate (or decrease of charging electric current). The capacity of accumulation of electricity in the secondary battery 1 is product of charging electric current multiplied by charge time. Therefore, for shortening the charge time, it is necessary to increase charging electric current. Under the constant charging rate, the higher applied voltage is, the larger charging electric current becomes.

The requirement for charging a secondary battery 1 is to prevent the relationship between charging electric current and applied voltage from entering the region D in spite of increase of charging rate till the secondary battery 1 is fully charged, and to flow the maximum electric current in the secondary battery when its charging rate is approximately 0%. Taking the requirement into account, the open-circuit voltage $E_{eq}$ for the fully charged secondary battery 1, shown in FIG. 3, is worthy of application to the secondary battery 1. The voltage $E_{eq}$ is used as the equilibrium voltage provided for equilibrium cell potential of the secondary battery 1 in its fully charged condition.

The application of equilibrium voltage $E_{eq}$ facilitates easy judgment whether the secondary battery 1 is fully charged or not, because the higher charging rate is, the lower charging electric current becomes.

This merit will be explained referring to the FIG. 3. When the equilibrium voltage $E_{eq}$ is constantly applied to the terminals of the secondary battery 1 whose initial charging rate is approximately 0%, charging electric current $I_{eqo}$ (see the graph α) flows through the secondary battery 1 at first. The higher its charging rate rises according to the progress of charge, the lower charging electric current falls from the electric current $I_{eqo}$ (see the graphs β and γ). The relative value of the charging electric current to the applied voltage does not enter the irreversible chemical reaction region D until the secondary battery 1 is fully charged (its charging rate reaches 100%). The charging electric current becomes 0 mA when the secondary battery 1 is fully charged. Thus, whether the secondary battery 1 is fully charged or not can be easily judged.

However, the secondary battery 1 has the potential for receiving the peak electric current $I_{so}$ higher than the electric current $I_{eqo}$ without causing irreversible chemical reaction in the secondary battery 1, while the special charging voltage $E_s$ in spite of any charging rate of the secondary battery 1 (whether charging rate of the secondary battery 1 is approximately 0% or 100%). Such high charging electric current flowing through the secondary battery 1 can remarkably reduce charge time in comparison with the charge time when the secondary battery 1 is charged by application of the equilibrium voltage $E_{eq}$.

Therefore, according to the present embodiment, the secondary battery 1 is charged by constantly applying the special charging voltage $E_s$ for a considerable time so as to flow the maximum charging electric current (the peak electric current $I_{so}$) out of the irreversible chemical reaction region D, and by switching applied voltage from the special charging voltage $E_s$ to the equilibrium voltage $E_{eq}$ at a suitable time so as to reduce charging electric current. Whether the secondary battery 1 is fully charged or not is judged during the application of the equilibrium voltage $E_{eq}$ to the secondary battery 1.

While the special charging voltage is applied to the secondary battery 1 so as to increase the charging rate thereof, almost the peak electric current $I_{so}$ is kept as charging electric current, thereby increasing the charging rate for a greatly short time. By applying the equilibrium voltage $E_{eq}$ to the secondary battery 1 for a suitable time, charging electric current becomes lower according to increase of charging rate of the secondary battery 1, thereby preventing the secondary battery 1 from overcharging and facilitating easy judgment whether the secondary battery 1 is fully charged or not.

Voltage to be applied for charging the secondary battery 1 with large electric current is not limited to the special charging voltage $E_s$ corresponding to the peak electric current $I_{so}$. It may be lower than the voltage $E_s$ so as to correspond to electric current smaller than the peak electric current $I_{so}$. In other words, as shown in FIG. 3, the voltage to be applied is set to a value corresponding to a selective value of electric current, out of the irreversible chemical reaction region D, which extremely approaches but does not reach the peak current. The selective value of electric current is pointed on the current-voltage graph where the increasing rate of charging electric current to applied voltage ($\Delta I \Delta E$) reduces. By applying this voltage, the secondary battery 1 can be also charged with high electric current, which is almost the peak electric current $I_{SO}$.

To provide the peak electric current $I_{so}$, which is kept constant regardless of variation of charging rate, for charging the secondary battery 1, the special charging voltage $E_s$ corresponding to the kind of secondary battery 1 to be charged may be established basing on the graph a in FIG. 3, for example, i.e., the current-voltage characteristic of the secondary battery 1 whose charging rate is almost 0%, wherein the peak electric current $I_{so}$ is kept in a certain variation area of applied voltage. In other words, the special charging voltage $E_s$ is set to voltage just before reaching the irreversible chemical reaction region D, which is defined on the graph as a point where the increasing rate of charging electric current according to the rise of applied voltage ($\Delta I \Delta E$) is decreased to 0 or almost 0.

FIRST EMBODIMENT OF CHARGING EQUIPMENT FOR SECONDARY BATTERY

A charging equipment for a secondary battery 1 according to the first embodiment will be explained.

This charging equipment uses the method comprising the step of: switching charge with high electric current to charge with application of the equilibrium voltage at a suitable time, and judging basing on the detected value of electric current which is suitable, charge with high electric current or charge with application of the equilibrium voltage.

FIG. 1 shows composition of the charging equipment of the first embodiment. The control part 4 has a check current judging program for judging whether check current i detected by the current detection part 3 during application of the equilibrium voltage $E_{eq}$ to the secondary battery 1 is larger than a preset standard electric current J for finishing charging or not, a charge time predicting program for estimating necessary time t to fully charge the secondary battery 1 basing on the value of check current i detected by the current detection part 3 during application of the equilibrium voltage $E_{eq}$. In short, the control part 4 functions as both of a check current judging means and a charge time predicting means.

The charging equipment of the first embodiment is controlled by this control part 4 as follows. The charging equipment applies the special charging voltage $E_s$ (or voltage considerably smaller than the special charging voltage $E_s$) to the secondary battery 1 for a determined time $T_1$. After charge with high electric current during the application of the special charging voltage $E_s$, the charging equipment switches voltage applied to the secondary battery 1 from the special charging voltage $E_s$ to the equilibrium voltage $E_{eq}$ and detects a value of electric current i flowing through the secondary battery 1 during the application of the equilibrium voltage $E_{eq}$ to the secondary battery 1. Basing on the detected value of electric current i, the charging equipment predicts necessary time t to fully charge the secondary battery 1 and displays necessary time t on the display part 7 with LED, LCD or the like, and simultaneously; the storage means in the control part 4 [step A1].

Both the special charging voltage $E_s$ and the equilibrium voltage $E_{eq}$ are determined by the kind or type of secondary battery 1, such as the nickel-cadmium battery, the nickel metal hydride battery, and the lithium ion battery. For example, with regard to the nickel-cadmium battery, the equilibrium voltage $E_{eq}$ is set to around 1.41 V, and the special charging voltage $E_s$ is set to around 1.81 V higher than the equilibrium voltage $E_{eq}$.

A user manipulates the operation part 8 to start charging [step A2], whereby the charging equipment applies the selected special charging voltage $E_s$ to the secondary battery 1 for a predetermined to,e (a fixed time) $T_1$ [step A3].

The predetermined time $T_1$ is calculated basing on variation of charging electric current according to the time progress during the application of special charging voltage $E_s$. After the predetermined time $T_1$ passes, the charging equipment short-circuits the secondary battery 1 between its terminals for an extremely short time $T_2$ [step A4], so as to remove electric charge from the electrode interface of the secondary battery 1. Then, the charging equipment switches applied voltage to the equilibrium voltage $E_{eq}$ [step A5].

The charging equipment detects a value of electric current i flowing through the secondary battery 1 during the application of equilibrium voltage $E_{eq}$ to the secondary battery 1 of short duration [step A6].

Next, the charge time predicting program calculates the necessary time t to fully charge the secondary battery 1 basing on the detected electric current i, that is, the time t required for the detected electric current i to reach the standard electric current J for finishing charging (the value of electric current which will be detected at the fully charged condition), and this necessary time t is indicated on the display part 7 [step A7].

At the same time, the check current judging program compares the detected electric current i with the standard electric current J for finishing charging [step A8]. If the detected electric current i is larger than the standard electric current J for finishing charging, the control step returns to the step A3, and the above steps (charge control) are repeated. Otherwise, the charging equipment recognizes that the secondary battery 1 is fully charged, and it stops charging the secondary battery 1 [step A9].

Incidentally, if equilibrium voltage $E_{eq}$ is applied and the charging rate is 100% (the charging equipment judges whether the detected value of electric current i is larger than the preset standard value of electric current J for finishing charging or not. If the detected value of electric current i is larger than the standard value of electric current J for finishing charging, the charging equipment applies the special charging voltage $E_s$ to the secondary battery 1 again; otherwise, charge of the secondary battery 1 is halted.

Figure 4:
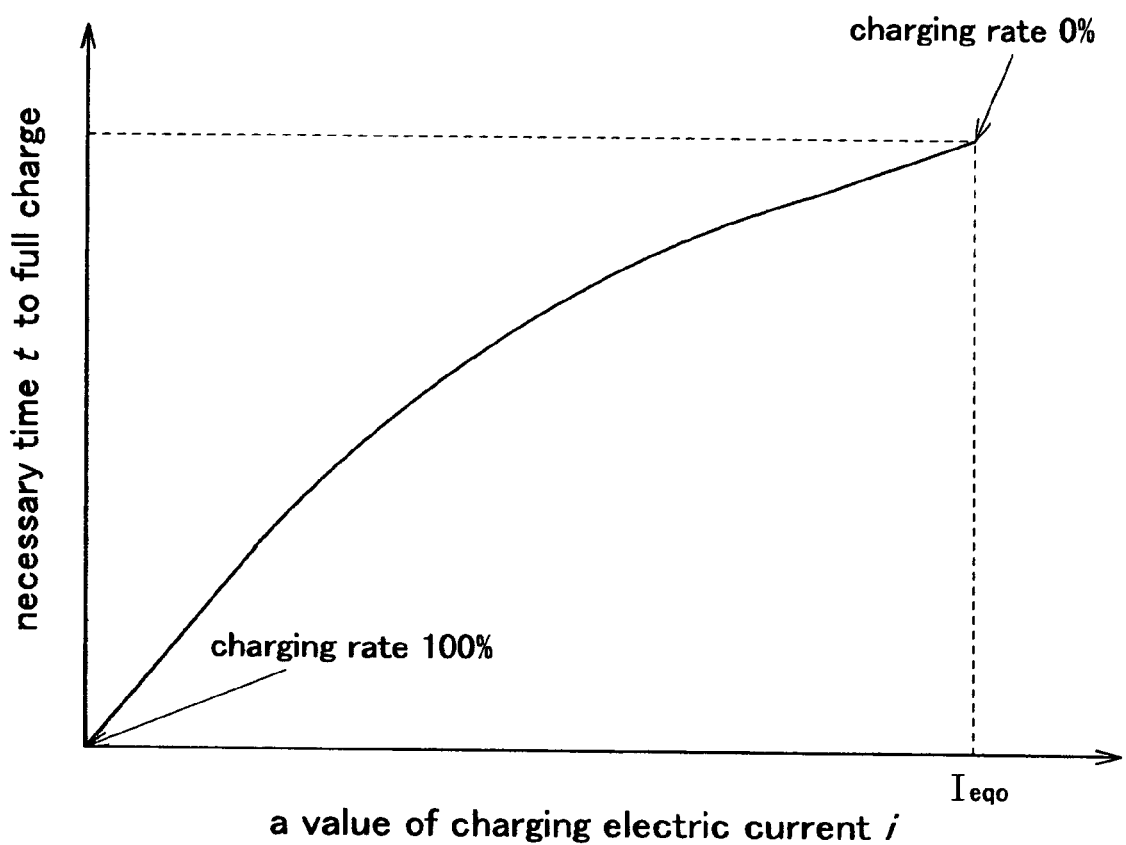
FIG. 4 is a graph showing a relation of a necessary time for fully charging a secondary battery 1 to electric current flowing therethrough.

Incidentally, the necessary time t to fully charge the secondary battery 1 can be predicted from the graph in FIG. 4, for example, which illustrates the relation between electric current i and the necessary time t.

The graph in FIG. 4 shows the relation between the detected value of electric current i during application of the equilibrium voltage $E_{eq}$ and the necessary time t till the secondary battery 1 is fully charged. The necessary time t is a time required by electric current i detected by the current detection part 3 to reach the standard value of electric current J for finishing charging, e.g., 0 mA.

Referring to FIG. 3, electric current $I_{eqo}$ is detected as a value of electric current i during application of the equilibrium voltage $E_{eq}$ to the secondary battery 1 whose charging rate is 0%. The graph in FIG. 4 shows that, as the charging rate is increased, the necessary time t and the detected electric current i are decreased. In this graph, when the detected value of electric current i reaches 0 mA, the secondary battery 1 is recognized to be fully charged so that the charging rate becomes 100% and the necessary time t is 0 second.

Accordingly, if a conversion table for converting the check current i into the necessary time t to fully charge the secondary battery 1 formed basing on this graph, or a relational expression which formulates the relation between the check current i and the necessary time t to fully charge the secondary battery 1 basing on the graph is made as the charge time predicting program, the necessary time t to fully charge the secondary battery 1 can be estimated basing on the detected value of electric current i.

Next, the control flow of charging the secondary battery 1 by the charging equipment of the first embodiment will be explained referring to a flow chart shown in FIG. 5.

First of all, a user inputs a kind of secondary battery 1 to be charged to the control part 4 by manipulating the operation part 8, thereby selecting the special charging voltage $E_s$ and equilibrium voltage $E_{eq}$ in correspondence to the kind of secondary battery 1 from a table in the secondary battery 1 is fully charged), electric current i theoretically becomes 0 mA, as shown in the graphs in FIG. 3 and FIG. 4. However, the fact is that the electric current are slightly different among different secondary batteries of the same type. Therefore, the standard electric current J for finishing charging to the value is desired to be slightly more than 0 mA, such as 10 mA, for preventing the secondary battery 1 from overcharging. In this case, the necessary time t to fully charge is a time required for the detected electric current i to reach a value not more than 10 mA.

The charging time $T_1$ for applying the special charging voltage $E_s$ varies depending on the battery's capacity, structure, form, or the like. For example, with regard to the nickel-cadmium battery, the charging time $T_1$ is set to around 120 seconds. The extremely short time $T_2$ for short-circuiting the terminals of the secondary battery 1 is a time required to clear the electric charge from the electrode interface of the secondary battery 1. With regard to the nickel-cadmium battery, the extremely short time $T_2$ is set to around 0.001 second. Furthermore the short time $T_3$ for applying the equilibrium voltage $E_{eq}$ is set to around 0.1 second.

If the short time $T_3$ is set to more than 1 second, the above-mentioned step A4 may be omitted.

Figure 5:
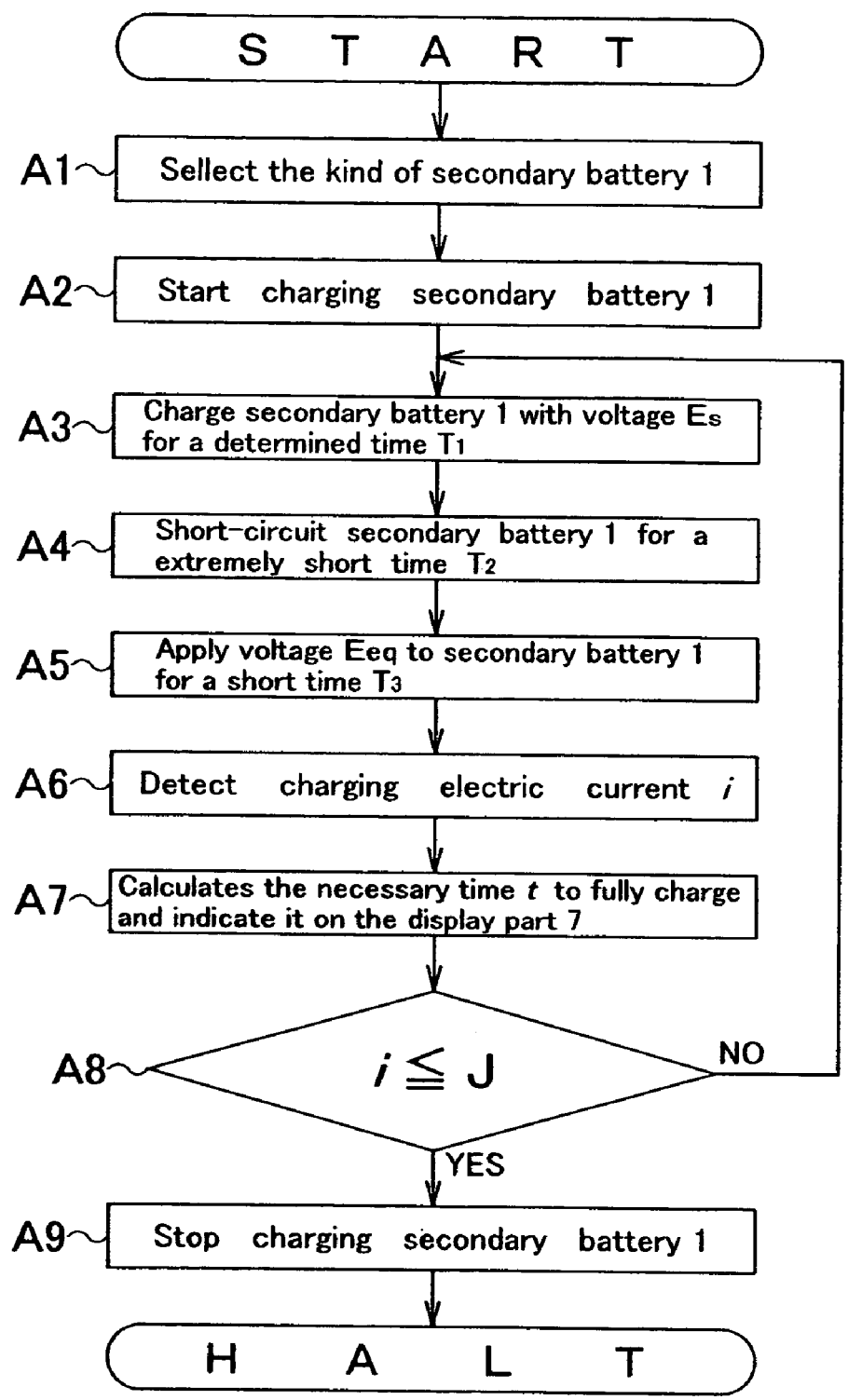
FIG. 5 is a flow chart of charging control of a secondary battery 1 by a charging equipment according to a first embodiment of the present invention.
Figure 6:
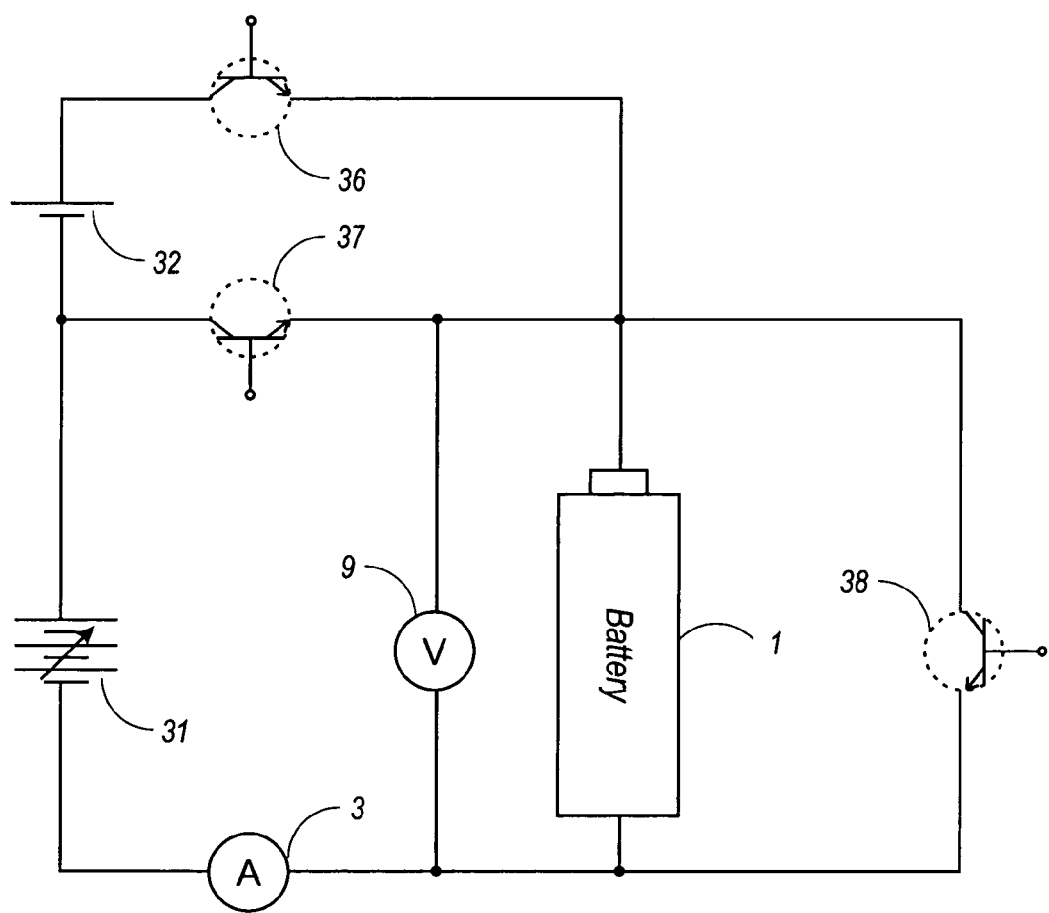
FIG. 6 is a circuit diagram for switching voltage applied to a secondary battery 1 according to the first embodiment.

To change charging voltage, shown in the flow chart of FIG. 5, the circuit shown in FIG. 6 may be used, for example. Referring to FIG. 1, a reference numeral 1 designates a secondary battery, a reference numeral 3 designates a current detection part 3 for detecting charging electric current flowing through the secondary battery 1, and a reference numeral 9 designates a voltage detection part 9 for detecting voltage applied to the secondary battery 1. This circuit has a first gate 36, a second gate 37, and a third gate 38 for switching elements such as field-effect transistor (FET). A reference numeral 31 designates a first power supply (variable power supply) that can change the setting of equilibrium voltage $E_{eq}$ suitable for a kind or a type of the secondary battery 1 to be charged, and a reference numeral 32 designates a second power supply for applying the special charging voltage $E_s$.

For further details, the plus terminal of the secondary battery 1 is connected to the emitter of the first gate 36, the emitter of the second gate 37, the collector of the third gate 38, and the minus terminal of the voltage detection part 9, respectively. The collector of the first gate 36 is connected to the plus terminal of the second power supply 32, and the minus terminal of the second power supply 32 is connected to both the plus terminal of the first power supply 31 and the collector of the second gate 37. The minus terminal of the first power supply 31 is connected to the plus terminal of the current detection part 3. The minus terminal of the current detection part 3 is connected to the plus terminal of the voltage detection part 9, the minus terminal of the secondary battery 1, and the emitter of the third gate 38.

Figure 7:
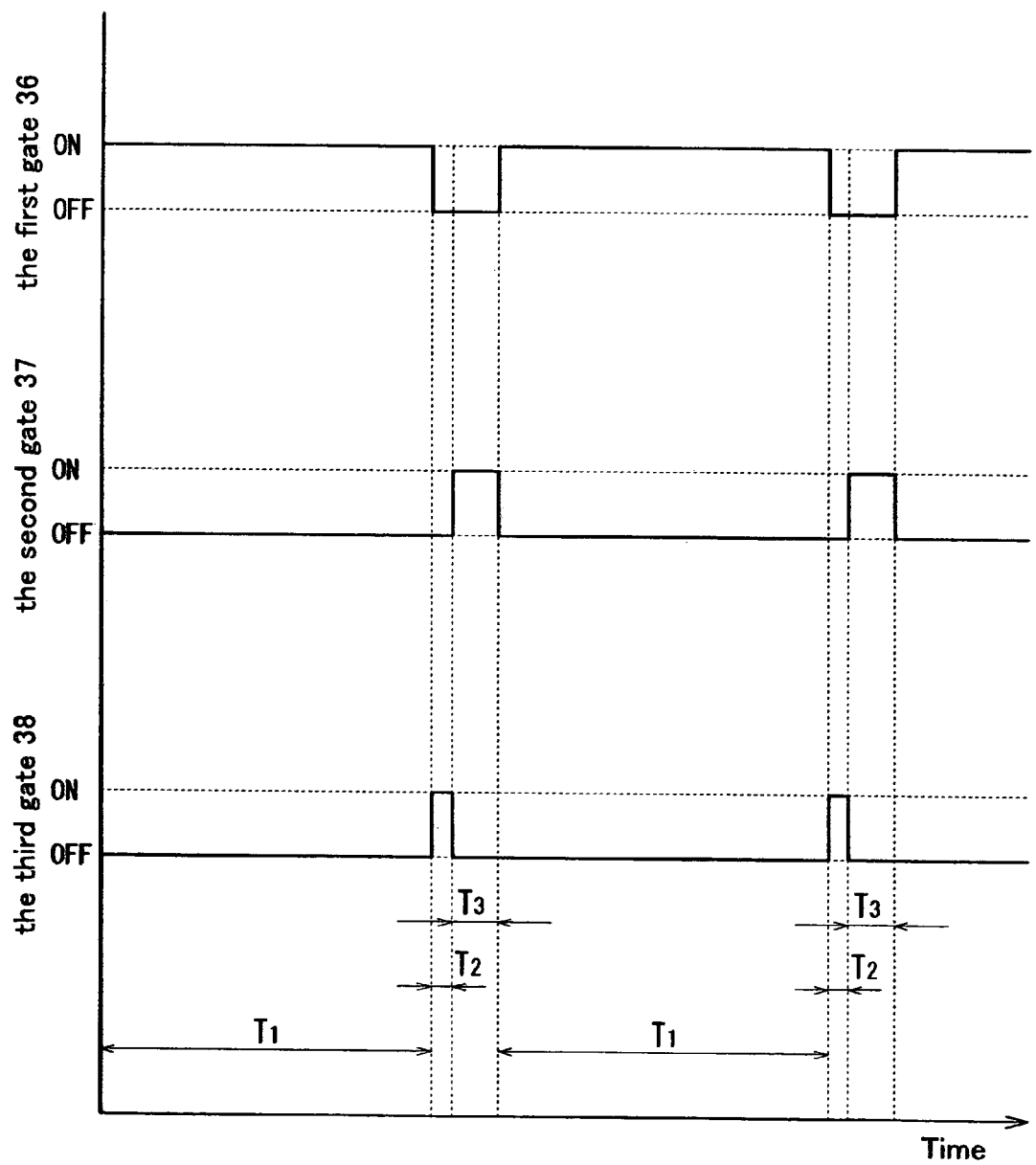
FIG. 7 is a time chart showing timings of switching voltage applied to a secondary battery 1 according to the first embodiment.
Figure 8:
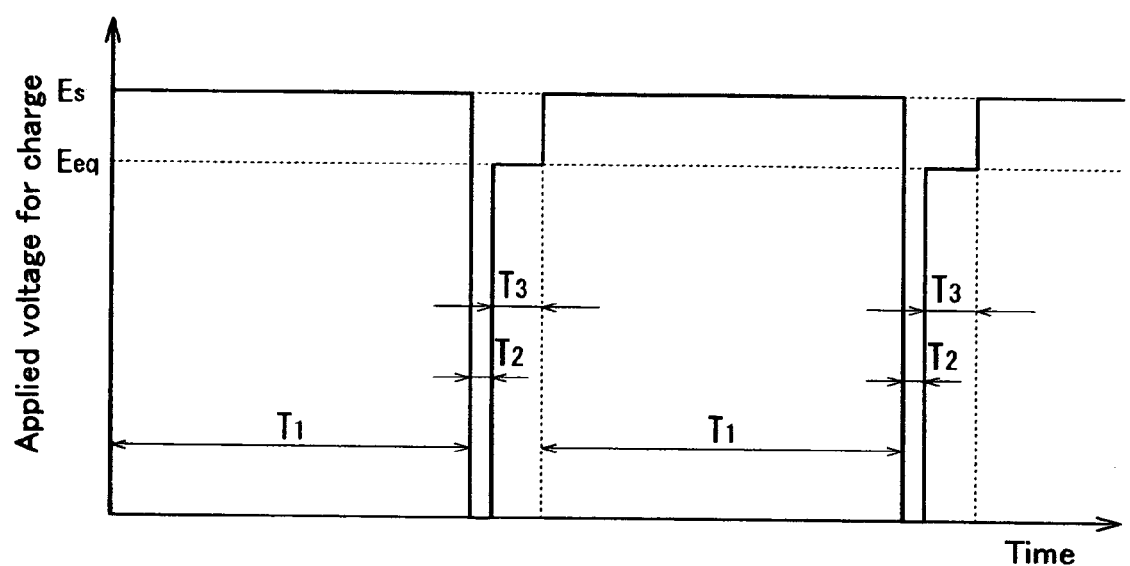
FIG. 8 is a time chart showing variation of voltage applied to a secondary battery 1 in association with switching voltage applied to the secondary battery 1 according to the first embodiment.

Next, the method for controlling applying voltage to the secondary battery 1 using the circuit in FIG. 6 will be explained referring to FIG. 7 and FIG. 8.

First of all, only the first gate 36 is switched on so as to apply the special charging voltage $E_s$ to the secondary battery 1 for a determined time $T_1$. After the passage of the determined time $T_1$, the first gate 36 is switched off and only the third gate 38 is switched on so as to short-circuit the terminals of the secondary battery 1 for an extremely short time $T_2$. In this way, the gates 36, 37 and 38 constitute means for short-circuiting the secondary battery 1 between its terminals. By the short-circuiting, electric charge is removed from the electrode interface of the secondary battery 1 so as to enable voltage to be smoothly applied to the secondary battery 1 at the next step, and to stabilize electric current flowing through the secondary battery 1 immediately after change of charging voltage, thereby ensuring accurate detection of electric current.

After the passage of the extremely short time $T_2$, the third gate 38 is switched off and the second gate 37 is switched on so as to apply the equilibrium voltage $E_{eq}$ for checking the charged condition of the secondary battery 1 for a short time $T_3$. During the short time $T_3$, the current detection part 3 detects a value of electric current i flowing through the secondary battery 1. Basing on the detected electric current i, the check current judging program judges whether the secondary battery 1 is fully charged or not, and the charge time predicting program calculates the necessary time t to fully charge the secondary battery 1. After the short time $T_3$ passes, the second gate 37 is switched off.

If the check current judging program judges that the secondary battery 1 is not fully charged, the first gate 36 is switched on so as to apply the special charging voltage $E_s$ for charging the secondary battery 1, and above-mentioned control steps are repeated.

On the other hand, if the check current judging program judges that the secondary battery 1 is fully charged, charge of the secondary battery 1 is halted.

According to the charging equipment of the first embodiment, a value of electric current i is detected so as to check the charged condition of the secondary battery 1 periodically, thereby appropriately charging the secondary battery 1 without causing excessive damaging chemical reaction (oxidation-reduction reaction) in the secondary battery 1 till the secondary battery 1 is fully charged. The internal structure of the secondary battery 1 is prevented from being damaged so as to remarkably increase effective battery cycles of the secondary battery 1. Moreover, by this charging method with the charging equipment of the first embodiment, the special charging voltage $E_s$ larger than the equilibrium voltage $E_{eq}$ is mainly applied so as to make considerably high charging electric current flow through the secondary battery 1, thereby reducing charging time.

Moreover, the charging equipment of the first embodiment estimates necessary time t to fully charge the secondary battery 1 basing on the detected electric current i, and displays the necessary time t on the display part 7, thereby improving users' convenience for monitoring the time required to fully charge the secondary battery 1.

Furthermore, the charging equipment of the first embodiment short-circuits the terminals of the secondary battery 1 before it switches voltage applied to the secondary battery 1 from the special charging voltage $E_s$ to the equilibrium voltage $E_{eq}$. By the short-circuiting, electric charge is cleared from the electrode interface of the secondary battery 1 so as to enable voltage applied to the secondary battery 1 to be smoothly switched to the equilibrium voltage $E_{eq}$, thereby stabilizing electric current flowing through the secondary battery 1 immediately after the change of voltage to the equilibrium voltage $E_{eq}$. Consequently, the charging equipment can detect electric current i accurately, and charge the secondary battery 1 appropriately.

SECOND EMBODIMENT OF CHARGING EQUIPMENT FOR SECONDARY BATTERY

Next, a charging equipment for a secondary battery 1 according to the second embodiment of the present invention will be explained.

The charging equipment of the second embodiment is characterized in that it can identify the kind of secondary battery 1 automatically in the process of charge without inputting data of the kind of secondary battery 1 so as to charge the secondary battery 1 rapidly till it is fully charged. The "kind" of secondary battery 1 means not only classification of the secondary batteries by the difference in substance of the plus terminal and/or the minus terminal such as a nickel-cadmium battery and a nickel-hydrogen battery, but also classification of the secondary battery having the same plus terminal and the same minus terminal by the difference in charge capacity.

The equilibrium voltage $E_{eq}$ and the special charging voltage $E_s$ are determined by the sort and the charge capacity of the secondary battery.

For example, regarding a nickel-cadmium battery whose charge capacity is 1000 mAh(milliampere-hour), the equilibrium voltage is about 1.41V, and the special charging voltage is about 1.80V. Regarding a nickel-hydrogen battery whose charge capacity is 2000 mAh, the equilibrium voltage is about 1.44V, and the special charging voltage is about 1.60V.

Figure 9:
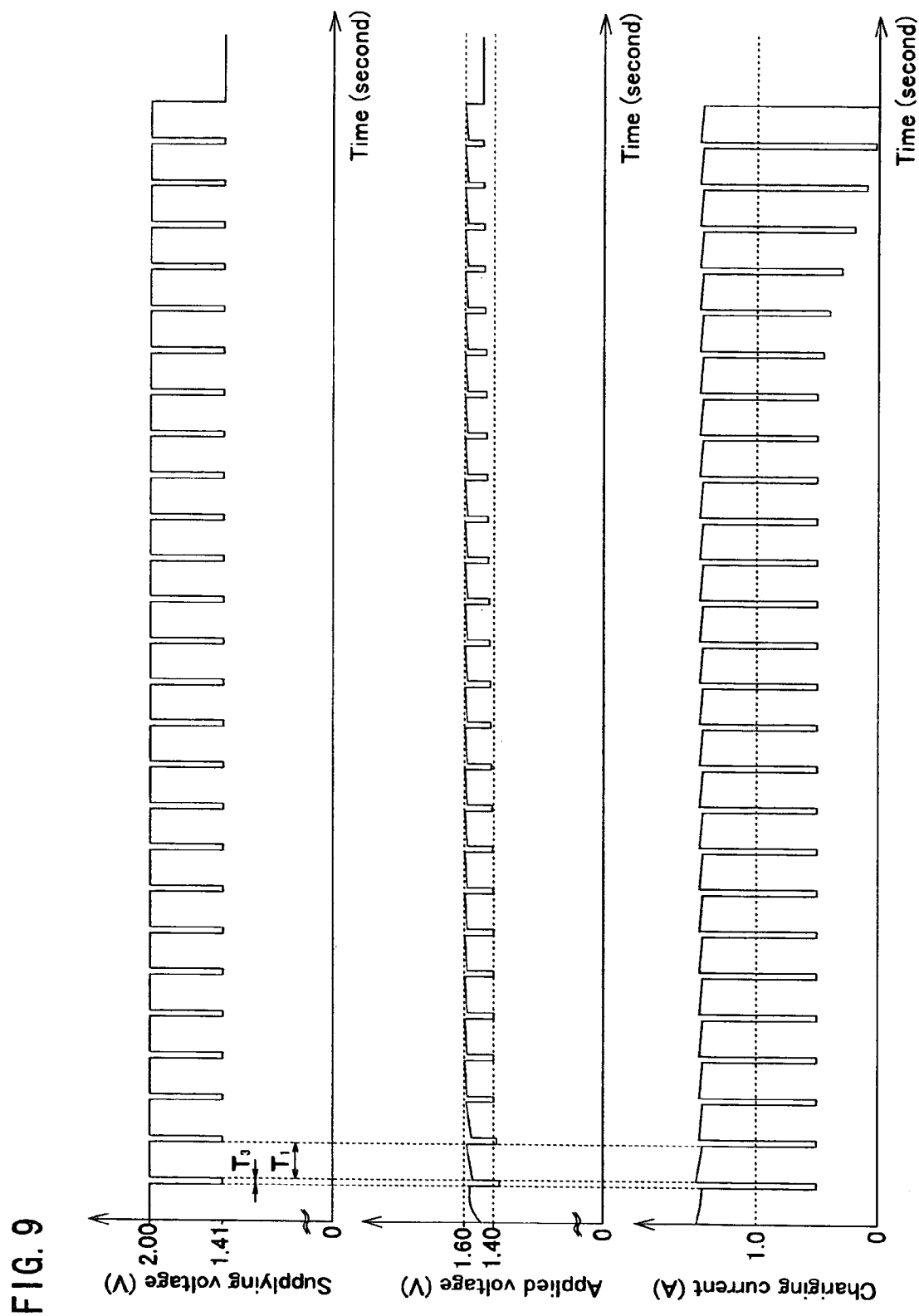
FIG. 9 is a time chart about the battery terminal voltage, the charging electric current, and the check electric current of a nickel-hydrogen battery.
Figure 10:
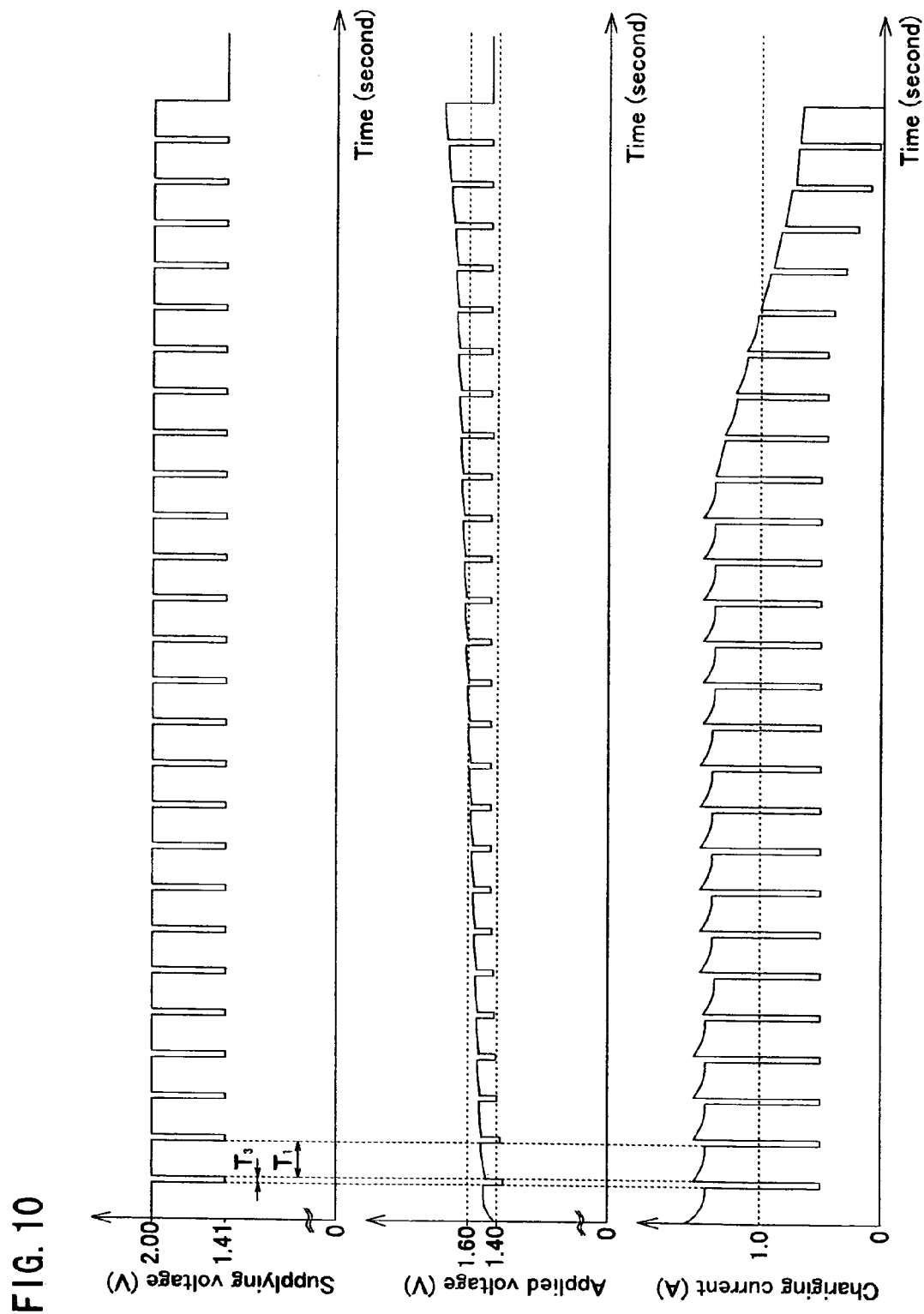
FIG. 10 is a time chart about the battery terminal voltage, the charging electric current, and the check electric current of a nickel-cadmium battery.

FIG. 9 is a time chart showing a time progress of the battery terminal voltage, a time progress of charging electric current, and check electric current when a nickel-hydrogen battery is charged by the charging equipment of the first embodiment under the condition that the equilibrium voltage is set to 1.44V and the special charging voltage is set to 1.60V, corresponding to the nickel-hydrogen battery. FIG. 10 is a time chart showing a time progress of the battery terminal voltage, a time progress of charging electric current, and check electric current when a nickel-cadmium battery is charged by the charging equipment of the first embodiment under the condition that the equilibrium voltage is set to 1.44V and the special charging voltage is set to 1.60V, corresponding to the nickel-hydrogen battery. In both FIG. 9 and FIG. 10, the determined time $T_1$ for applying the special charging voltage 1.60V at the above-mentioned step A3 is set to 55 seconds, the process of short circuit at the step A4 is omitted, and the short time $T_3$ for applying the equilibrium voltage 1.44V at the step A5 is set to 5 seconds.

Between the power supply part 2 and the charging voltage supply part 6 through the voltage/electric current control part 5, shown in FIG. 1, some resistance occurs so as to cause voltage drop. When corresponding to the nickel-hydrogen battery, the charging equipment is designed so that voltage of 2.0V from the power supply part 2 drops while passing the voltage/electric current control part 5 and the charging voltage supply part 6 so as to set the voltage applied between the terminals of the nickel-hydrogen battery to about 1.6V.

As shown in FIG. 3, while applying special charging voltage $E_s$ to the secondary battery 1, constant charging electric current (that is the peak electric current $I_{so}$) flows through the secondary battery 1 regardless of variation of its charging rate. If voltage lower than the special charging voltage $E_s$ is applied to the secondary battery 1, charging electric current flowing through the secondary battery 1 is decreased according to increase of the charging rate.

According to such characteristics, as shown in FIG. 9, when a nickel-hydrogen battery is charged with the setting voltage matching with the nickel-hydrogen battery, the voltage applied between the terminals of the nickel-hydrogen battery is about 1.6V corresponding to the special charging voltage (1.60V) of the nickel-hydrogen battery, and the constant electric current (the peak value of electric current $I_{so}$) corresponding to the special charging voltage flows through the nickel-hydrogen battery, whereby the voltage drop between the power supply part 2 and the charging voltage supply part 6 through the voltage/electric current control part 5 is kept almost constant. That is to say, almost constant voltage without exceeding 1.6V is applied between the terminals of the nickel-hydrogen battery and almost constant charging electric current flows therethrough while charging from the beginning of charge to the end of charge. The charging electric current flowing through the nickel-hydrogen battery can be checked appropriately by periodically applying the suitable equilibrium voltage 1.44V to the nickel-hydrogen battery, thereby charging the nickel-hydrogen battery rapidly and accurately till the fully charged condition.

As shown in FIG. 10, when a nickel-cadmium battery is charged with setting of voltage corresponding to the nickel-hydrogen battery, the voltage applied between the terminals of the nickel-cadmium battery varies between 1.4V and 1.6V for a while after starting charging.

This applied voltage is lower than the special charging voltage (1.80V) of the nickel-cadmium battery so that as its charging rate goes up, charging electric current flowing through it decreases gradually. With the diminution of charging electric current, voltage drop generated between the power supply part 2 and the charging voltage supply part 6 through the voltage/electric current control part 5 becomes smaller by degrees, so that the voltage applied between the terminals of the nickel-cadmium battery becomes larger by degrees. Finally, the voltage exceeds 1.6V and reaches about 1.8V at the end of charge.

The charging electric current flowing through the nickel-cadmium battery is checked by periodically applying the suitable equilibrium voltage 1.44V to the nickel-cadmium battery. However, the equilibrium voltage 1.44V corresponding to the nickel-hydrogen battery is higher than the equilibrium voltage 1.41V corresponding to the nickel-cadmium battery, so that the nickel-cadmium battery cannot be exactly charged till the fully charged condition.

To solve this problem, the charging equipment of the second embodiment distinguishes a type of secondary battery to be charged between a nickel-cadmium battery and a nickel-hydrogen battery, for example. The charging equipment applies voltage corresponding to the nickel-cadmium battery for charging a secondary battery 1 and for checking its charging rate. If the charging voltage applied between the terminals of the secondary battery 1 exceeds 1.6V, the secondary battery 1 is judged to be a nickel-cadmium battery. Afterward, the charging equipment applies voltage corresponding to the nickel-cadmium battery for charging the secondary battery 1 and for checking its charging rate.

The charging equipment of the second embodiment will be detailed. This is constructed similarly with that of FIG. 1. The storage means (memory) in the control part 4 stores equilibrium voltages $E_{eq}$ and special charging voltages $E_s$ corresponding to respective kinds of secondary batteries. The control part 4 has a check current judging program and a voltage judging program. The check current judging program serves as means for judging whether electric current i detected by the current detection part 3 during application of the equilibrium voltage $E_{eq}$ is larger than preset standard electric current J for finishing charging or not. The voltage judging program serves as means for judging whether voltage e detected by the voltage detection part 9 during application of the special charging voltage $E_s$ is larger than the special charging voltage $E_s$ or not.

Explanation of other parts in the charging equipment of the second embodiment is omitted because they are almost similar with those of the first embodiment.

Figure 11:
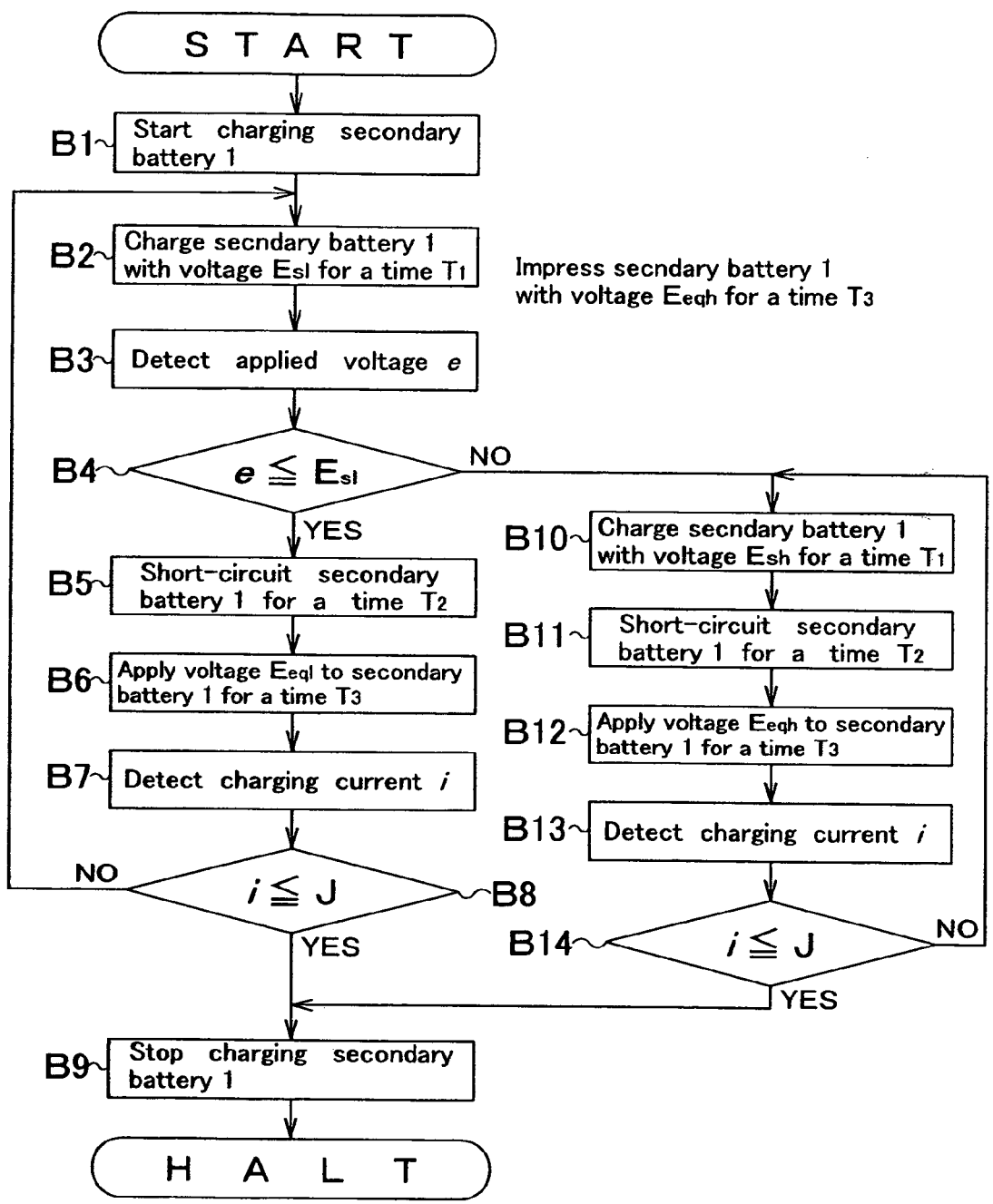
FIG. 11 is a flow chart of charging control of a secondary battery 1 by a charging equipment according to a second embodiment of the present invention.

The control flow of charging the secondary battery 1 by the charging equipment of the second embodiment, wherein the storage means in the control part 4 stores two values of equilibrium voltage $E_{eq}$ ($E_{eql}$, $E_{eqh}$) and two values of special charging voltage $E_s$ ($E_{sl}$, $E_{sh}$) corresponding to two kinds of secondary batteries, referring to the flow chart shown in FIG. 11.

The equilibrium voltage $E_{eql}$ is lower than the equilibrium voltage $E_{eqh}$ and the special charging voltage $E_{s1}$ is lower than the special charging voltage $E_{sh}$.

First of all, a user manipulates the operation part 8 of the charging equipment to start charging [step B1]. Accordingly, the charging equipment applies the lower special charging voltage $E_{s1}$ to the secondary battery 1 for a determined time (a fixed time) $T_1$ [step B2].

While the determined time $T_1$ of application of the lower special charging voltage $E_{s1}$ to the secondary battery 1, the voltage detection part 9 detects voltage e applied to the secondary battery 1 [step B3], and the voltage judging program judges basing on the detected value of voltage e [step B4]. If the detected voltage e is higher than the lower special charging voltage $E_{s1}$, the control step jumps to the later mentioned step B10 Otherwise, the control step goes to the next step B5.

After the determined time $T_1$ passes, the charging equipment short-circuits the secondary battery 1 between its terminals for an extremely short time $T_2$ [step B5] so as to remove electric charge from the electrode interface of the secondary battery 1. Then, the charging equipment switches applied voltage from the lower special charging voltage $E_{s1}$ to the lower equilibrium voltage $E_{ql}$, and applies the lower equilibrium voltage $E_{eql}$ to the secondary battery 1 for a short time $T_3$ [step B6].

If the short time $T_3$ is set to more than 1 second, the above-mentioned step B5 may be omitted.

The charging equipment detects a value of electric current i flowing through the secondary battery 1 during the application of the lower equilibrium voltage $E_{eq1}$ to the secondary battery 1 for a short time $T_3$ [step B7].

Then, the check current judging program judges basing on the detected value of electric current i [step B8]. If the detected electric current i is larger than the standard electric current J for finishing charging, the control step returns to the step B2, and the above steps are repeated. Otherwise, the charging equipment stops charging the secondary battery 1 [step B9].

At the above mentioned step B4, if the voltage e detected by the voltage detection part 9 is larger than the lower special charging voltage $E_{s1}$, the charging equipment switches applied voltage from the lower special charging voltage $E_{s1}$ to the higher special charging voltage $E_{sh}$, and applies the higher special charging voltage $E_{s1}$ to the secondary battery 1 for a determined time $T_1$ [step B10].

After the determined time $T_1$ passes, the charging equipment short-circuits the secondary battery 1 between its terminals for an extremely short time $T_2$ [step B11] so as to remove electric charge from the electrode interface of the secondary battery 1. Then, the charging equipment switches applied voltage from the higher special voltage $E_{sh}$ to the higher equilibrium voltage $E_{eqh}$, and applies the higher equilibrium voltage $E_{eqh}$ to the secondary battery 1 for a short time $T_3$ [step B12].

If the short time $T_3$ is set to more than 1 second, the above-mentioned step B11 may be omitted.

The charging equipment detects a value of electric current i flowing through the secondary battery 1 during the application of the higher equilibrium voltage $E_{eqh}$ to the secondary battery 1 for a short time $T_3$ [step B13].

Then, the check current judging program judges basing on the detected value of electric current i [step B14]. If the detected electric current i is larger than the standard electric current J for finishing charging, the control step returns to the step B10, and the above steps are repeated. Otherwise, the charging equipment stops charging the secondary battery 1 [step B9].

The foregoing explanation has been given of charge control by the charging equipment wherein the storage means in the control part 4 stores two values of equilibrium voltage $E_{eq1}$ and $E_{eqh}$ and two values of special charging voltage $E_{s1}$ and $E_{sh}$ corresponding to two kinds of secondary batteries.

Figure 12:
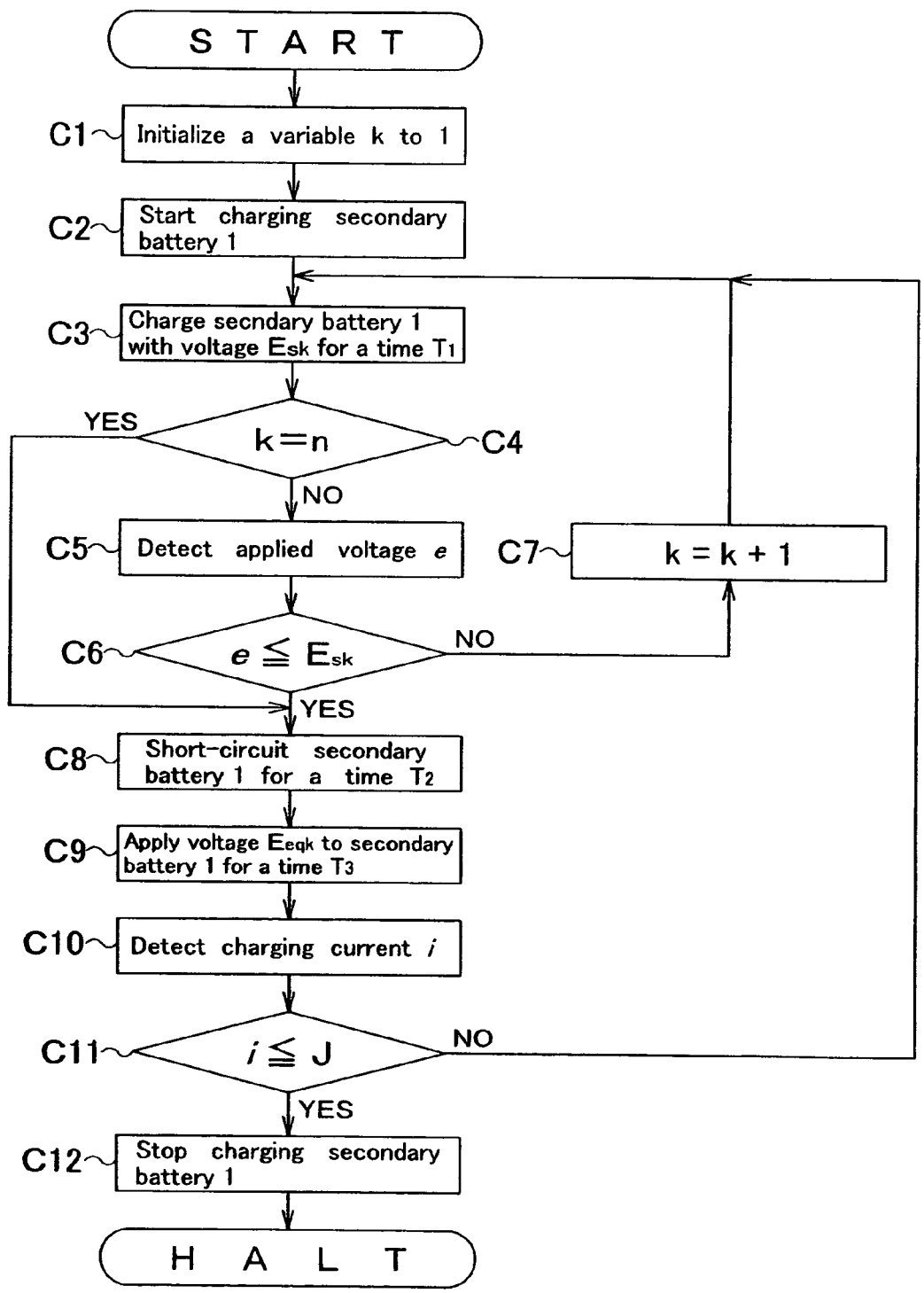
FIG. 12 is a flow chart of charging control of a secondary battery 1 by the charging equipment according to the second embodiment.

The flow of charge control of the secondary battery 1 by the charging equipment of the second embodiment, wherein the storage means in the control part 4 stores n values of equilibrium voltage $E_{eq}$ ($E_{eq1}$, $E_{eq2}$, ... $E_{eqn}$) and n values of special charging voltage $E_s$ ($E_{s1}$, $E_{s2}$, ... $E_{sn}$) corresponding to respective n (n is a natural number more than 1) different kinds of secondary batteries, will be explained referring to the flow chart shown in FIG. 12.

The voltages $E_{eq1}$, $E_{eq2}$, ... $E_{eqn}$ and the voltages $E_{s1}$, $E_{s2}$, ... $E_{sn}$ are ranked from the minimum to the maximum.

First of all, a counter variable k (k=1,2, ... ,n) is initialized to 1 [step C1]. A user manipulates the operation part 8 of the charging equipment to start charging [step C2]. Accordingly, the kth smallest special charging voltage $E_{sk}$ of the n special charging voltages is applied to the secondary battery 1 set in the charging equipment for a determined time (a fixed time) $T_1$ [step C3].

If the k is equal to n [step C4], the control step jumps to the below mentioned step C8. If the k is not larger than n−1, the voltage detection part 9 detects voltage e applied to the secondary battery 1 while the determined time $T_1$ of applying the kth smallest special charging voltage $E_{sk}$ to the secondary battery 1 [step C5], and the voltage judging program judges basing on the detected voltage e [step C6]. If the detected voltage e is larger than the kth smallest special charging voltage $E_{sk}$, the rank of k increments by 1 [step C7], and the control step returns to the step C3. Otherwise, the control step goes to the next step C8.

After the determined time $T_1$ passes, the charging equipment short-circuits the secondary battery 1 between its terminals for an extremely short time $T_2$ [step C8] so as to remove electric charge from the electrode interface of the secondary battery 1. Then, the charging equipment switches applied voltage from the kth smallest special charging voltage $E_{sk}$ to the kth smallest equilibrium voltage $E_{eqk}$, and applies the kth smallest equilibrium voltage $E_{eq}$ k to the secondary battery 1 for a short time $T_3$ [step C9].

If the short time $T_3$ is set to more than 1 second, the above-mentioned step C8 may be omitted.

The charging equipment detects electric current i flowing through the secondary battery 1 while the short time $T_3$ of applying the kth smallest equilibrium voltage $E_{eqk}$ to the secondary battery 1 [step C10].

Then, the check current judging program judges basing on the detected value of electric current i [step C11]. If the detected electric current i is larger than the standard electric current J for finishing charging, the control step returns to the step C3, and the above steps are repeated. Otherwise, the charging equipment stops charging the secondary battery 1 [step C12].

As mentioned above, the charging equipment of the second embodiment has the same effect as that of the first embodiment. Additionally, the charging equipment of the second embodiment automatically identifies the kind of secondary battery 1 in the process of charge, thereby rapidly and appropriately charging the secondary battery 1 to its fully charged condition without causing excessive chemical reaction (oxidation-reduction reaction) in the secondary battery 1.

THIRD EMBODIMENT OF CHARGING EQUIPMENT FOR SECONDARY BATTERY

A charging equipment for a secondary battery 1 according to the third embodiment of the present invention will be explained.

The charging equipment of the third embodiment has such characteristic different from the second embodiment that it judges whether a difference Δe between voltage e detected by the voltage detection part 9 during the last application of the special charging voltage $E_s$ and voltage e detected by the voltage detection part 9 during the present application of the special charging voltage $E_s$ is within a standard range W or not. If the voltage difference Δe is not within the standard range W, it switches applied voltage to new equilibrium voltage $E_{eq}$ and special charging voltage $E_s$ corresponding to another kind of secondary battery1 and charges the secondary battery 1 with the new equilibrium voltage $E_{eq}$ and special charging voltage $E_s$.

The charging equipment of the third embodiment is configured similarly with that shown in FIG. 1. The storage means (memory) in the control part 4 stores equilibrium voltages $E_{eq}$ and special charging voltages $E_s$ corresponding to respective kinds of secondary batteries. The control part 4 has a check current judging program and a voltage difference judging program. The check current judging program serves as means for judging whether electric current i detected by the current detection part 3 during application of the equilibrium voltage $E_{eq}$ is larger than a preset standard electric current J for finishing charging or not. The voltage difference judging program serves as means for judging whether the voltage difference Δe between voltage e detected by the voltage detection part 9 during the last application of the special charging voltage $E_s$ and voltage e detected by the voltage detection part 9 during the present application of the special charging voltage $E_s$ is within the preset standard range W or not.

Explanation of other parts in the charging equipment of the third embodiment is omitted because they are similar with those of the first embodiment.

Figure 13:
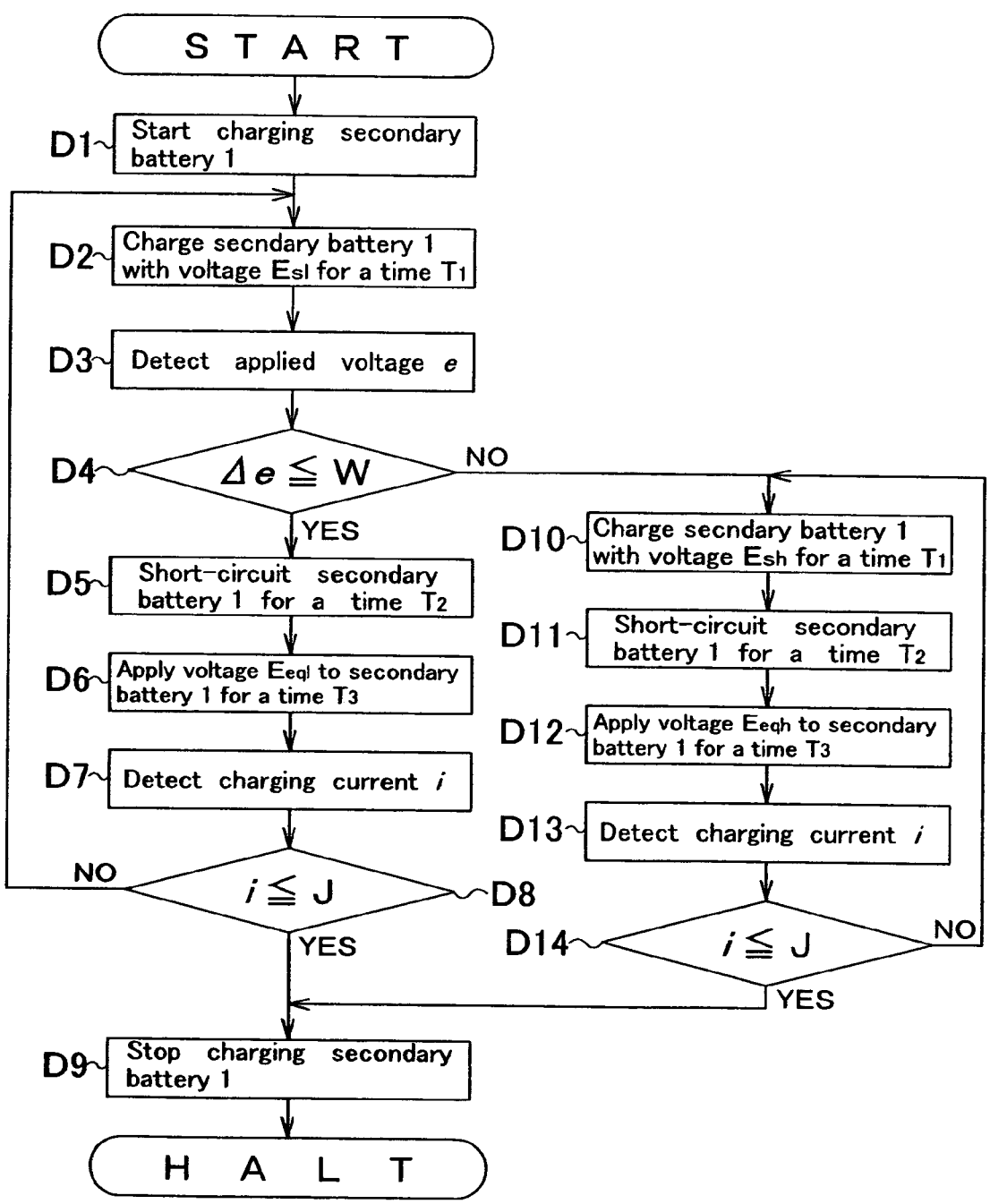
FIG. 13 is a flow chart of charging control of a secondary battery 1 by the charging equipment according to the third embodiment.

The flow of charge controlling the secondary battery 1 by the charging equipment of the third embodiment, wherein the storage means in the control part 4 stores two equilibrium voltages $E_{eq}$ ($E_{eql}$, $E_{eqh}$) and two special charging voltages $E_s$ ($E_{s1}$, $E_{sh}$) corresponding to two kinds of secondary batteries, will be explained referring to the flow chart shown in FIG. 13.

The equilibrium voltage $E_{eql}$ is lower than the equilibrium voltage $E_{eqh}$, and the special charging voltage $E_{s1}$ is lower than the special charging voltage $E_{sh}$.

First of all, a user manipulates the operation part 8 of the charging equipment to start charging [step D1]. Accordingly, the charging equipment applies the lower special charging voltage $E_{s1}$ to the secondary battery 1 for a determined time (a fixed time) $T_1$ [step D2].

The voltage detection part 9 detects voltage e applied to the secondary battery 1 while the determined time $T_1$ of applying the lower special charging voltage $E_{s1}$ to the secondary battery1 [step D3], and the voltage difference judging program judges whether the voltage difference Δe between voltage e detected by the voltage detection part 9 during the last application of the special charging voltage $E_s$ and voltage e detected by the voltage detection part 9 during the present application of the special charging voltage $E_s$ is within the preset standard range W or not [step D4]. If the voltage detection is the first time, the control step goes to the next step D5 without judging the voltage difference Δe. If the voltage difference Δe is within the standard range W, the control step goes to the next step D5. Otherwise, the control step jumps to the later-mentioned step D10.

After the determined time $T_1$ passes, the charging equipment short-circuits the secondary battery 1 between its terminals for an extremely short time $T_2$ [step D5] so as to remove electric charge from the electrode interface of the secondary battery 1. Then, the charging equipment switches applied voltage to the lower equilibrium voltage $E_{eql}$, and applies the lower equilibrium voltage $E_{eq}$ to the secondary battery 1 for a short time $T_3$ [step D6].

If the short time $T_3$ is set to more than 1 second, the above-mentioned step D5 may be omitted.

The charging equipment detects electric current i flowing through the secondary battery 1 while the short time $T_3$ of applying the lower equilibrium voltage $E_{eqh}$ to the secondary battery 1 [step D7].

Then, the check current judging program judges basing on the detected electric current i [step D8]. If the detected electric current i is larger than the standard electric current J for finishing charging, the control step returns to the step D2, and the above steps are repeated. Otherwise, the charging equipment stops charging the secondary battery 1 [step D9].

At the above mentioned step D4, if the above-mentioned voltage difference Δe is not within the standard range W, the charging equipment switches applied voltage to the higher special charging voltage $E_{sh}$, and applies the higher special charging voltage $E_{sh}$ to the secondary battery 1 for a determined time $T_1$ [step D10].

After the determined time $T_1$ passes, the charging equipment short-circuits the secondary battery 1 between its terminals for an extremely short time $T_2$ [step D11] so as to remove electric charge from the electrode interface of the secondary battery 1. Then, the charging equipment switches applied voltage to the higher equilibrium voltage $E_{eqh}$, and applies the higher equilibrium voltage $E_{eqh}$ to the secondary battery 1 for a short time $T_3$ [step D12].

If the short time $T_3$ is set to more than 1 second, the above-mentioned step D11 may be omitted.

The charging equipment detects electric current i flowing through the secondary battery 1 while the short time $T_3$ of applying the higher equilibrium voltage $E_{eqh}$ to the secondary battery 1 [step D13].

Then, the check current judging program judges basing on the detected electric current i [step D14]. If the detected electric current i is larger than the standard electric current J for finishing charging, the control step returns to the step D10, and the above steps are repeated. Otherwise, the charging equipment stops charging the secondary battery 1 [step D9].

The foregoing explanation has been given of charge control by the charging equipment wherein the storage means in the control part 4 stores two equilibrium voltages $E_{eql}$, $E_{eqh}$ and two special charging voltages $E_{sl}$, $E_{sh}$ corresponding to two kinds of secondary batteries.

Figure 14:
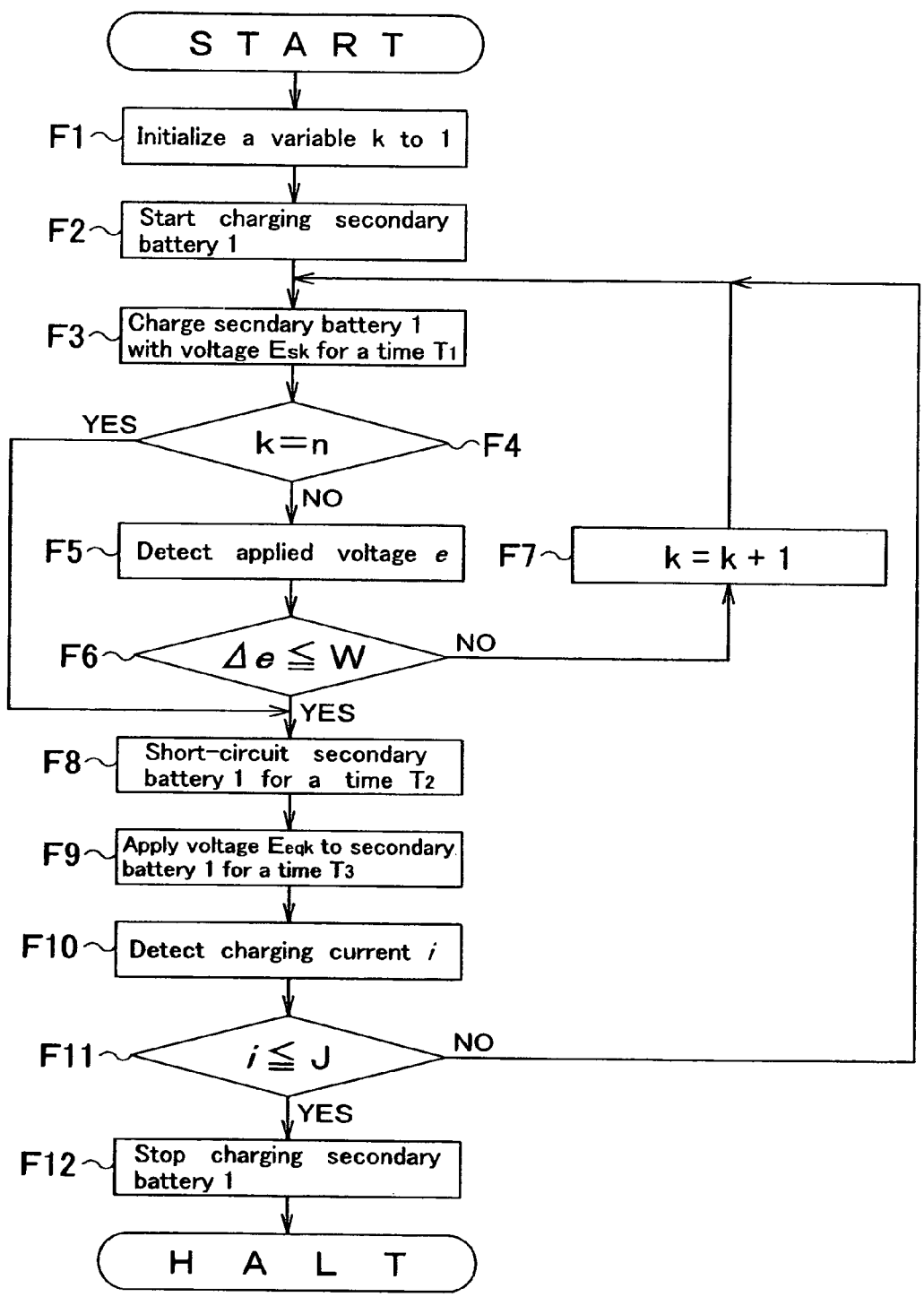
FIG. 14 is a flow chart of charging control of a secondary battery 1 by the charging equipment according to the third embodiment.

The control flow of charging the secondary battery 1 by the charging equipment of the third embodiment, wherein the storage means in the control part 4 stores equilibrium voltages $E_{eq}$ ($E_{eq1}$, $E_{eq2}$, ... $E_{eqn}$) and special charging voltages $E_s$ ($E_{s1}$, $E_{s2}$, ... $E_{sn}$) corresponding to n (n is a natural number more than 1) different kinds of secondary batteries, will be explained referring to the flow chart shown in FIG. 14.

Voltages $E_{eq1}$, $E_{eq2}$, ... $E_{eqn}$ and voltages $E_{s1}$, $E_{s2}$, ... $E_{sn}$, are ranked from the minimum to the maximum.

First of all, a counter variable k (k=1,2, ... ,n) is initialized to 1 [step F1]. A user manipulates the operation part 8 of the charging equipment to start charging [step F2]. Accordingly, the kth smallest special charging voltage $E_{sk}$ of the n special charging voltages to the secondary battery 1 set in the charging equipment for a determined time (a fixed time) $T_1$ [step F3].

If the k is equal to n [step F4], the control step jumps to the later-discussed step F8. If the k is equal to or smaller than n−1, the voltage detection part 9 detects voltage e applied to the secondary battery 1 while the determined time $T_1$ of applying the kth smallest special charging voltage $E_{sk}$ to the secondary battery 1 [step F5]. The voltage difference judging program judges whether the voltage difference Δe between the voltage e detected by the voltage detection part 9 during the last application of the special charging voltage $E_s$ and the voltage e detected by the voltage detection part 9 during the present application of the special charging voltage $E_s$ is within the preset standard range W or not [step F6]. If the voltage difference Δe is within the standard range W, the control step goes to the below-mentioned step F8. Otherwise, the rank of k increments by 1 [step F7], and the control step returns to the step F3. If the voltage detection if the first time, the control step goes to the next step F8 without judging the voltage difference Δe.

After the determined time $T_1$ passes, the charging equipment short-circuits the secondary battery 1 between its terminals for an extremely short time $T_2$ [step F8] so as to remove electric charge from the electrode interface of the secondary battery 1. Then, the charging equipment switches applied voltage to the kth smallest equilibrium voltage $E_{eq}$ k, and applies the kth smallest equilibrium voltage $E_{eqk}$ to the secondary battery for a short time $T_3$ [step F9].

If the short time $T_3$ is set to more than 1 second, the above-mentioned step F8 may be omitted.

The charging equipment detects electric current i flowing through the secondary battery 1 while the short time $T_3$ of applying the kth smallest equilibrium voltage $E_{eqk}$ to the secondary battery 1 [step F10].

Then, the check current judging program judges basing on the detected electric current i [step F11]. If the detected electric current i is larger than the standard electric current J for finishing charging, the control step returns to the step F3, and the above steps are repeated. Otherwise, the charging equipment stops charging the secondary battery 1 [step F12].

The foregoing charging equipment of the third embodiment has the same effect as the charging equipment of the first embodiment. Additionally, the charging equipment of the third embodiment identifies the kind of secondary battery 1 automatically in the process of charge, thereby rapidly and appropriately charging the secondary battery 1 without causing excessive chemical reaction (oxidation-reduction reaction) in the secondary battery 1 till its fully charged condition.

FOURTH EQUIPMENT FOR CHARGING EQUIPMENT FOR SECONDARY BATTERY

A charging equipment for a secondary battery 1 according to the fourth embodiment of the present invention will be explained.

The charging equipment of the fourth embodiment has such characteristic different from the first embodiment that it breaks off voltage applied to the secondary battery 1 after application of special charging voltage $E_s$ for a determined time $T_1$, and detects the voltage difference $\Delta E_s$ between the special charging voltage $E_s$ and open-circuit voltage E ($E_\alpha$, $E_\beta$, $E_\gamma$, $E_\delta$ etc.) of the secondary battery 1. If the voltage difference $\Delta E_s$ is not larger than the standard value K, it stops charging the secondary battery 1.

The control part 4 has a voltage difference computing program, a charge time predicting program, and a voltage difference judging program. The voltage difference computing program serves as means for computing the voltage difference $\Delta E_s$ between the special charging voltage $E_s$ and the open-circuit voltage E ($E_\alpha$, $E_\beta$, $E_\gamma$, $E_\delta$ etc.) of the secondary battery 1. The charge time predicting program serves as means for estimating the necessary time $\tau$ to fully charge the secondary battery 1 basing on the voltage difference $\Delta E_s$. The voltage difference judging program serves as means for judging whether the voltage difference $\Delta E_s$ is larger than a preset standard value K or not. The necessary time $\tau$ computed basing on the voltage difference $\Delta E_s$ is indicated on the display part 7 with such as LED and LCD.

The charging equipment of the fourth embodiment comprises the display part 7 as an example of information means which indicates the necessary timer to fully charge the secondary battery 1 to a user through his/her eyes. However, the charging equipment may have any other information means which informs a user with sound etc. instead of the display part 7.

The standard value K of the charging equipment of the fourth embodiment is a difference between the special charging voltage $E_s$ and the equilibrium voltage $E_{eq}$ which is equal to the open-circuit voltage E of the fully charged secondary battery 1 ($K=E_s-E_{eq}$). The charging equipment needs to be designed for controlling charge of the secondary battery 1 so that the open-circuit voltage $E_x$ should be detected in the high impedance state where electric current does not flow through the target for measuring, such as the state where electric current does not flow through the secondary battery 1 to which the equilibrium voltage is applied.

Figure 15:
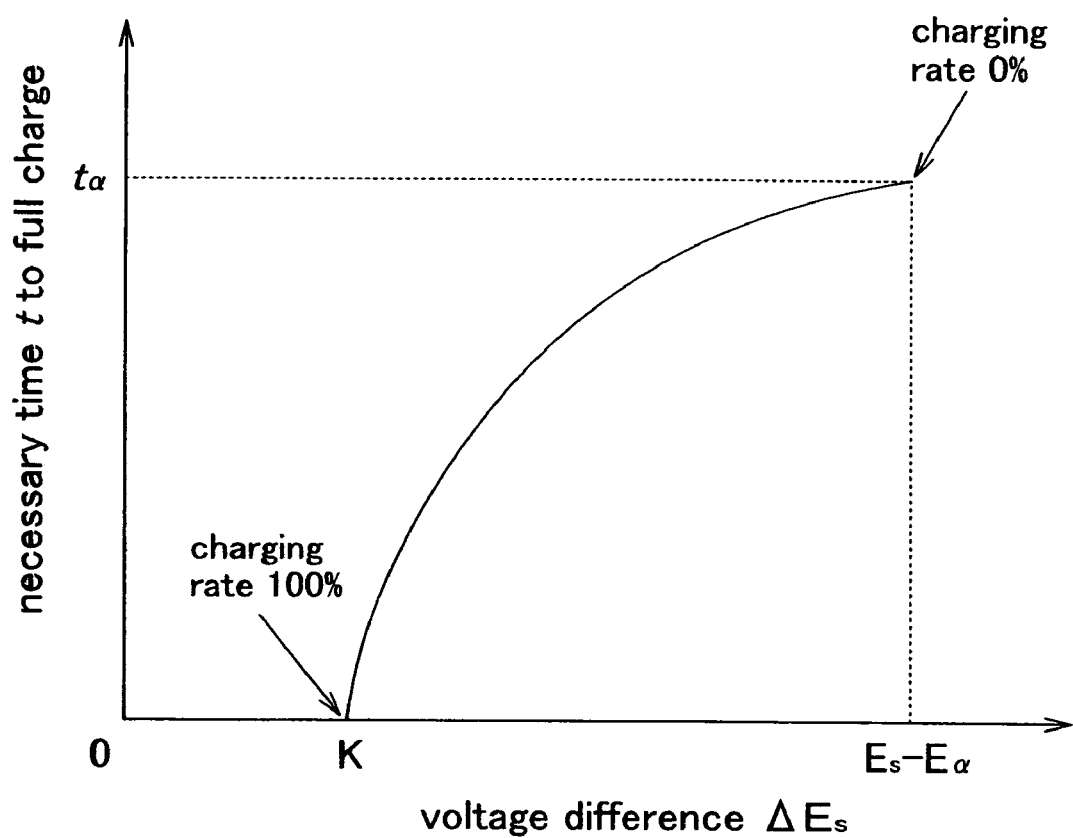
FIG. 15 is a graph showing a relation of voltage difference $\Delta E_s$, which equals special charging voltage $E_s$ minus open-circuit voltage $E_x$ of a secondary battery 1, to the necessary time for fully charging.

The necessary time $\tau$ to fully charge the secondary battery 1 will be explained. The necessary time $\tau$ is got from the graph in FIG. 15 showing the relation between the voltage difference $\Delta E_s$ and the necessary time $\tau$ to fully charge the secondary battery 1. Referring to FIG. 3, when the secondary battery 1 whose charging rate is approximately 0% is charged, the open-circuit voltage E of is equal to is equal to $E_\alpha$, the voltage difference $\Delta E_s$ is therefore a difference between the voltages $E_s$ and $E_\alpha$ ($\Delta E_s=E_s-E_\alpha$), and the necessary time $\tau$ to fully charge is now assumed to be a time $\tau_\alpha$. It is understood from the graph of FIG. 3 that the necessary time $\tau$ and the voltage difference $\Delta E_s$ are reduced according to the passage of charge of the secondary battery 1. The necessary time $\tau$ to fully charge the secondary battery 1 becomes 0 when the voltage difference $\Delta E_s$ reaches the preset standard value K (in this case, the standard value K is equal to the difference between the voltages $E_s$ and $E_{eq}$ ($K=E_s-E_{eq}$)), or in other words, when the secondary battery 1 is fully charged (its charging rate reaches 100%). Therefore, if the charge time predicting program has this graph, or a relational expression which formulates the relation between the voltage difference $\Delta E_s$ and the necessary timer led from the graph, the necessary timer to fully charge the secondary battery 1 can be estimated basing on the voltage difference $\Delta E_s$.

Explanation of other parts in the charging equipment of the fourth embodiment is omitted because they are similar with those of the first embodiment.

The control flow of charging the secondary battery 1 by the charging equipment of the fourth embodiment will be explained referring to the flow chart shown in FIG. 16.

First of all, a user inputs data about a kind of secondary battery 1 to be charged to the control part 4 by manipulating the operation part 8, so as to select special charging voltage $E_s$ and equilibrium voltage $E_{eq}$ in correspondence to the kind of secondary battery 1 from a table of the storage means in the control part 4 [step G1].

The user manipulates the operation part 8 to start charging [step G2]. Accordingly, the charging equipment applies the corresponding special charging voltage $E_s$ to the secondary battery 1 for a determined time (a fixed time) $T_1$ [step G3]. The determined time $T_1$ is calculated basing on variation of charging electric current according to the time progress during the application of the special charging voltage $E_s$.

After the determined time $T_1$ passes, the charging equipment breaks off application of the special charging voltage $E_s$ for a time $T_4$ [step G4]. In the meanwhile, the voltage detection part 9 detects open-circuit voltage E $E_\alpha$, $E_\beta$, $E_\gamma$, $E_\delta$, etc.) of the secondary battery 1 [step G5], and the voltage difference $\Delta E_s$ between the special charging voltage $E_s$ and the open-circuit voltage $E_x$ is computed [step G6].

Then, the voltage difference judging program judges basing on this computed voltage difference $\Delta E_s$ [step G7]. If the computed voltage difference $\Delta E_s$ is larger than the standard value K, the control step returns to the step G3, and the above steps are repeated. Otherwise, the charging equipment assumes that the secondary battery 1 is fully charged, and it stops charging the secondary battery 1 [step G8].

Figure 16:
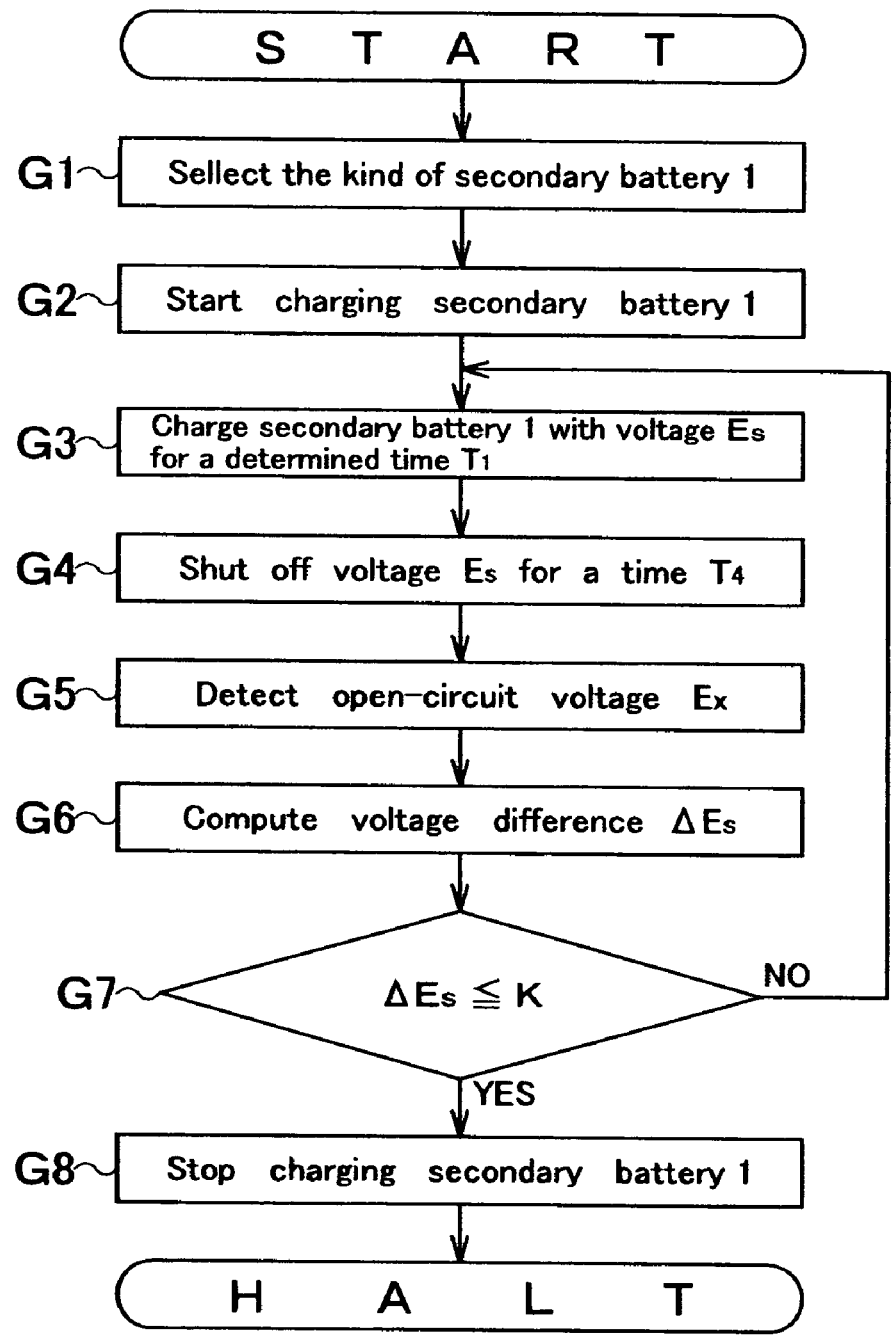
FIG. 16 is a flow chart of charging control of a secondary battery 1 by a charging equipment according to a fourth embodiment of the present invention.

Incidentally, the necessary time $\tau$ to fully charge the secondary battery 1 can be calculated basing on the computed value of voltage difference $\Delta E_s$, though it is not written in the flow chart of FIG. 16. This charging equipment indicates the necessary timer to fully charge the secondary battery 1 on the display part 7 for users' convenience. The charging time $T_1$ when applying the special charging voltage $E_s$ varies according to the battery's capacity, structure, form, or the like. If the secondary battery 1 is an AA size nickel-cadmium battery or an AA size nickel-hydrogen battery, for example, the charging time $T_1$ is set to a time between 60 seconds and 90 seconds. The break-off time $T_4$ is determined as a time required for the voltage applied between the terminals of the secondary battery 1 to become so stable as to be measured. If the above-mentioned battery serves as the secondary battery 1 to be charged, the break-off time $T_4$ is set to a time between 1 second and 5 seconds. The charging equipment of the fourth embodiment controlling the voltage applied to the secondary battery 1 and periodically checking the charged condition of the secondary battery 1 by the above method can appropriately charge the secondary battery 1 without causing excessive damaging chemical reaction (oxidation-reduction reaction) therein, thereby increasing effective battery cycles of the secondary battery 1. Also, the charging equipment using the above method can accurately judge whether the secondary battery 1 is fully charged or not, because it detects the voltage difference between the special charging voltage $E_s$ and the open-circuit voltage $E_x$ of the secondary battery 1. Additionally, the charging equipment can remarkably reduce the charging time because it supplies the secondary battery 1 with pretty large charging current by mainly applying the special charging voltage $E_s$ larger than the equilibrium voltage $E_{eq}$.

FIFTH EMBODIMENT OF CHARGING EQUIPMENT FOR SECONDARY BATTERY

A charging equipment for a secondary battery 1 according to the fifth embodiment of the present invention will be explained.

The charging equipment of the fifth embodiment has such characteristic different from the first embodiment that its control part 4 has a voltage difference judging program for comparing a difference $\Delta E_{eq}$ between the equilibrium voltage $E_{eq}$ and open-circuit voltage E ($E_\alpha$, $E_\beta$, $E_\gamma$, $E_\delta$, etc.) of the secondary battery 1 with standard voltage of 0V, so that, if the volt difference $\Delta E_{eq}$ is larger than 0V, the special charging voltage $E_s$ is applied to the secondary battery 1 and the charge control are repeated; otherwise, it is assumed that the secondary battery 1 is fully charged, thereby halting charge control of the secondary battery1.

Explanation of other parts in the charging equipment of the fifth embodiment is omitted because they are similar with those of the fourth embodiment.

Figure 17:
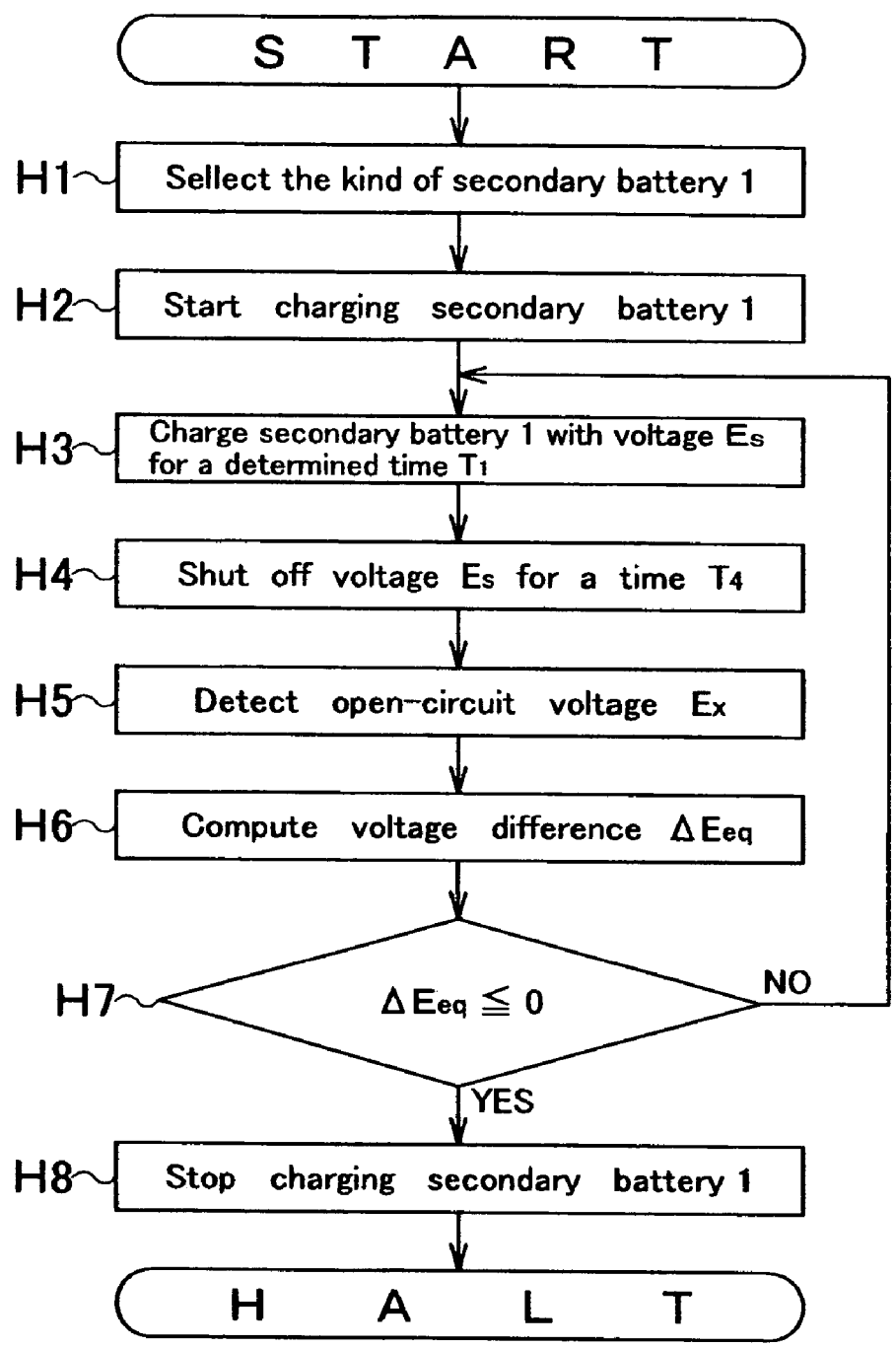
FIG. 17 is a flow chart of charging control of a secondary battery 1 by a charging equipment according to a fifth embodiment of the present invention.

The control flow of charging the secondary battery 1 by the charging equipment of the fifth embodiment will be explained referring to the flow chart shown in FIG. 17.

First of all, a user inputs data of a kind of secondary battery 1 to be charged to the control part 4 by manipulating the operation part 8, so as to select special charging voltage $E_s$ and equilibrium voltage $E_{eq}$ in correspondence to the kind of secondary battery 1 from a table of the storage means in the arithmetic and control part 4 [step H1].

The user manipulates the operation part 8 to start charging [step H2]. Accordingly, the charging equipment applies the corresponding special charging voltage $E_s$ to the secondary battery 1 for a determined time (a fixed time) $T_1$ [step H3].

After the determined time $T_1$ passes, the charging equipment breaks off application of the special charging voltage $E_s$ for a time $T_4$ [step H4]. In the meanwhile, the voltage detection part 9 detects open-circuit voltage E $E_\alpha$, $E_\beta$, $E_\gamma$, $E_\delta$, etc.) of the secondary battery 1 [step H5].

The control flow from the step H1 to the step H5 according to the fifth embodiment is similar with that from the step G1 to the step G5 according to the fourth embodiment. Next, the voltage difference computing program computes the voltage difference $\Delta E_{eq}$ between the equilibrium voltage $E_{eq}$ and the open-circuit voltage E of the secondary battery 1 [step H6].

Then, the voltage difference judging program judges basing on this computed voltage difference $\Delta E_{eq}$ [step H7]. When the computed voltage difference $\Delta E_{eq}$ is larger than the standard value of 0V, the control step returns to the step H3, and the above steps are repeated. Otherwise, the charging equipment recognizes that the secondary battery 1 is fully charged, and it stops charging the secondary battery 1 [step H8].

By the charging equipment of the fifth embodiment using the above-mentioned method, any kind of secondary battery 1 can be easily and accurately assumed to be fully charged when the voltage difference $\Delta E_{eq}$ is not larger than 0V.

Instead of computing the voltage difference $\Delta E_{eq}$ between the equilibrium voltage $E_{eq}$ and the open-circuit voltage E of the secondary battery 1, the charging equipment may alternatively compare the open-circuit voltage E with the equilibrium voltage $E_{eq}$. If the open-circuit voltage E is smaller than the equilibrium voltage $E_{eq}$, the special charging voltage $E_s$ higher than the equilibrium voltage $E_{eq}$ is applied to the secondary battery 1 and the charge control steps are repeated; otherwise, charging the secondary battery 1 is halted.

SIXTH EMBODIMENT OF CHARGING EQUIPMENT FOR SECONDARY BATTERY

A charging equipment for a secondary battery 1 according to the sixth embodiment of the present invention will be explained.

The charging equipment of the sixth embodiment has such a characteristic different from the first embodiment that it stops charging the secondary battery 1 after the necessary time t computed basing on the detected check electric current i passes.

The charging equipment of the sixth embodiment is configured similarly with that of FIG. 1. Its control part 4 has a charge time predicting program and an observation program. The charge time predicting program serves as means for estimating the necessary time t to fully charge the secondary battery 1 basing on the detected electric current i during application of the equilibrium voltage $E_{eq}$ to the secondary battery 1. The observing program serves as means for observing the passage of necessary time t from the moment when the necessary time t is computed.

Figure 18:
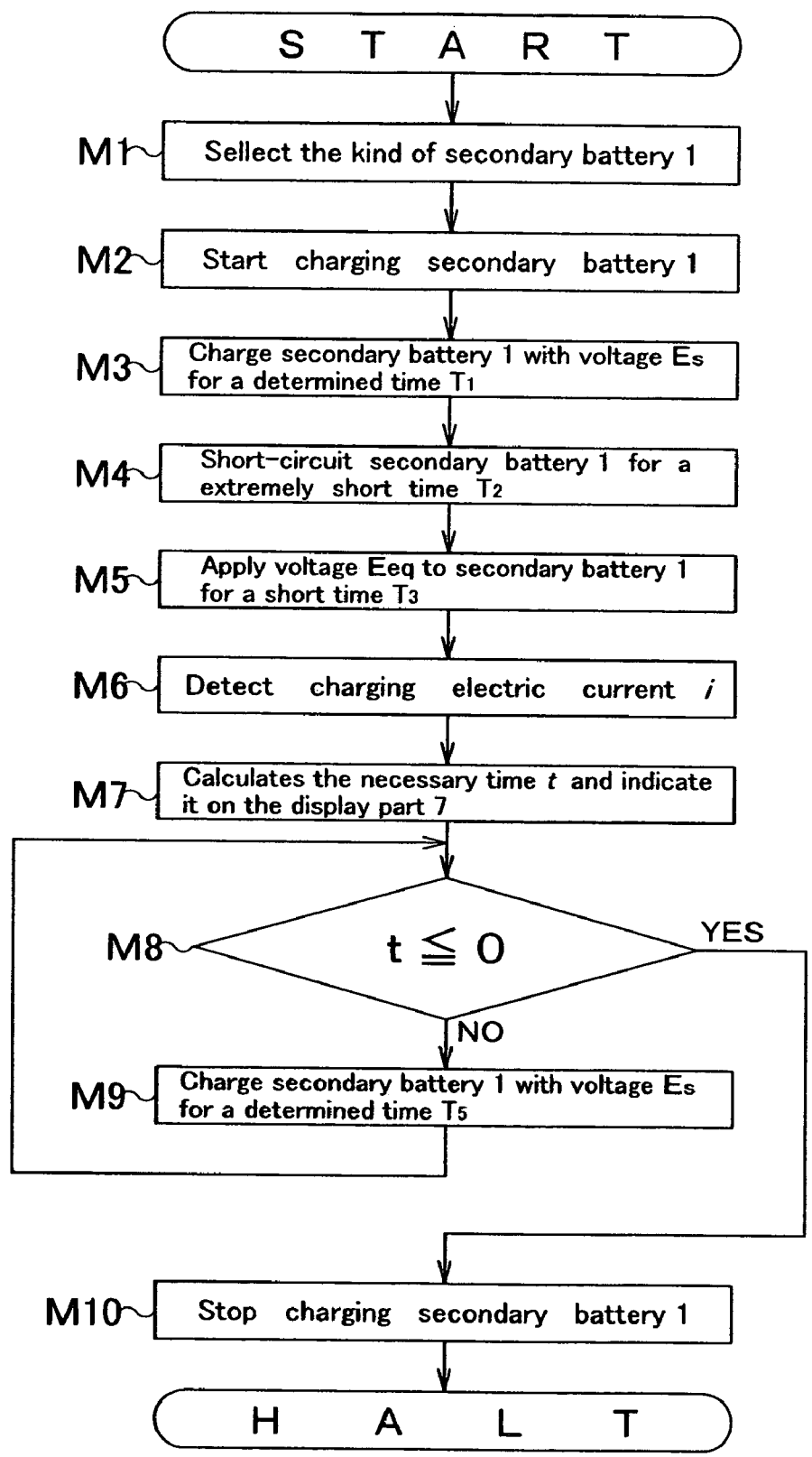
FIG. 18 is a flow chart of charging control of a secondary battery 1 by a charging equipment according to a sixth embodiment of the present invention.

The control flow of charging the secondary battery 1 by the charging equipment of the sixth embodiment will be explained referring to the flow chart shown in FIG. 18.

First of all, a user inputs data of a kind of secondary battery 1 to be charged to the control part 4 by manipulating the operation part 8, so as to select special charging voltage $E_s$ and equilibrium voltage $E_{eq}$ in correspondence to the kind of secondary battery 1 from a table of the storage means in the control part 4 [step M1].

The user manipulates the operation part 8 to start charging [step M2]. Accordingly, the charging equipment applies the corresponding special charging voltage $E_s$ to the secondary battery 1 for a determined time (a fixed time) $T_1$ [step M3].

After the determined time $T_1$ passes, the charging equipment short-circuits the secondary battery 1 between its terminals for an extremely short time $T_2$ [step M4] so as to remove electric charge from the electrode interface of the secondary battery 1. Then, the charging equipment switches applied voltage to the equilibrium voltage $E_{eq}$, and applies the equilibrium voltage $E_{eq}$ to the secondary battery 1 for a short time $T_3$ [step M5].

If the short time $T_3$ is set to more than 1 second, the above-mentioned step M4 may be omitted.

The charging equipment detects a value of electric current i flowing through the secondary battery 1 while the short time $T_3$ of applying the equilibrium voltage $E_{eq}$ to the secondary battery 1 [step M6]. Next, the charge time predicting program calculates the necessary time t to fully charge the secondary battery 1 basing on the detected value of electric current i, that is, the time t required for the detected electric current i to reach the standard electric current J for finishing charging (that is a value of electric current detected at the fully charged condition), and the necessary time t is indicated on the display part 7 [step M7].

This control flow from the step M1 to the step M7 according to the sixth embodiment is the same with that from the step A1 to the step A7 according to the first embodiment. Next, the observation program judges whether the necessary time t to fully charge is more than 0 second or not [step M8]. If the necessary time t to fully charge is more than 0 second, the control step goes to the step M9 so as to apply the special charging voltage $E_s$ to the secondary battery 1 for a time $T_5$ [step M8]. After the time $T_5$ passes, the control step returns to the step M8, and the observation program judges whether the necessary time t to fully charge has passed or not. At the step M8, if the necessary time t to fully charge is not more than 0 second, in other words, if the necessary time t to fully charge has passed, the charging equipment decides that the secondary battery 1 is fully charged, and it stops charging the secondary battery 1 automatically [step M10].

Explanation of other parts in the charging equipment of the sixth embodiment is omitted because they are similar with those of the first embodiment.

In the flow chart for controlling the charging equipment shown in FIG. 9, once the necessary time t to fully charge is calculated basing on the detected electric current i, the charging equipment continues application of the special charging voltage $E_s$ to the secondary battery 1, and after the necessary time t has passed, the charging equipment stops charging the secondary battery 1 automatically. Alternatively, at the above-mentioned step M8, if the necessary time t is more than 0 second, the control step may return to the step M3, and the above-mentioned charge control steps may be repeated; otherwise the charging equipment stops charging the secondary battery 1.

As mentioned above, the charging equipment automatically stopping charging a secondary battery after the necessary time t passes can be configured simply and surely stop charge of the secondary battery. According to this charging equipment, the secondary battery 1 can be charged appropriately without causing excessive damaging chemical reaction (oxidation-reduction reaction) therein till its fully charged condition, thereby increasing its effective battery cycles. Additionally, it is more convenient for a user to monitor the necessary time t to fully charge the secondary battery 1.

SEVENTH EMBODIMENT OF CHARGING EQUIPMENT FOR SECONDARY BATTERY

A charging equipment for a secondary battery 1 according to the seventh embodiment of the present invention.

The charging equipment of the seventh embodiment has such characteristic different from the first embodiment that it stops charging the secondary battery 1 after the charging rate ρ computed basing on the detected check electric current i reaches a standard value.

The charging equipment of the seventh embodiment is configured similarly with that of FIG. 1. Its control part 4 has a charging rate computing program and a charging rate judging program. The charging rate computing program serves as means for computing the charging rate ρ of the secondary battery 1 at the moment when the current detection part 3 detects electric current i while applying the equilibrium voltage $E_{eq}$ to the secondary battery 1. The charging rate judging program serves as means for judging whether the charging rate ρ computed by the charging rate computing program is larger than a preset standard value L or not.

The above-mentioned FIG. 4 is a graph showing the necessary time t to fully charge a secondary battery 1 relative to detected electric current i in the secondary battery 1 while the equilibrium voltage $E_{eq}$ is applied to the secondary battery 1. Either a conversion table for converting the check current i into the charging rate ρ or a relational expression formulating the relation between the check current i and the charging rate ρ is formed basing on the graph of FIG. 4 about a secondary battery 1 to be charged and it is provided for the charging rate computing program, thereby facilitating for easy computing the charging rate ρ of the secondary battery 1.

Figure 19:
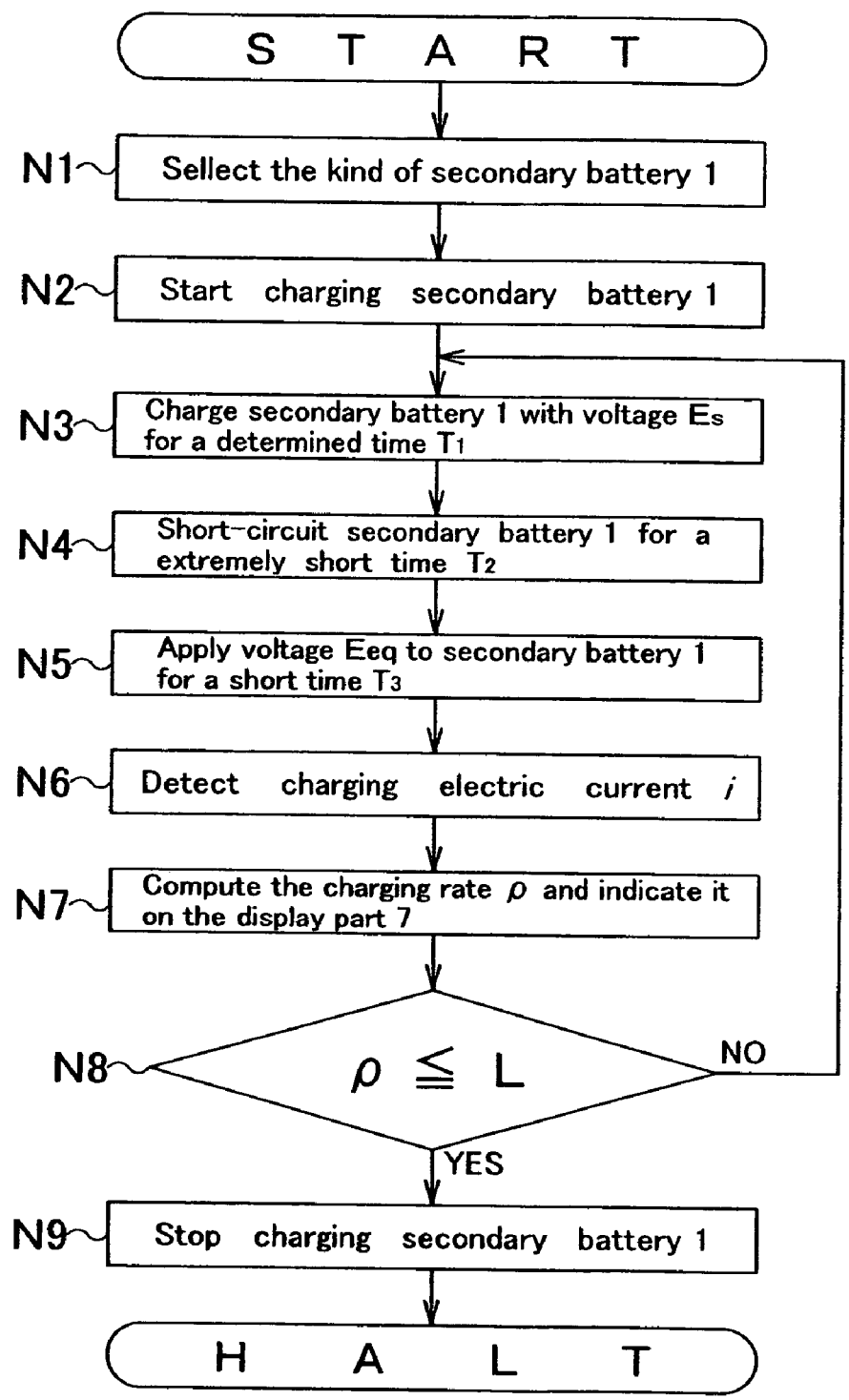
FIG. 19 is a flow chart of charging control of a secondary battery 1 by a charging equipment according to a seventh embodiment of the present invention.

The control flow of charging the secondary battery 1 by the charging equipment of the seventh embodiment will be explained referring to the flow chart shown in FIG. 19.

First of all, a user inputs data of a kind of secondary battery 1 to be charged to the control part 4 by manipulating the operation part 8, so as to select special charging voltage $E_s$ and equilibrium voltage $E_{eq}$ in correspondence to the kind of secondary battery 1 from a table of the storage means in the control part 4 [step N1].

The user manipulates the operation part 8 to start charging [step N2]. Accordingly, the charging equipment applies the corresponding special charging voltage $E_s$ to the secondary battery 1 for a determined time $T_1$ [step N3].

After the determined time $T_1$ passes, the charging equipment short-circuits the secondary battery 1 between its terminals for an extremely short time $T_2$ [step N4] so as to remove electric charge from the electrode interface of the secondary battery 1. Then, the charging equipment switches applied voltage to the equilibrium voltage $E_{eq}$, and applies the equilibrium voltage $E_{eq}$ to the secondary battery 1 for a short time $T_3$ [step N5].

If the short time $T_3$ is set to more than 1 second, the above-mentioned step N4 may be omitted.

The charging equipment detects electric current i flowing through the secondary battery 1 while the short time $T_3$ of applying the equilibrium voltage $E_{eq}$ to the secondary battery 1 [step N6]. This control flow from the step Ni to the step N6 according to the sixth embodiment is the same with that from the step A1 to the step A6 according to the first embodiment. The charging rate computing program computes the charging rate ρ of the secondary battery 1 basing on the detected electric current i, and the computed charging rate ρ is indicated on the display part 7 [step N7].

Then, the charging rate judging program judges basing on the computed charging rate ρ [step N8]. If the charging rate ρ is lower than a standard value L (for example, L=95%), the control step returns to the step N3, and the above steps are repeated. Otherwise, the charging equipment stops charging the secondary battery 1 [step N9].

Explanation of other parts in the charging equipment of the seventh embodiment is omitted because they are similar with those of the first embodiment.

By stopping charging the secondary battery 1 automatically when the charging rate ρ is not lower than the standard value L, the charging equipment can be configured simply for appropriate charge of the secondary battery 1 without causing excessive damaging chemical reaction (oxidation-reduction reaction) therein till its fully charged condition such as to greatly increase effective battery cycles of the secondary battery 1.

Furthermore, it is more convenient for a user to monitor the charging rate ρ of the secondary battery 1.

EIGHTH EMBODIMENT OF CHARGING EQUIPMENT FOR SECONDARY BATTERY

A charging equipment for a secondary battery 1 according to the eighth embodiment of the present invention will be explained.

Figure 20:
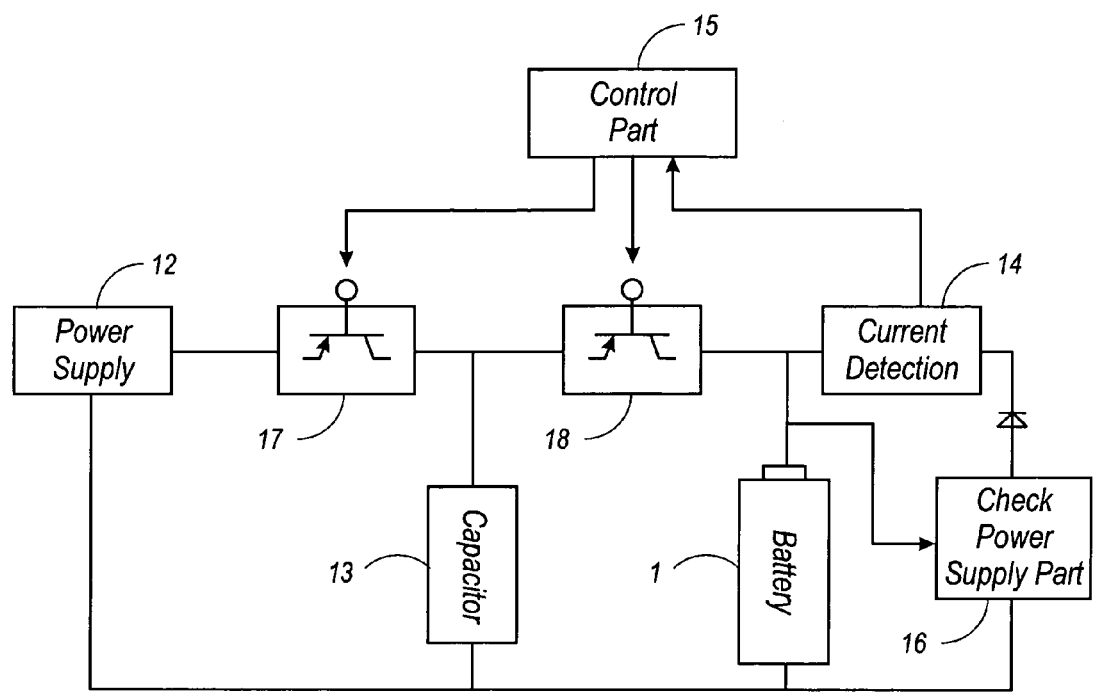
FIG. 20 is a block diagram of a charging equipment for a secondary battery 1 according to an eighth embodiment or a ninth embodiment of the present invention.

The charging equipment of the eighth embodiment is so configured as shown in FIG. 20. A reference numeral 1 designates a secondary battery, and a reference numeral 12 designates a power supply part. The power supply part 2 includes a transformer-rectifier circuit for changing commercial alternating current into direct current. A reference numeral 13 designates a mass capacitor (an electrolysis capacitor, electric double layer capacitor, or the like). Both of the capacitor 13 and the secondary battery 1 are connected in parallel to the power supply part 12. A switch 17 is interposed between the power supply part 12 and the capacitor 13, and a switch 18 is interposed between the capacitor 13 and the secondary battery 1. A reference numeral 14 designates a current detection part from detecting charting electric current flowing to the secondary battery 1. The electric current i detected by the current detection part 14 is transmitted to a control part 15. The control part 15 selectively opens or shuts the switch 17 and the switch 18, and judges whether the secondary battery 1 is fully charged or not. That is to say, the control part 15 has a current judging program serving as means for judging whether the electric current i detected by the current detection part 14 is larger than a preset standard electric current J for finishing charging or not. A reference numeral 16 designates a check power supply part for applying check voltage to the secondary battery 1 basing on the command from the control part 15.

The method for charging the secondary battery 1 by the charging equipment of the eighth embodiment is as follows: The capacitor 13 stores up electricity by applying determined power-supply voltage to the capacitor 13 for a determined time $T_6$, with the switch 17 closed and the switch 18 open. After the determined time $T_6$ passes, electric charge stored in the capacitor 13 is transmitted to the secondary battery 1 by opening the switch 17 and shutting the switch 18. Repeating these control steps, the secondary battery 1 is charged. In this charging flow, the method for judging whether the secondary battery 1 is fully charged or not is as follows: While the capacitor 13 is separated from the secondary battery 1 and stores electric charge, the check power supply part 16 applies check voltage $E_c$ to the secondary battery 1, the current detection part detects electric current i flowing to the secondary battery 1, and the control part 15 judges basing on the detected value of electric current i whether the secondary battery 1 is fully charged.

Figure 21:
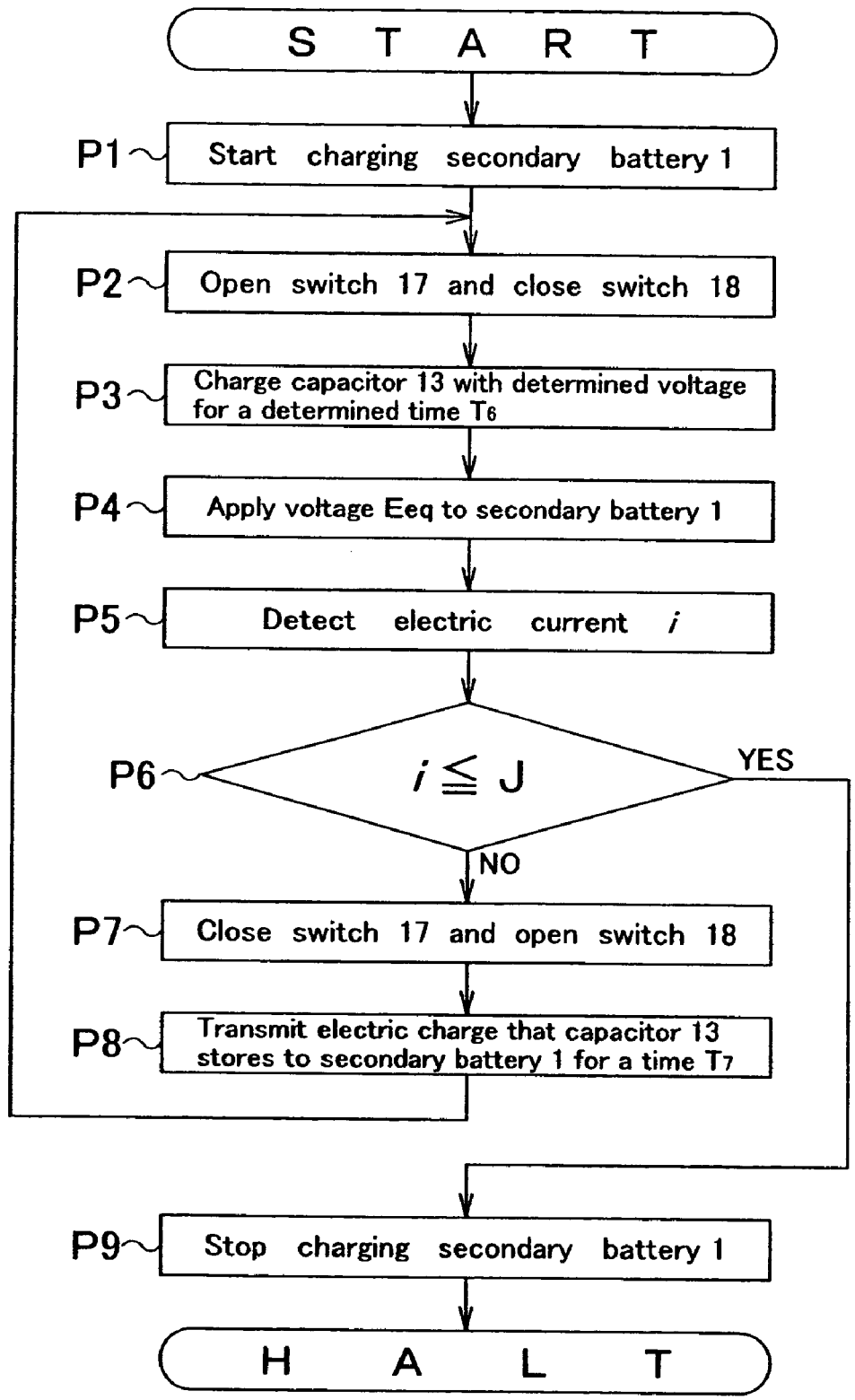
FIG. 21 is a flow chart of charging control of a secondary battery 1 by the charging equipment according to the eighth embodiment.

The control flow of charging the secondary battery 1 by the charging equipment of the eighth embodiment will be explained referring to the flow chart shown in FIG. 21.

First of all, a user manipulates the operation part (not shown) to start charging [step P1]. Accordingly, the control part 15 transmits command to both the switch 17 and the switch 18 on the circuit shown in FIG. 20 such as to shut the switch 17 and open the switch 18 [step P2].

The power supply part 15 applies predetermined power-supply voltage, e.g. voltage higher than the equilibrium voltage $E_{eq}$ to the capacitor 13 having large capacity for a determined time $T_6$ [step P3], whereby the capacitor 13 stores up electricity.

While the capacitor 13 stores electric charge, the check power supply part 16 applies the check voltage to the secondary battery 1 separated from the capacitor 13 [step P4]. In the case of charging by the charging equipment of the eighth embodiment, the check voltage is the equilibrium voltage $E_{eq}$. At this time, the current detection part 14 detects electric current i flowing to the secondary battery 1 [step P5].

Next, the current judging program compares the detected electric current i with the standard electric current J for finishing charging [step P6]. If the detected electric current i is larger than the standard electric current J for finishing charging, the control step goes to the step P7, and the control part 15 transmits a command to both the switch 17 and the switch 18 on the circuit such as to open the switch 17 and close the switch 18, thereby transmitting electricity stored in the capacitor 13 to the secondary battery 1 [step P8]. After a time $T_7$ passes, the control step returns to the step P2 so that the switch 17 is closed and the switch 18 is opened, and the above steps including storing and charging electricity are repeated. If the detected electric current i is not larger than the standard electric current J for finishing charging at the above-mentioned step P6, the charging equipment assumes that the secondary battery 1 is fully charged, and it stops charging the secondary battery 1 [step P9].

The equilibrium voltage $E_{eq}$ is suitable for serving as the check voltage for easily judging whether the secondary battery 1 is fully charged or not, because the electric current becomes almost 0 mA when its charging rate reaches 100% (the fully charged condition), as understood from the graph showing in FIG. 3. However, even if the secondary batteries 1 are identical in classification, the equilibrium voltage $E_{eq}$ of each secondary battery 1 is slightly different from one another. To prevent overcharging in consideration of such situation, the standard voltage J for finishing charging is desirably set to be about 10 mA, for example, considerably higher than 0 mA.

The charging equipment of the eighth embodiment using such a charging method as to transmit electricity stored in the capacitor 13 to the secondary battery 1 facilitates for measuring the amount of electricity charged into the secondary battery 1. Furthermore, the charging equipment using the capacitor 13 having large capacity can charge high electricity, i.e., high electric current to the secondary battery 1 for a short time, thereby reducing the time required for charging. Furthermore, the charging equipment can monitor the charged condition of the secondary battery 1 by periodically detecting the electric current i flowing through the secondary battery 1 while applying the equilibrium voltage (check voltage) $E_{eq}$ to the secondary battery 1 periodically, so that it can charge the secondary battery 1 appropriately till the fully charged condition so as to prevent such overcharging as to cause excessive damaging chemical reaction (oxidation-reduction reaction), thereby increasing effective battery cycles of the secondary battery 1. Also, the check voltage is applied to the secondary battery not from the electric power supply part 12 but from the check electric power supply part 16 so as to enable monitoring the charged condition of the secondary battery during the electricity storing process of the capacitor 13, thereby further reducing the charging time. Furthermore, the charging equipment according to the eighth embodiment is advantageously reliable in its simple structure and its easy charging method.

The foregoing explanation of this charging equipment for a secondary battery 1 of the eighth embodiment is only a concrete example. It may be modified without departing from the scope of appended claims. For example, in the above statement, electric current i is detected while applying the equilibrium voltage $E_{eq}$ to the secondary battery 1, however, another voltage may be alternatively applied for detecting electric current i. The check electric power supply part 16 separated from the electric power supply part 12 facilitates for checking the charged condition of the secondary battery 1 while the electricity-storing duration of the capacitor 13. However, voltage controlled by the electric power supply part 12 may be alternatively applied to the secondary battery 1 for checking the charged condition thereof.

NINTH EMBODIMENT OF CHARGING EQUIPMENT FOR SECONDARY BATTERY

A charging equipment for a secondary battery 1 according to the ninth embodiment of the present invention will be explained.

The charging equipment of the ninth embodiment is configured substantially similarly with that of the eighth embodiment, however, it is different from that the eighth embodiment in that it has no check power supply part 16 and has a check voltage detection part 14 replacing the check current detection part 16 shown in FIG. 20 so as to judge whether the secondary battery 1 is fully charged basing on the detected voltage of the secondary battery 1. This charging equipment of the ninth embodiment is provided with a control part 15 having a voltage judging program serving as means for judging whether the open-circuit voltage E ($E_\alpha$, $E_\beta$, $E_\gamma$, $E_\delta$, etc.) of the secondary battery 1 is larger than its equilibrium voltage $E_{eq}$.

To explain the method for judging concretely, the charging equipment detects the open-circuit voltage E ($E_\alpha$, $E_\beta$, $E_\gamma$, $E_\delta$, etc.) of the secondary battery 1 while the capacitor 13 stores up electricity, that is, while the connection between the capacitor 13 and the secondary battery 1 is broken. If the detected open-circuit voltage E is smaller than the equilibrium voltage $E_{eq}$, the charging equipment keeps up charging process. Otherwise, the charging equipment stops charging.

Figure 22:
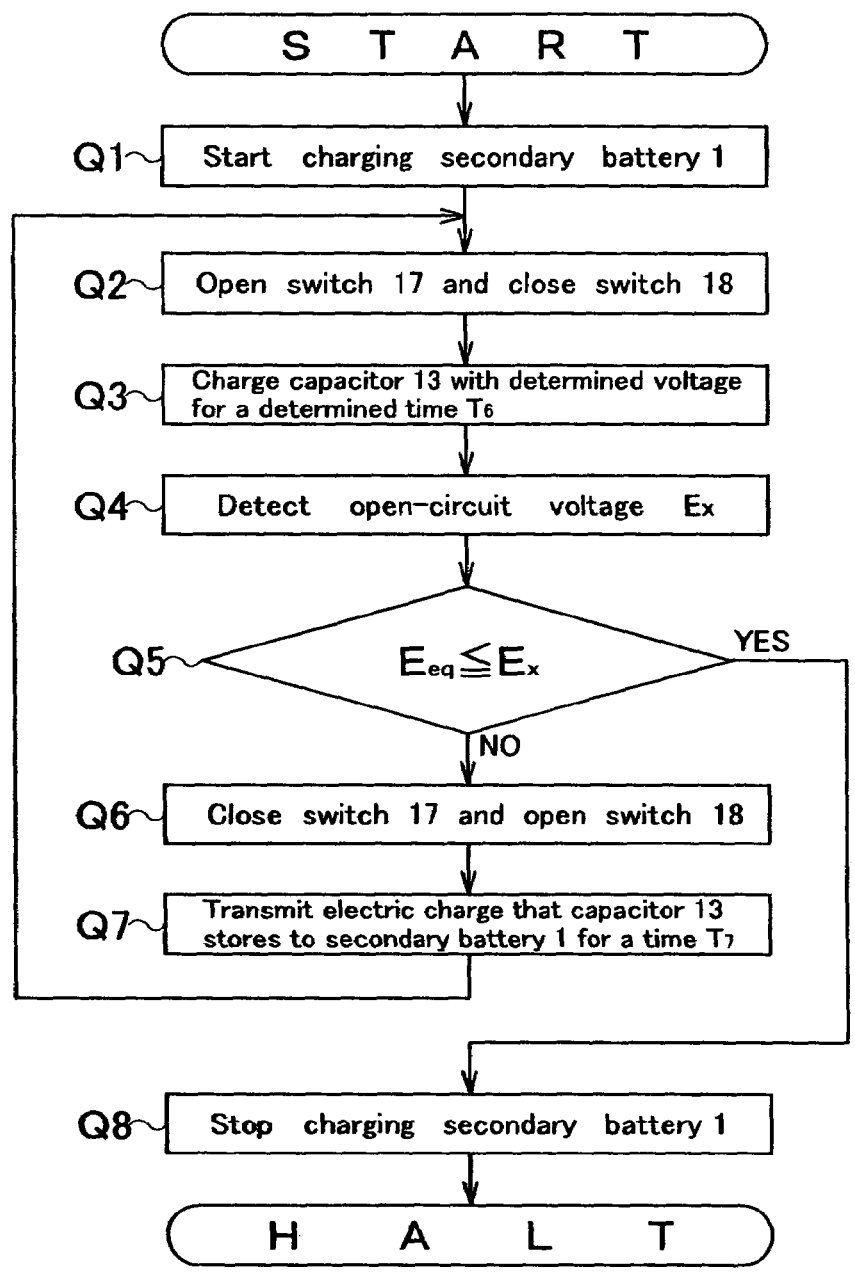
FIG. 22 is a flow chart of charging control of a secondary battery 1 by the charging equipment according to the ninth embodiment.

The control flow of charging the secondary battery 1 by the charging equipment of the ninth embodiment will be explained referring to the flow chart shown in FIG. 22.

First of all, a user manipulates the operation part (not shown) to start charging [step Q1]. Accordingly, the control part 15 transmits command to both the switch 17 and the switch 18 on the circuit shown in FIG. 20 such as to shut the switch 17 and open the switch 18 [step Q2].

The power supply part 15 applies predetermined power-supply voltage, e.g. voltage higher than the equilibrium voltage $E_{eq}$ to the capacitor 13 having large capacity for a determined time $T_6$, thereby storing electricity in the capacitor 13 [step Q3].

While the capacitor 13 stores electricity, that is, while the connection between the capacitor 13 and the secondary battery 1 is broken, the voltage detection part detects the open-circuit voltage $E_x$ of the secondary battery 1 [step Q4]. Next, the voltage judging program compares the detected open-circuit voltage $E_x$ with the equilibrium voltage $E_{eq}$ [step Q5]. If the detected open-circuit voltage $E_x$ is smaller than the equilibrium voltage $E_{eq}$, the control step goes to the step Q6, and the control part 15 transmits command to both the switch 17 and the switch 18 on the circuit such as to open the switch 17 and close the switch 18. Then, electricity stored in the capacitor 13 is transmitted into the secondary battery 1 [step Q7]. After a time $T_7$ passes, the control step returns to the step Q2 so that the switch 17 is closed and the switch 18 is opened, and the above steps including storing and charging electricity are repeated. On the other hand, if the detected open-circuit voltage $E_x$ is not smaller than the equilibrium voltage $E_{eq}$, the charging equipment assumes that the secondary battery 1 is fully charged, and stops charging the secondary battery 1 [step Q8]. Explanation of other structure and effect of the charging equipment of the ninth embodiment is omitted because they are almost similar to those of the charging equipment of the eighth embodiment.

Figure 23:
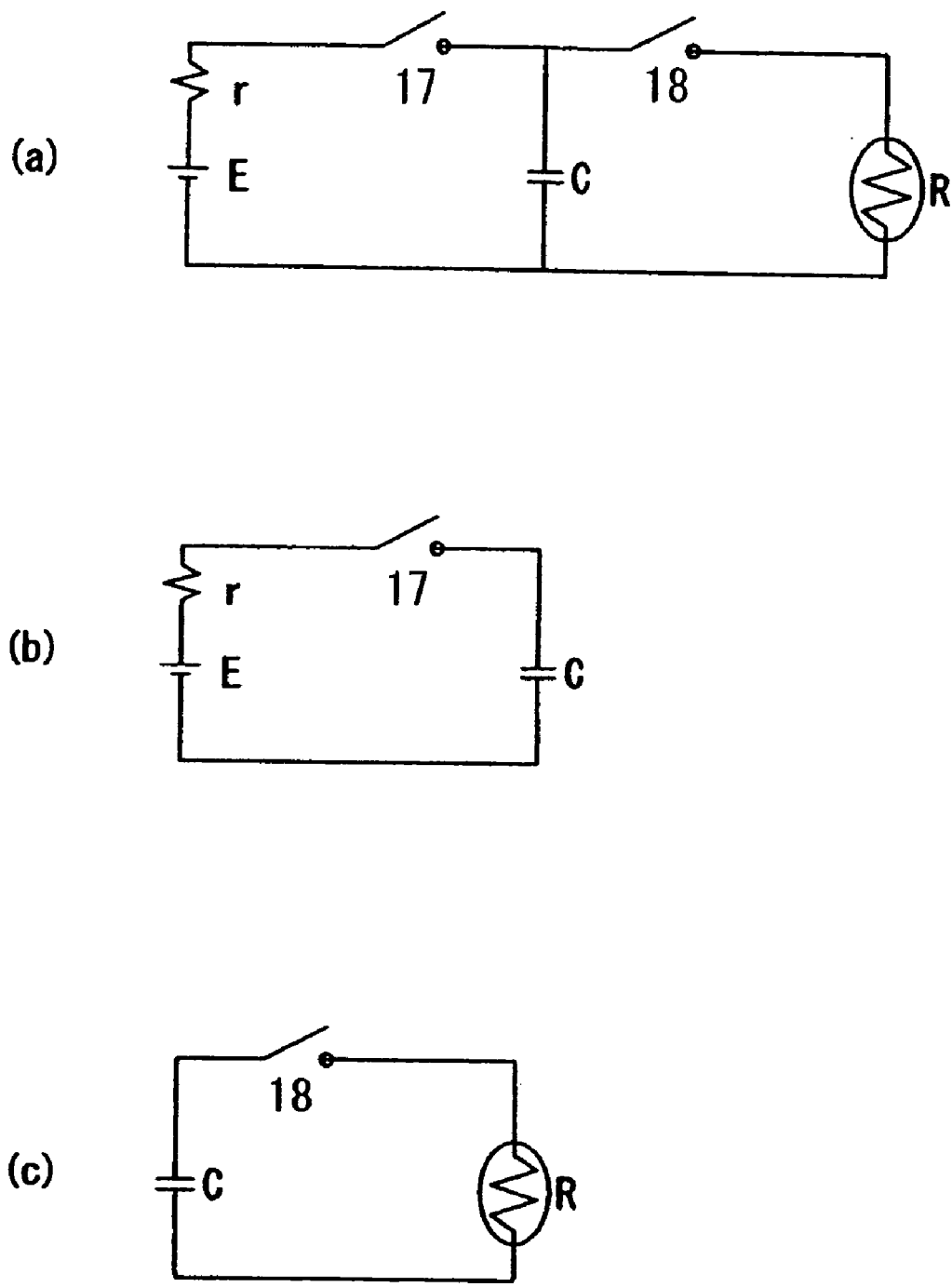
FIG. 23 is a basic circuit diagram of the charging equipment according to the eighth embodiment or the ninth embodiment.

Next, the amount of electricity charged to the secondary battery 1 and the necessary time to fully charge the secondary battery 1 every storing electricity in the capacitor 13 are theoretically calculated according to the transient-phenomenon theory, basing on each of equivalent circuits shown in FIGS. 23(a), 23(b) and 23(c), each of which serves as a basic circuit for charging the secondary battery 1 by either the charging equipment of the eighth embodiment or ninth embodiment. FIG. 23(a) is an equivalent circuit diagram serving as a basic circuit for charging the secondary battery 1 to the block diagram in FIG. 20. FIG. 23(b) is an equivalent circuit diagram for storing electricity in the capacitor 13 for a time $T_6$ with the switch 17 shut and the switch 18 opened. FIG. 23(c) is an equivalent circuit diagram for transmitting electricity stored in the capacitor 13 to the secondary battery 1 for a time $T_7$ with the switch 17 opened and the switch 18 shut. In FIG. 23, E is power-supply voltage, r is internal resistance of power supply part 12, C is electrostatic capacity of the capacitor 13, and R is internal resistance of the secondary battery 1. If V designates initial voltage caused by residual electricity in the capacitor 13, and $Q_1$ designates the amount of electricity charged to the secondary battery 1 at the first time, $Q_1$ is expressed with the following formula (1).

$$Q_1 = C*(E-V)e^{-T1/rC}*(1-e^{-T2/RC}) \qquad (1)$$

$Q_2$, designating the amount of electricity charged to the secondary battery 1 at the second time, is expressed with the following formula (2).

$$Q_2 = C*\{E-(E-V)e^{-T1/rC}*e^{-T2/RC}\}*e^{-T1/rC}*(1-e^{-T2/RC}) \qquad (2)$$

Additionally, $Q_3$, designating the amount of electricity charged to the secondary battery 1 at the third time, is expressed with the following formula (3).

$$Q_3 = C*[E-\{E-(E-V)e^{-T1/rC}*e^{-T2/RC}\}*e^{-T1/rC}*e^{-T2/RC}]*e^{-T1/rC}*(1-e^{-T2/RC}) \qquad (3)$$

$Q_n$, designating the amount of electricity charged to the secondary battery 1 at the nth time, is expressed with the following formula (4) generalized from the formulas (1), (2) and (3).

$$Q_n = C*[E*\{1-e^{-(a+b)}+e^{-2(a+b)}-e^{-3(a+b)}\ldots+(-1)^{(n-1)}*e^{-(n-1)(a+b)}+(-1)^n*V*e^{31\,(n-1)(a+b)}\}*e^{-a}*(1-e^{-b}) \qquad (4)$$

In the formula (4), it is defined that a=T1/rC, and b=T2/RC. It is assumed that r (internal resistance of the power supply part 12) is 1Ω(ohm), R (internal resistance of the secondary battery 1) is 1 Ω, C (electrostatic capacity of the capacitor 13) is 1 F(farad), V (initial voltage of the capacitor 13) is 0V, the time T1 is 1 second, and the time T2 is 1 second. Each electricity $Q_1$, $Q_2$, $Q_3$ is calculated so that $Q_1$=11.63 C(coulomb), $Q_2$=10.00 C, and $Q_3$=10.26 C. If electricity charged to the secondary battery 1 per 2 seconds is assumed to sums up to about 10.00 C basing on the calculated values, the necessary time to fully charge the secondary battery whose charge capacity is 1600 mAh is calculated to be about 5 minutes.

TENTH EMBODIMENT OF CHARGING EQUIPMENT FOR SECONDARY BATTERIES

A charging equipment for a plurality of secondary batteries 1 according to the tenth embodiment of the present invention will be explained.

Figure 24:
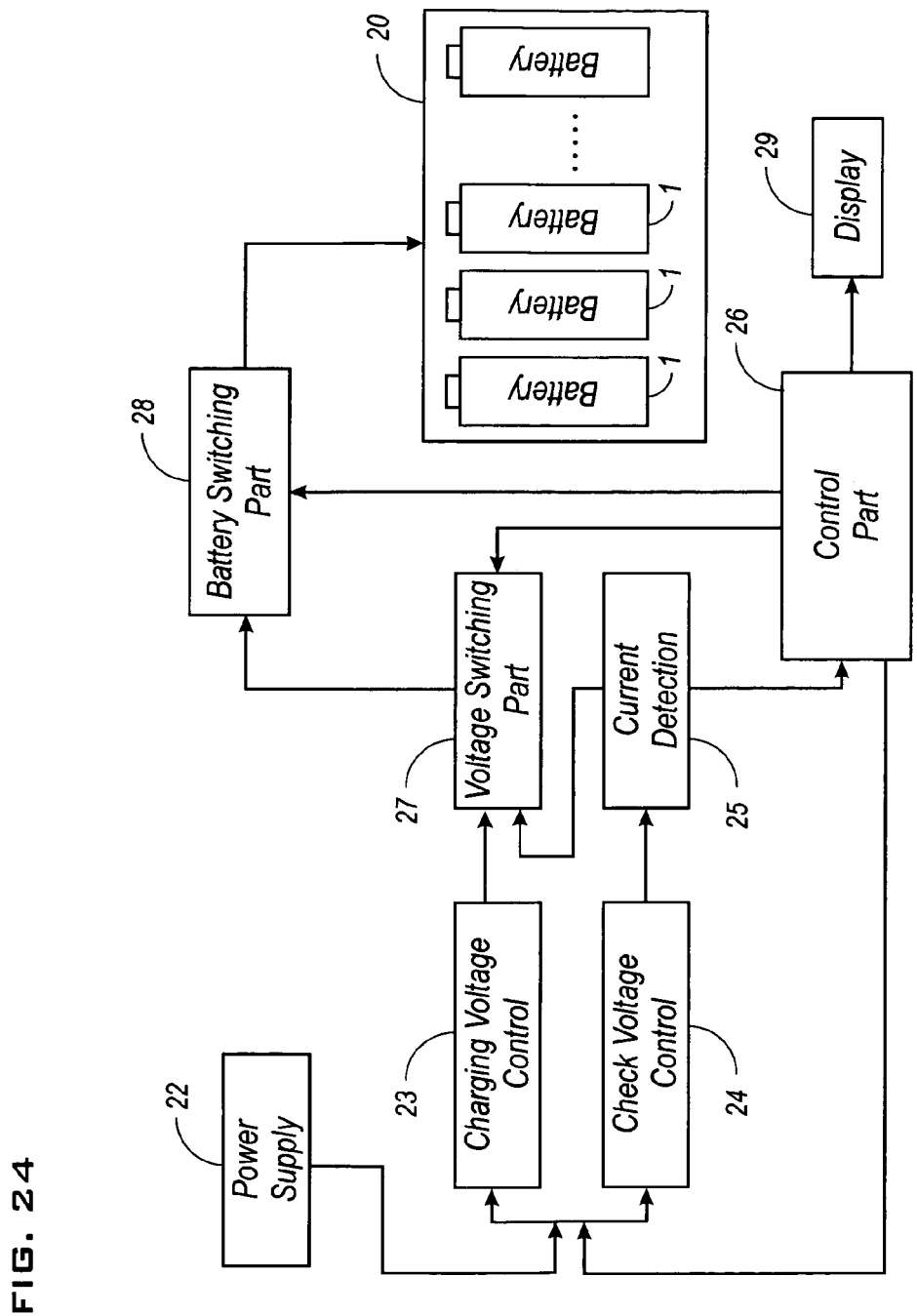
FIG. 24 is a block diagram of the charging equipment for a plurality of secondary batteries 1 according to a tenth embodiment or an eleventh embodiment of the present invention.

The charging equipment according to the tenth embodiment shown as a block diagram in FIG. 24 is provided for a plurality of secondary batteries 1.

In FIG. 24, a reference numeral 20 designates a battery box in which a plurality of secondary batteries 1 are aligned. A reference numeral 22 designates a power supply part including a transformer-rectifier circuit for changing commercial alternating current into direct current. A reference numeral 23 designates a charging voltage control part for controlling charging voltage applied to the secondary battery 1. A reference numeral 24 designates a check voltage control part for controlling check voltage applied to the secondary battery 1 to check the charged condition of the secondary battery 1. A reference numeral 25 designates a current detection part for detecting electric current flowing through the secondary battery 1 during the application of check voltage. The electric current i detected by the current detection part 25 is transmitted to a control part 26. The control part 26 judges whether the secondary battery 1 is fully charged or not, transmits command for applying voltage to the secondary battery 1 and command for switching the secondary battery 1 to be charged, counts the number of the secondary batteries 1 that have been charged, and calculates the necessary time t to fully charge the secondary battery 1. That is to say, the control part 26 has a check current judging program, a charge time predicting program, a count program, and the like. The check current judging program serves as means for judging whether the check current i detected by the current detection part 25 during application of the equilibrium voltage $E_{eq}$ to the secondary battery 1 is larger than preset standard electric current J for finishing charging. The charge time predicting program serves as means for estimating the necessary time t to fully charge the secondary battery 1 basing on the check current i detected by the current detection part 25 during application of the equilibrium voltage $E_{eq}$ to the secondary battery 1. The count program serves as means for counting the number of the fully charged secondary batteries 1.

A reference numeral 27 designates a voltage switching part for switching applied voltage between charging voltage and check voltage basing on command from the control part 26. A reference numeral 28 designates a battery switching part for switching a target connected to the circuit including the charging voltage control part 23, the check voltage control part 24, and the like from the just fully charged secondary battery 1 to the next uncharged secondary battery 1. Moreover, a reference numeral 29 designates a display part for displaying the necessary time t to fully charge the secondary battery 1 calculated in the control part 26, or the charged condition of the presently charged secondary battery 1 for deciding whether charge of the secondary battery 1 is finished or not.

The charging equipment of the tenth embodiment comprises the display part 29 as an example of information means for indicating the necessary time t to fully charge the secondary battery 1 etc. to a user through his/her eyes, however, the information means may alternatively inform with sound or any other means.

The charging equipment of the tenth embodiment charges a plurality of secondary batteries 1 one by one. This charging equipment, taking the above-mentioned characteristic in charging the secondary battery 1 into consideration, uses the following control for charging the secondary battery 1 rapidly without damaging the secondary battery 1.

In detail, the charging equipment of the tenth embodiment applies the special charging voltage $E_s$ to the first secondary battery 1 of the N secondary batteries 1 aligned in parallel for a determined time $T_1$ so as to charge the first secondary battery 1. After charging with high electric current by applying the special charging voltage $E_s$, the charging equipment switches voltage applied to the first secondary battery 1 from the special charging voltage $E_s$ to the check voltage $E_c$, and applies the check voltage $E_c$ to the first secondary battery 1 for a short time $T_3$. The above-mentioned equilibrium voltage $E_{eq}$ may preferably serve as the check voltage $E_c$.

Then, the charging equipment detects electric current i flowing through the first secondary battery 1 during the application of the check voltage $E_c$ to the first secondary battery 1, and compares the electric current i with preset standard electric current J for finishing charging (electric current assumed to be detected when the secondary battery 1 is fully charged). If the detected electric current i is larger than the standard electric current J for finishing charging, the charging equipment charges the first secondary battery 1 again by applying the special charging voltage $E_s$. Otherwise, the charging equipment assumes that the first secondary battery 1 is fully charged, and stops charging the first secondary battery 1. At this time, the battery switching part 28 serving as the battery switching means receives a signal for finishing charging from the control part 26, and switches the target secondary battery 1, to which the circuit is connected, from the first secondary battery 1 to the next uncharged secondary battery 1, and the charging equipment charges the next uncharged secondary battery 1 according to the charge control similar with that for the first charged secondary battery 1. In this way, the charging equipment repeats this charge control till all of the N secondary batteries 1 are fully charged.

Moreover, basing on the detected electric current i, the charging equipment of the tenth embodiment judges whether the secondary battery 1 is fully charged or not, and calculates the necessary time t to fully charge the secondary battery 1. The charging equipment indicates the result of the judgment and the necessary time t on the display part 29 (monitoring means) with LED, LCD, or the like.

Figure 25:
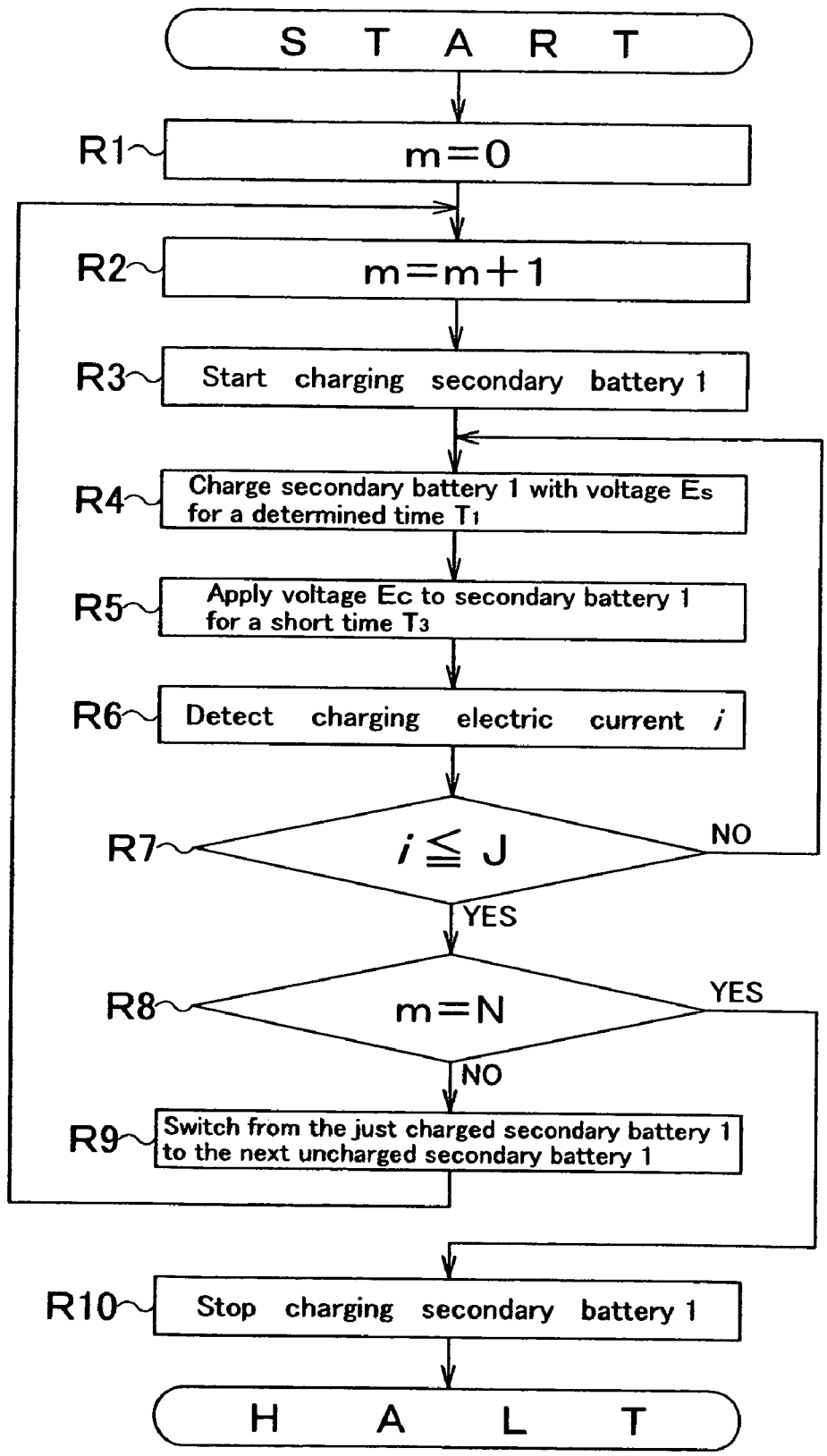
FIG. 25 is a flow chart of charging control of a plurality of secondary batteries 1 by the charging equipment according to the tenth embodiment.

The control flow of charging the secondary battery 1 by the charging equipment of the tenth embodiment will be explained referring to the flow chart shown in FIG. 25.

To give an example of charging, the charging equipment of the tenth embodiment charges N secondary batteries 1.

First of all, a counter variable m (m=0, 1, 2, . . . N) designating the number of the charged secondary batteries 1 is initialized to 0 [step R1].

Next, m+1 is substituted for the counter variable m [step R2], and the control step goes to the next step R3. At the step R3, a user manipulates the operation part (not shown) of the charging equipment to start charging. Accordingly, the special charging voltage $E_s$ higher than the equilibrium voltage $E_{eq}$ is applied to the secondary battery 1 set in the charging equipment for a determined time $T_1$ [step R4]. The determined time $T_1$ is calculated basing on variation of charging electric current according to the time progress during application of the special charging voltage $E_s$.

After the determined time $T_1$ passes, the charging equipment switches applied voltage from the special charging voltage $E_s$ to the check voltage $E_c$, e.g., the equilibrium voltage $E_{eq}$ [step R5]. Then, the current detection part 25 detects electric current i flowing through the secondary battery 1 during application of the check voltage $E_c$ to the secondary battery 1 for a short time $T_3$ [step R6].

The check current judging program compares the detected electric current i with the standard electric current J for finishing charging (the electric current assumed to be detected when charging is finished) [step R7]. If the detected electric current i is larger than the standard electric current J for finishing charging, the control step returns to the step R4, and the charging equipment applies the special charging voltage $E_s$ to the secondary battery 1, and the above-mentioned charge control steps are repeated. Otherwise, the charging equipment assumes that the secondary battery 1 is fully charged, and the control step goes to the next step R8. At the step R8, the count program judges whether the turn of the presently charged secondary battery 1 is the final Nth or not. If the turn of the presently charged secondary battery 1 does not reach the Nth, the control step goes to the step R9, and the battery switching part 28 switches the connection of the circuit from the presently charged secondary battery 1 to the next uncharged secondary battery 1, and the control steps returns to the step R2, and the above-mentioned control steps are repeated.

On the other hand, if the turn of the presently charged secondary battery is the final Nth, the charging equipment assumes that all of the secondary batteries 1 are fully charged, and it stops charging [step R10].

Incidentally, the charging time $T_1$ for applying the special charging voltage $E_s$ to each secondary battery 1 varies according to the capacity, structure, form, or another element of the battery 1. For example, with respect to the nickel-cadmium battery, the charging time $T_1$ for applying the special charging voltage $E_s$ is set to about 120 seconds, and the short time $T_3$ for applying the check voltage $E_c$ is set to around 0.1 second. As mentioned above, the equilibrium voltage $E_{eq}$ serving as the check voltage $E_c$ is ideal for judging whether the secondary battery 1 is fully charged or not, because, when the charging rate of the secondary battery 1 receiving the equilibrium voltage $E_{eq}$ reaches 100% (when the secondary battery 1 is fully charged), the detected electric current i flowing through the secondary battery 1 becomes almost 0 mA. However, when applying the equilibrium voltage $E_{eq}$ serving as the check voltage $E_c$, the detected electric current of different secondary batteries 1 slightly differ even if the secondary batteries 1 are of the same type. Therefore, to prevent the secondary battery 1 from overcharging, the standard electric current J for finishing charging is desirably set to considerably more than 0 mA, e.g. about 10 mA.

The charging equipment of the tenth embodiment automatically switches a target to which its charging circuit is connected from the just fully charged secondary battery 1 to the next uncharged secondary battery 1. By such easy charge-controlling manner, the charging equipment of the tenth embodiment surely charges all the secondary batteries 1.

Additionally, when charging each secondary battery 1, the charging equipment periodically applies the check voltage $E_c$ to the secondary battery 1 and detects the electric current i during the application of the check voltage so as to judge whether the secondary battery 1 is fully charged or not, thereby preventing the secondary batteries from being uncharged or overcharged causing excessive chemical reaction (oxidation-reduction reaction) therein. Accordingly, all of the secondary batteries 1 are charged appropriately till each of them is fully charged, and are prevented from being damaged therein, thereby increasing their effective battery cycles.

Moreover, by this manner, the special charging voltage $E_s$ higher than the equilibrium voltage $E_{eq}$ is mainly applied to the secondary battery 1 so as to charge each of the secondary batteries 1, so that considerably high electric current flows to each secondary battery 1. Therefore, even if a plurality of secondary batteries 1 are charged one by one, the charging equipment the time required to fully charge each secondary battery 1 is reduced so as to reduce the total time required to fully charge all the secondary batteries 1.

Furthermore, the display part 29 indicates the charged condition of the secondary battery 1 about whether it is fully charged or not, or the necessary time t to fully charge it, thereby being convenient for a user to monitor the present charged condition of the secondary battery or the time required for fully charging the secondary battery.

ELEVENTH EMBODIMENT OF CHARGING EQUIPMENT FOR SECONDARY BATTERIES

A charging equipment for a plurality of secondary batteries 1 according to the eleventh embodiment of the present invention will be explained.

The charging equipment of the eleventh embodiment has such different points from that of the tenth embodiment as follows: In the charging equipment of the eleventh embodiment, instead of the check voltage control part 24, the voltage switching part 27 for switching applied voltage between the charging voltage and the check voltage also switches on and off application of voltage; and a voltage detection part replaces the current detection part 25. The voltage detection part measures the open-circuit voltage E ($E_\alpha$, $E_\beta$, $E_\gamma$, $E_\delta$, etc.) of the secondary battery 1 while charging voltage is stopped being applied to the secondary battery 1 by the voltage switching part 27.

In detail, the charging equipment of the eleventh embodiment charges the first secondary battery 1 of aligned N secondary batteries 1 with high electric current by applying the special charging voltage $E_s$ to the secondary battery 1 for a determined time $T_1$, and then, it breaks off application of the special charging voltage $E_s$ and detects open-circuit voltage E ($E_\alpha$, $E_\beta$, $E_\gamma$, $E_\delta$, etc.) of the first secondary battery 1 and computes the voltage difference $\Delta E_s$ between the special charging voltage $E_s$ and the open-circuit voltage $E_x$. Then, the charging equipment compares this computed voltage difference $\Delta E_s$ with a preset standard value K. If the voltage difference $\Delta E_s$ is larger than the standard value K, the charging equipment further applies the special charging voltage $E_s$ to the first secondary battery 1. Otherwise, the charging equipment assumes that the first secondary battery 1 is fully charged, and stops charging the first secondary battery 1. At this time, the battery switching part 28 receives a signal for finishing charging from the control part 26 and switches a target connected to the charging circuit from the first secondary battery 1 to the next uncharged secondary battery 1, and the charging equipment charges the next secondary battery 1 according to the same charge control flow. In this way, the charging equipment repeats this charge control flow till all of the N secondary batteries 1 are fully charged.

The standard value K is a difference between the special charging voltage $E_s$ and the open-circuit voltage $E_x$ of the fully charged secondary battery 1, i.e., the equilibrium voltage $E_{eq}$ ($K=E_s-E_{eq}$).

Figure 26:
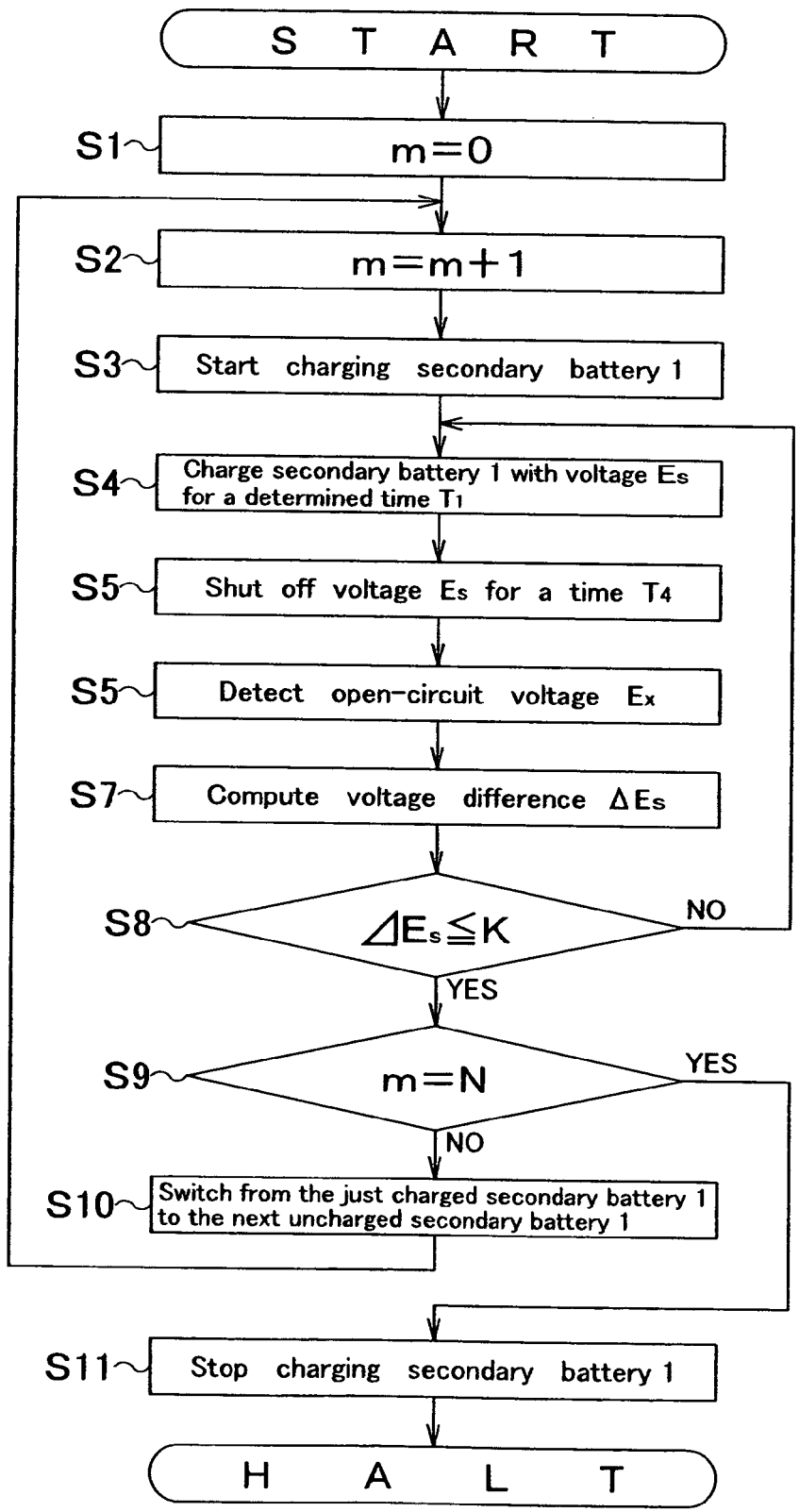
FIG. 26 is a flow chart of charging control of a plurality of secondary batteries 1 by the charging equipment according to the eleventh embodiment.

The control flow of charging the secondary battery 1 by the charging equipment of the eleventh embodiment will be explained referring to the flow chart shown in FIG. 26.

To give an example of charging, the charging equipment of the tenth embodiment charges N secondary batteries 1.

First of all, a counter variable m (m=0, 1, 2, . . . N) designating the number of the charged secondary batteries 1 is initialized to 0 [step S1].

Next, m+1 is substituted for the counter variable m [step S2], and the control step goes to the next step S3. At the step S3, a user manipulates the operation part (not shown) of the charging equipment to start charging. Accordingly, the special charging voltage $E_s$ higher than the equilibrium voltage $E_{eq}$ is applied to the secondary battery 1 set in the charging equipment for a determined time $T_1$ [step S4].

After the determined time $T_1$ passes, the charging equipment breaks off application of the special charging voltage $E_s$ for a time $T_4$ [step S5]. In the meanwhile, the voltage detection part detects open-circuit voltage E (($E_\alpha$, $E_\beta$, $E_\gamma$, $E_\delta$, etc.) of the first secondary battery 1 [step S6].

The voltage difference $\Delta E_s$ between the special charging voltage $E_s$ and the open-circuit voltage $E_x$ is computed [step S7]. The charging equipment compares the computed voltage difference $\Delta E_s$ with the standard value K [step S8]. If the voltage difference $\Delta E_s$ is larger than the standard value K, the control step returns to the step S4, and the charging equipment further applies the special charging voltage $E_s$ to the secondary battery 1, and the above-mentioned charge control steps are repeated.

On the other hand, if the voltage difference $\Delta E_s$ is not larger than the standard value K, the charging equipment assumes that the secondary battery 1 is fully charged, and the control step goes to the step S9. At the step S9, the count program judges whether the turn of the presently charged secondary battery 1 is the final Nth or not.

If the presently charged secondary battery 1 is not the Nth charged one, the control step goes to the next step S10. At the step S10, the battery switching part 28 switches a target connected to the charging circuit from the just fully charged secondary battery 1 to the next uncharged secondary battery 1, the control steps returns to the step S2, and the above-mentioned control steps are repeated.

On the other hand, if the presently charged secondary battery 1 is the Nth charged one, the charging equipment assumes that all of the secondary batteries 1 are fully charged, and it stops charging [step S11].

Incidentally, the charging time $T_1$ for applying the special charging voltage $E_s$ varies according to the capacity, structure, form, or another element of each secondary battery 1. For example, for an AA nickel-cadmium battery or an AA nickel-hydrogen battery, the charging time $T_1$ is set to a time between 60 seconds and 90 seconds, and the break-off time $T_4$ is set to the time between 1 second and 5 seconds. The time required for voltage between terminals of the secondary battery 1 to become stable and measurable is determined as the break-off time $T_4$. The break-off time $T_4$ for the AA nickel-cadmium battery or the AA nickel-hydrogen battery is set to a time between 1 second and 5 seconds.

The charging equipment needs to be designed for controlling charge of the secondary battery 1 so that the open-circuit voltage $E_x$ should be detected in the high impedance state where electric current does not flow through the target for measuring, such as the state where electric current does not flow through the secondary battery 1 to which the equilibrium voltage is applied. Explanation of other structures, action and effect of the charging equipment of the eleventh embodiment is omitted because they are substantially similar with those of the charging equipment of the tenth embodiment.

TWELFTH EMBODIMENT OF CHARGING EQUIPMENT FOR SECONDARY BATTERIES

A charging equipment for a plurality of secondary batteries 1 according to the twelfth embodiment of the present invention will be explained.

Figure 27:
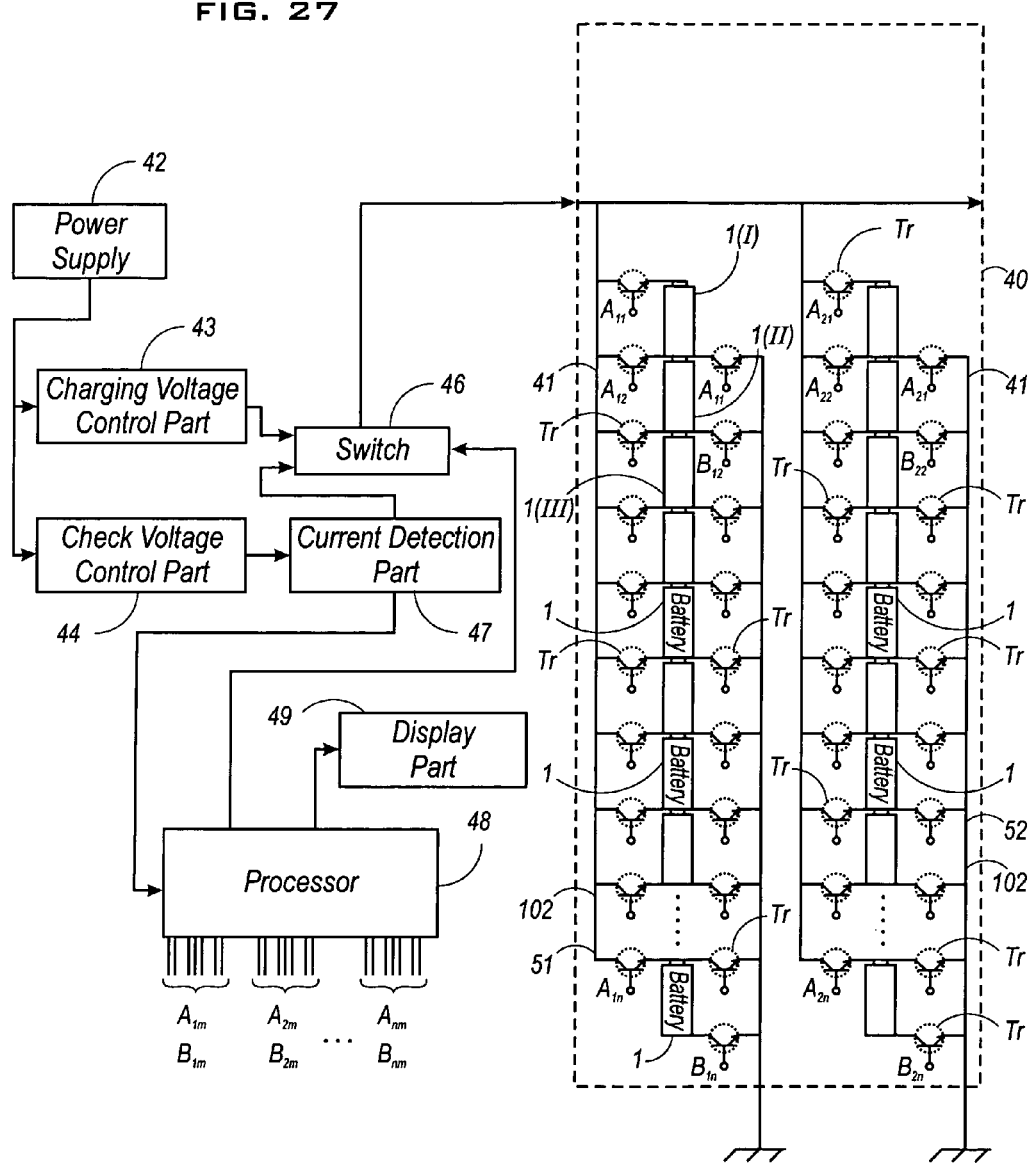
FIG. 27 is a block diagram of a charging equipment for a plurality of secondary batteries 1 according to a twelfth embodiment of the present invention.

FIG. 27 is a block diagram of the charging equipment for a plurality of secondary batteries 1 according to the twelfth embodiment. The charging equipment of the twelfth embodiment charges each of secondary batteries 1, which are packed together in a packed power supply 40. The packed power supply 40 has a plurality of battery groups 41 (as for the FIG. 27, two battery groups 41) mutually connected in parallel. Each of the battery groups 41 has a plurality of secondary batteries 1 mutually connected in series.

In consideration of the above-mentioned characteristic of the secondary batteries 1 in charging, the charging equipment of the twelfth embodiment is so configured as to charge the secondary batteries 1 rapidly without damaging them. In detail, when this charging equipment charges each secondary battery 1, the special charging voltage $E_s$ higher than the equilibrium voltage $E_{eq}$ is applied to the secondary battery 1 so as to supply high electric current to it for a determined time $T_1$, and then, voltage applied to the secondary battery 1 is switched to the check voltage $E_c$ lower than the special charging voltage $E_s$, and the check voltage $E_c$ is applied to the secondary battery 1 for a short time $T_3$. The equilibrium voltage $E_{eq}$ preferably serves as the check voltage $E_c$.

Then, the charging equipment detects electric current i flowing through the secondary battery 1 during application of the check voltage $E_c$ to the secondary battery 1, and compares the electric current i with preset standard electric current J for finishing charging (electric current assumed to be detected when charging is finished). If the detected electric current i is larger than the standard electric current J for finishing charging, the charging equipment applies the special charging voltage $E_s$ to the secondary battery 1 again. Otherwise, the charging equipment assumes that the secondary battery 1 is fully charged, and stops charging the secondary battery 1.

To realize the above-mentioned charge control, the charging equipment of the twelfth embodiment is formed as shown in FIG. 27.

In detail, the charging equipment of the twelfth embodiment comprises a power supply part 42, a charging voltage control part 43, a check voltage control part 44, a processor (control part) 48, and the like. The power supply part 42 includes a transformer-rectifier circuit for changing commercial alternating current into direct current. The processor 48 transmits commands to a switch 46 so that the switch 46 selects applied voltage between charging voltage and check voltage according to charging time and check time, whereby each battery group 41 is supplied selectively with either the charging voltage by the charging voltage control part 43 or the check voltage (applied voltage for checking the charged condition of the secondary battery 1) by the check voltage control part 44. A current detection part 47 (a detection part for detecting electric current etc. flowing through the secondary battery 1 during the application of the check voltage) transmits a signal about the electric current detected by the current detection part 47 to the processor 48 during the check time. The processor 48 repeatedly outputs either the command for charging the secondary battery 1 or the command for checking the secondary battery 1 to the switch 47 as far as the current detection part 47 detects any electric current. When the processor 48 detects that the present charging of the secondary battery 1 is finished (for example, the processor 48 judges whether the detected electric current is larger than the standard electric current J for finishing charging or not), the processor 48 commands the charging equipment to apply voltage to the next secondary battery 1 as discussed later. A display part 49 as an example of informational means receives a conditional signal from the packed power supply 40 and the processor 48, and displays information such as the charged condition of the packed power supply 40 to decide whether the packed power supply 40 is fully charged or not. The display part 49 may comprise LED, LCD, or the like.

The packed power supply 40 has the first circuit 91 for supplying charging voltage to each secondary battery 1 in one battery group 41 marked with a reference numeral 101 in FIG. 27, and the second circuit 92 for supplying charging voltage to each secondary battery 1 in the other battery group 41 marked with a reference numeral 102 in FIG. 27.

The first circuit 91 has transistors Tr consisting of $A_{11}$, $A_{12}$, ... $A_{1n}$, and transistors Tr consisting of $B_{11}$, $B_{12}$, ... $B_{1n}$. The second circuit 92 has transistors Tr consisting of $A_{21}$, $A_{22}$, $A_{2n}$, and transistors Tr consisting of $B_{21}$, $B_{22}$, ... $B_{2n}$.

Accordingly, the processor 48 as a control part can control transistors Tr consisting of $A_{11}$, $A_{12}$, ... $A_{1n}$ and transistors Tr consisting of $B_{11}$, $B_{12}$, ... $B_{1n}$, on the first circuit 91 in one battery group 41, and control transistors Tr consisting of $A_{21}$, $A_{22}$, ... $A_{2n}$ and transistors Tr consisting of $B_{21}$, $B_{22}$, ... $B_{2n}$ on the second circuit 92 in the other battery group 41. Additionally, the processor 48 may control transistors Tr of the third through the nth circuits if they are provided.

This charging equipment charges the secondary batteries 1 in each battery group 41 one by one.

A case that the charging equipment charges the battery group 41 marked with the reference numeral 101 shown in FIG. 27 will be explained. For instance, when the charging equipment charges a secondary battery 1 marked with a numeral reference II in this battery group 101, the processor 48 transmits "Hi" signal to each of the transistors $A_{12}$ and $B_{12}$, thereby supplying charge of electricity to the secondary battery II. During charge of the secondary battery II, each transistor Tr other than the transistors $A_{12}$ and $B_{12}$ is in a state of "Low". When the secondary battery II is fully charged, the transistors $A_{13}$ and $B_{13}$ receive "Hi" signal from the processor 48 so as to charge the next secondary battery 1 marked with a reference numeral III.

The state that any of the transistors Tr receives the "Hi" signal from the processor 48 means that after applying the special charging voltage $E_s$ higher than the equilibrium voltage $E_{eq}$ to the secondary battery 1 so as to charge high electric current for a determined time $T_1$, the charging equipment switches voltage applied to the secondary battery 1 from the special charging voltage $E_s$ to the check voltage $E_c$, and applies the check voltage $E_c$ to the secondary battery 1 for a short time $T_3$.

Therefore, when the charging equipment finishes charging a secondary battery 1, by command from the processor 48, the first circuit 91 is separated from the just fully charged secondary battery 1 and connected to the next uncharged secondary battery 1, and the charging equipment charges the next uncharged secondary battery 1 according to the same charge control cycle. In this way, the charging equipment repeats this charge control cycle till all of M secondary batteries 1 in the battery group 101.

When finishing charging all the secondary batteries 1 in the battery group 101 in FIG. 27, the charging equipment switches a battery group 41 to be charged from the battery group 101 to the battery group 102 shown in FIG. 27, and charges each secondary battery 1 in the battery group 102 one by one according to the same charge control cycle.

Figure 28:
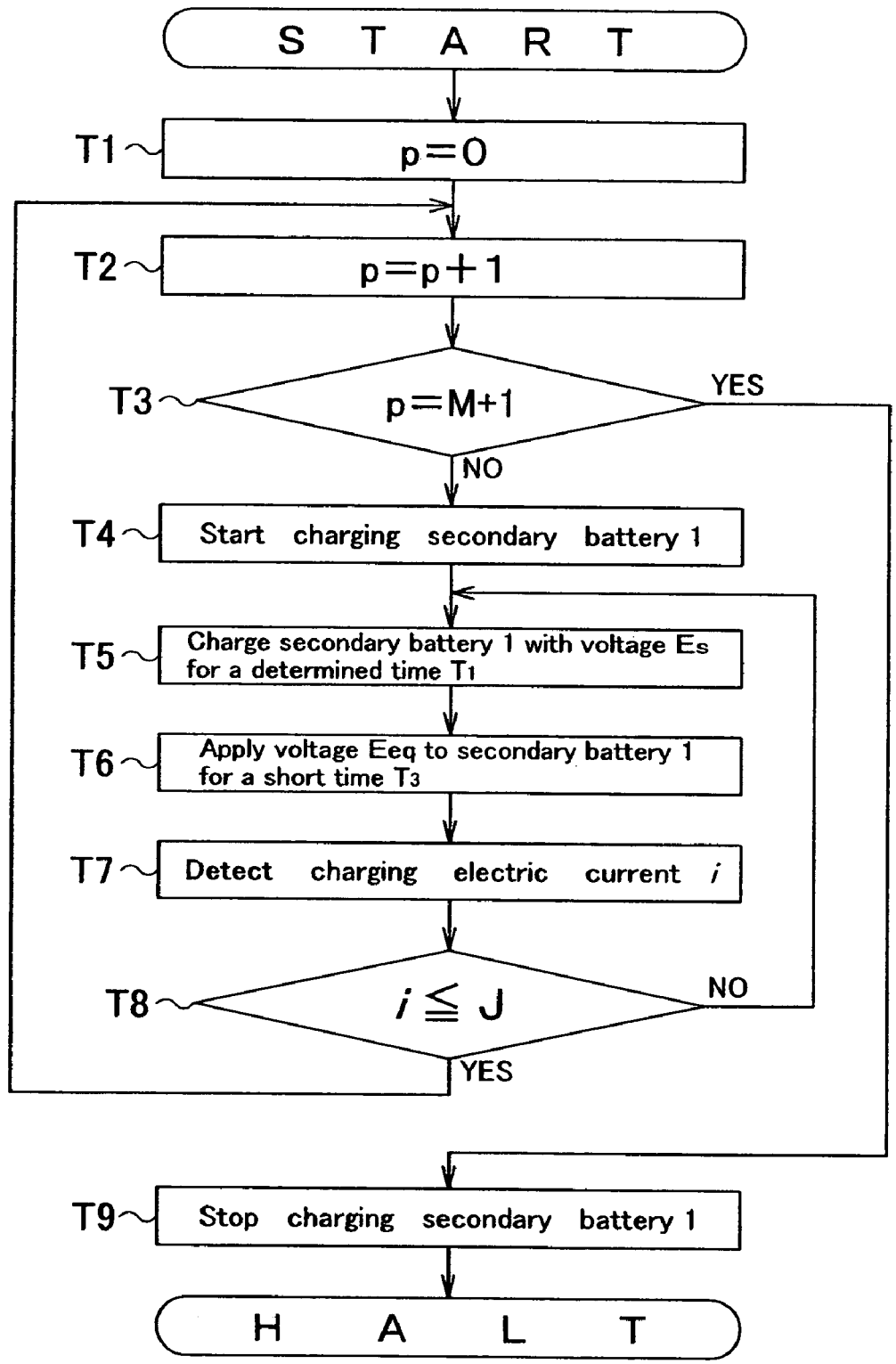
FIG. 28 is a flow chart of charging control of a plurality of secondary batteries 1 by the charging equipment according to the twelfth embodiment.

The control flow of charging the secondary batteries 1 by the charging equipment of the twelfth embodiment will be explained referring to the flow chart shown in FIG. 28.

At first, charging of the battery group 101 shown in FIG. 27 will be explained.

First of all, a counter variable p (p=0, 1, 2, ... M) serving as the number of the fully charged secondary batteries 1 is initialized to 0 [step T1]. Next, p+1 is substituted for the counter variable p [step T2], and the control step goes to the next step T3. At the step T3, the count program judges whether the number p of the fully charged secondary batteries 1 reaches M or not. M is the number of all of the secondary batteries 1 in the battery group 101.

At the step T3, if the counter variable p is not equal to M+1, the control step goes to the next step T4. On the other hand, if the counter variable p is equal to M+1 (p=M+1), the charging equipment assumes that all of the secondary batteries 1 in the battery group 101 are fully charged, and it stops charging the battery group 101 [step T9].

In the case that the counter variable p isn't equal to M+1, the charging equipment starts charging the pth secondary battery 1 and applies the special charging voltage $E_s$ to the pth secondary battery 1 for a determined time $T_1$ [step T5]. For instance, the charging time $T_1$ for applying the special charging voltage $E_s$ to the secondary battery 1 is set to about 120 seconds.

After the determined time $T_1$ passes, the charging equipment switches applied voltage from the special charging voltage $E_s$ to the check voltage $E_c$ (e.g. the equilibrium voltage $E_{eq}$) [step T6]. The current detection part 47 detects electric current i flowing through the pth secondary battery 1 during the application of the check voltage $E_c$ to the pth secondary battery 1 for a short time $T_3$ [step T7]. For example, the short time $T_3$ for applying the check voltage $E_c$ to the secondary battery 1 is set to about 0.1 second.

At the step T8, the check current judging program compares the detected value of electric current i with standard electric current J for finishing charging (electric current assumed to be detected when charging is completed). If the detected electric current i is larger than the standard electric current J for finishing charging, the control step returns to the step T4, and the charging equipment applies the special charging voltage $E_s$ to the secondary battery 1, and repeats the above-mentioned charge control steps. Otherwise, the charging equipment assumes that the pth secondary battery 1 is fully charged, and the control step returns to the step T2, which means that the charging equipment finishes charging the pth secondary battery 1.

In this way, the charging equipment repeats the above-mentioned charge cycle so as to fully charge all of the secondary batteries 1 of the battery group 101 [step T9].

Incidentally, the equilibrium voltage $E_{eq}$ is suitable for serving as the check voltage for easily judging whether the secondary battery 1 is fully charged or not, because the electric current becomes almost 0 mA when its charging rate reaches 100% (the fully charged condition), as understood from the graph showing in FIG. 3. However, even if the secondary batteries 1 are identical in classification, the equilibrium voltage $E_{eq}$ of each secondary battery 1 is slightly different from one another. To prevent overcharging in consideration of such situation, the standard voltage J for finishing charging is desirably set to be about 10 mA, for example, considerably higher than 0 mA. When the charging equipment starts charging the secondary battery 1 at the step T4, the display part 49 starts to display that the packed power supply 40 is under charging.

When finishing charging all of the secondary batteries 1 of the battery group 101, the charging equipment starts charging secondary batteries 1 of the next battery group 41 (102). In other words, when finishing charging the battery group 101, the charging equipment should judge that the variable p equals M+1 (p=M+1) at the step $T_3$ shown in FIG. 28. Therefore, when p is equal to M+1, the processor 48 commands to start charging the battery group 102.

The charging equipment charges the battery group 102 according to the similar control flow for charging the battery group 101. If the charging equipment finishes charging both the battery groups 101 and 102, the display part 49 switches its indication from about under charging to about finishing charging.

According to the twelfth embodiment, the charging equipment checks the charged condition of the secondary battery 1 periodically by detecting electric current i flowing through the secondary battery 1. By this charging method, each secondary battery 1 is fully charged appropriately without causing excessive damaging chemical reaction (oxidation-reduction reaction) therein, thereby remarkably increasing effective battery cycles of the secondary batteries 1.

Additionally, this charging method supplies each of the secondary batteries 1 with pretty large charging current by mainly applying the special charging voltage E, larger than the equilibrium voltage $E_{eq}$ to the secondary battery 1, thereby reducing charge time.

The charging equipment charges the secondary batteries 1 one by one, thereby surely fully charging all of the secondary batteries 1. Each battery group 41 is prevented from being finished in its charging while an insufficiently charged secondary battery 1 remains therein, thereby enhancing its reliability.

Moreover, the charging equipment starts charging the battery groups 102 after it finishes charging the battery group 101. Then, the charging equipment finishes charging the battery group 102, thereby fully charging all of the secondary batteries 1 in the packed power supply 40 appropriately for a short time. Therefore, the secondary batteries 1 fully charged by the charging equipment increase their effective battery cycles.

The display part 49 indicates the charged condition of each packed power supply 40, that is, either under charging or fully charged, thereby facilitating for users' monitoring the charged condition of the packed power supply 40. The user, when noticed from the display part 49 that the packed power supply 40 is fully charged, can immediately use the packed power supply 40 for driving any kind of load. The display part 40 may have two lights in different colors such that one light is turned on when the packed power supply 40 is under charging, and the other is turned on when charging of the packed power supply 40 is finished. Alternatively, the display part 40 may have only one light, which is tuned on (or turned off) when the packed power supply 40 is under charging, and turned off (or turned on) when charging of the packed power supply 40 is finished. Further alternatively, the display part 49 may selectively display either literal sign "Under Charging" or "Charging Is Finished".

This charging equipment comprises the display part 49 as an example of an information means which indicates the charged condition of the packed power supply 40 to a user through his/her eyes, however, the charging equipment may have any other information means for informing a user with sound or the like.

For charging a packed power supply 40 including a plurality of battery groups 41, the charging equipment of the twelfth embodiment, as shown in FIG. 27, starts charging the uncharged battery group 41 after finishing charging the next battery group 41 ahead. Alternatively, the charging equipment may be configured so as to charge the plurality of battery groups 41 simultaneously. This charging equipment may start charging all of the battery groups 41 simultaneously, so as to finish charging them approximately simultaneously, thereby remarkably reducing the total charging time. The timings for starting charging the respective battery groups 41 may be different from one another to some degree. For example, the charging equipment may start charging the second battery group 102 (in FIG. 27) after the passage of the determined time from the moment when starting charging the first battery group 101 (in FIG. 27) (before the moment when finishing charging the battery group 101). Further alternatively, the charging equipment may start charging the second battery group 102 not immediately but after the passage of the determined time from the moment when finishing charging the first battery group 101.

The packed power supply 40 having a plurality of battery groups 41 (101 and 102) may be made usable in any of the following modes: In one mode, either the battery group 101 or 102 is selectively connected to load. In another mode, the battery groups 101 and 102 are connected in parallel to load, and in another mode, the battery groups 101 and 102 are connected in series to load. The packed power supply 40 preferably has such flexibility as to correspond to various kinds of load. In this case, the packed power supply 40 has switching means in its circuit so as to selectively connect the battery groups 101 and 102 either in series or in parallel to load.

Incidentally, the necessary time t to fully charge the secondary battery 1 (i.e. the charge time) can be calculated basing on the graph of FIG. 4 showing the relation between the electric current i and the necessary time t. This graph shows the relation between the detected electric current i during the application of the equilibrium voltage $E_{eq}$ and the necessary time t to fully charge the secondary battery 1. On the assumption that $I_{eqo}$ (referring to FIG. 3) serves as the detected electric current i during the application of the equilibrium voltage $E_{eq}$ to the secondary battery 1 whose charging rate is 0%, this graph shows that the higher the charging rate is, the shorter the necessary time t is and the smaller the detected electric current i is. In this graph, when the detected electric current i reaches 0 mA, the secondary battery 1 is fully charged so that the charging rate becomes 100% and the necessary time t becomes 0.

Therefore, the charge time predicting program basing on this graph is preferably programmed in the processor 48 serving as the control means, thereby enabling the necessary time t for fully charging the secondary battery 1 to be estimated basing on the detected electric current i. Accordingly, the charging equipment may stop charging the secondary battery 1 after the passage of the necessary time t which is computed by the charge time predicting means, i.e., the charge time predicting program. The detected necessary time t to fully charge the secondary battery 1 may be preferably indicated as the charging time t on the display part 49. By indicating the displayed charging time t, a user can know when the charging will be finished.

The charging equipment of the twelfth embodiment may be modified without departing from the scope of attended claims. For instance, the number of the battery groups 41 in the packed power supply 40 may be increased or decreased freely. Also, the number of the batteries 1 of each battery group 41 may be increased or decreased freely. When the charging equipment charges each secondary battery 1, it may short-circuit the secondary battery 1 between its terminals for an extremely short time (e.g. about 0.001 second) before it applies the check voltage $E_c$ to the secondary battery 1. The short-circuiting can clear electricity from the electrode interface of the secondary battery 1, so that applied voltage to the secondary battery 1 can be smoothly switched from the charging voltage to the check voltage $E_c$, and charging electric current is stabilized just after switching applied voltage to the check voltage $E_c$, whereby electric current i can be accurately detected and the secondary battery 1 can be charged appropriately.

For finishing charging a secondary battery 1, the charging rate of the secondary battery 1 at the time when detecting the electric current i may be calculated basing on the detected electric current i by using the graph of FIG. 3, and charging of the secondary battery 1 may be alternatively stopped when its charging rate reaches a determined value.

When the charging equipment charges each secondary battery 1, it may alternatively detect open-circuit voltage $E_x$ of the secondary battery 1.

In this case, the charging equipment detects the voltage difference $\Delta E_s$ between the special charging voltage $E_s$ and the open-circuit voltage E ($E_\alpha$, $E_\beta$, $E_\gamma$, $E_\delta$, etc.) of the second battery 1, and compares the open-circuit voltage E with the preset standard value K. If the voltage difference $\Delta E_s$ is larger than the standard value K, it may continue charging the secondary battery 1; otherwise, it may stop charging the secondary battery 1. The standard value K is a difference between the special charging voltage $E_s$ and the open-circuit voltage E of the secondary battery 1 in its fully charged condition, that is, the open-circuit voltage E is equal to the equilibrium voltage $E_{eq}$ ($K=E_s-E_{eq}$). In this case, the charging equipment can compute the necessary time t to fully charge the secondary battery 1, basing on the detected voltage difference $\Delta E_s$ between the equilibrium voltage $E_{eq}$ and the open-circuit voltage $E_x$, and it can indicate the necessary time t on the display part 49.

When charging is finished, the display part 49 may sound (with a buzzer, for example) to inform a user that charge of the secondary battery 1 is finished. If a plurality of battery groups 41 are provided, the display part 49 may indicate not only the state of finishing charging all of the battery groups 41, but also the state of finishing charging each battery group 41. If power of only one battery group 41 is sufficient for driving load, the power supply may be conveniently used immediately after the display part 49 notices that one of the battery group 41 is completely charged, without waiting for charging another battery group 41.

THIRTEENTH EMBODIMENT OF CHARGING EQUIPMENT FOR SECONDARY BATTERY

A charging equipment for a secondary battery 1 according to the thirteenth embodiment of the present invention will be explained.

The fully charged secondary battery 1, if remaining unused, naturally self-discharges so as to reduce its voltage gradually. For example, in case the secondary battery 1 is left unused for two days, almost 15% voltage falls. In case for thirty days, almost 40% voltage falls. For this reason, when the secondary battery 1 is set in load such as digital camera, its voltage may be so low that the load does not work well.

To solve this problem, the charging equipment of the thirteenth embodiment recharges a fully charged secondary battery 1 when voltage of the fully charged secondary battery 1 falls lower than the predetermined value. The manner for recharging the secondary battery 1 may be any of the above-mentioned charging manners employed by the charging equipments of the first to twelfth embodiments, or another charging manner.

The charging equipment of the thirteenth embodiment is configured similarly with that shown in FIG. 1. The control part 4 has a recharge judging program serving as means for judging whether voltage of the charged secondary battery detected by the voltage detection part 9 is larger than the recharging voltage $E_r$ smaller than the equilibrium voltage $E_{eq}$ or not.

For instance, the recharging voltage $E_r$ is set to 80% of the equilibrium voltage $E_{eq}$. The battery voltage of the secondary battery 1 remaining set in the charging equipment is always observed by the voltage detection part 9 even after charge of the secondary battery 1 is finished. When the observed battery voltage of the secondary battery 1 becomes not larger than the recharging voltage $E_r$, the control part 4 outputs command for recharging to the charging voltage supply part 6, which supplies charging voltage to the secondary battery 1. Thus, the charging equipment recharges the secondary battery 1.

Whether this charging equipment employs the charging manner of any of the first to twelfth embodiments or another charging manner, recharge of the secondary battery is finished by the charge-finishing process in the employed charging manner.

By recharging as mentioned above, the battery voltage of the secondary battery 1 picked out from the charging equipment is always not smaller than the recharging voltage $E_r$. In other words, conveniently, the secondary battery 1 set in the charging equipment always stands by in the state of being suitable for use.

Also, in the process of recharging, such excessive chemical reaction (oxidation-reduction reaction) as to damage the internal structure of the secondary battery does not occur in the secondary battery, whereby the secondary battery 1 is recharged appropriately till its fully charged condition, thereby increasing its effective battery cycles.

FOURTEENTH EMBODIMENT OF CHARGING EQUIPMENT FOR SECONDARY BATTERIES

A charging equipment for a plurality of secondary batteries 1 according to the fourteenth embodiment of the present invention will be explained.

Figure 29:
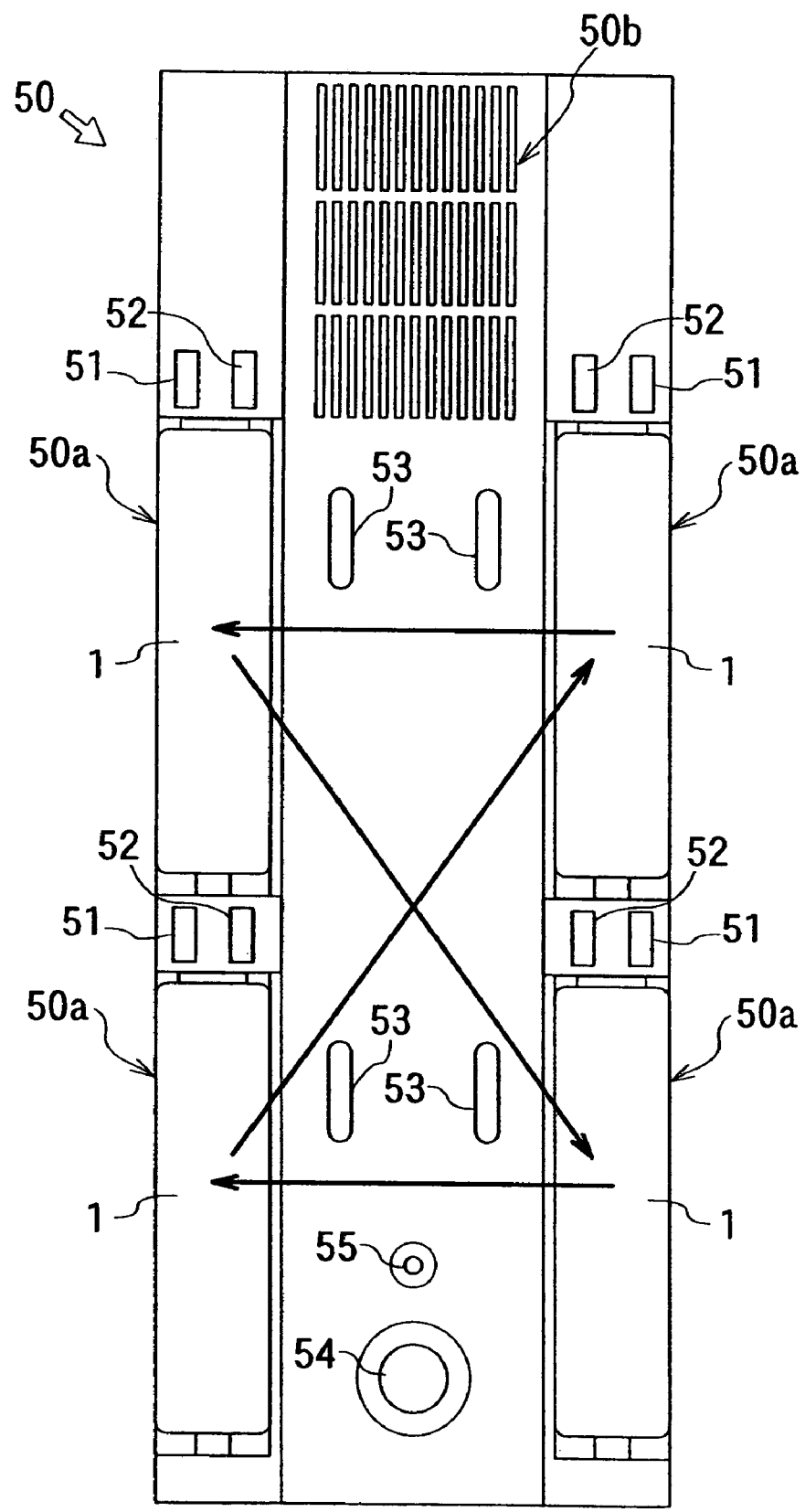
FIG. 29 is a plan view of a charging equipment for a plurality of secondary batteries 1 according to a fourteenth embodiment of the present invention.

FIG. 29 is a plan view of the charging equipment for charging a plurality of (in this embodiment, four) secondary batteries 1 according to the fourteenth embodiment.

Referring to FIG. 29, a reference numeral 50a designates a seat onto which a secondary battery 1 is set, a reference numeral 50b designates an air intake for taking in the open air, and a reference numeral 51 designates a first display part, which is lighted on when the secondary battery 1 is nearly fully charged. For example, the first display part 51 is turned on when battery voltage of the secondary battery 1 reaches the recharging voltage $E_r$. Such designed charging equipment starts recharging the secondary battery 1 after the lighting first display part 51 is lighted off so as to notice charge of the secondary battery 1 is finished. A reference numeral 52 designates each of second display parts corresponding to the respective secondary batteries 1. The secondary batteries 1 are charged one by one in order as a bold arrow shown in FIG. 29. Each of the second display parts 52 is lighted on when the corresponding secondary battery 1 is under charging. A reference numeral 53 designates a take-off button for taking off the secondary battery 1 from the seat 50a, a reference numeral 54 designates a start button for starting charging the secondary batteries 1, and a reference numeral 55 designates a pilot lump. The charging equipment 50 is connected to the commercial power source by a cord (not shown in FIG. 29).

The charging equipment 50 of the fourteenth embodiment performs charging operation for each of the secondary batteries 1 so as to fully charge the plurality of secondary batteries 1 set therein one by one in order as the bold arrow in FIG. 29. In each charging operation, the charged condition of the secondary battery 1 is checked and the secondary battery 1, if it is not fully charged, is charged by application of predetermined charging voltage for a determined time. A series of the charging operations for all the secondary batteries 1 designates one charging turn. The charging equipment repeats the charging turn, wherein if any of the secondary batteries 1 is judged to be fully charged, it is put off charging.

If any of the secondary batteries 1 is full charged, the charging operation for the fully charged secondary battery 1 is skipped at the next charging turn.

In each charging turn, the order of charging operations for the secondary batteries 1 is not limited to that as drawn in the bold arrow in FIG. 29. The charging operations in each charging turn may be performed in other order.

The above-mentioned check in charging operation for each secondary battery 1 is made by judgment of the electric current i at the step A8 in the first embodiment, or the judgment of the voltage difference $\Delta E_s$ at the step G7 in the fourth embodiment, for example. The above-mentioned predetermined charging voltage to be applied to the secondary battery 1 is set to the special charging voltage $E_s$, for example.

The charging equipment 50 halts charging each of secondary batteries 1 between the final charging operation in a charging turn and the first charging operation in the next charging turn. This halting term is relaxation time for the secondary batteries. For this term, the surface of the electrode of each secondary battery 1 is stabilized so that the charging equipment 50 can accurately check the charged condition of the secondary battery 1 whether it is fully charged or not, thereby being improved in reliability.

Complementarily speaking, in the process of charging a secondary battery 1, electrode reaction occurs on an electrode surface touching electrolyte. In this electrode reaction are simultaneously performed movement of reactant to the electrode surface from the electrolyte, movement of electron between the reactant and the electrode, and movement of product into the electrolyte from the electrode surface. It takes quite a long time for these movements so that the secondary battery 1, if the charged state thereof is checked immediately after pausing charge of the secondary battery, may be misread as if it reached the fully charged condition because of ion and the like being electrophoresed around the electrode surface. The relaxation time is advantageous for preventing such misreading. The charging equipment of the fourth embodiment rationally and effectively sets the relaxation time as a partial process in a cycle of charging each of secondary batteries 1.

Each of the charging equipments according to the first to twelfth embodiments may establish the relaxation time for each secondary battery 1 after its charging for a determined time $T_1$ and before check of its charged condition.

FIFTEENTH EMBODIMENT OF CHARGING EQUIPMENT FOR SECONDARY BATTERY

A charging equipment for a secondary battery 1 according to the fifteenth embodiment of the present invention will be explained.

Figure 30:
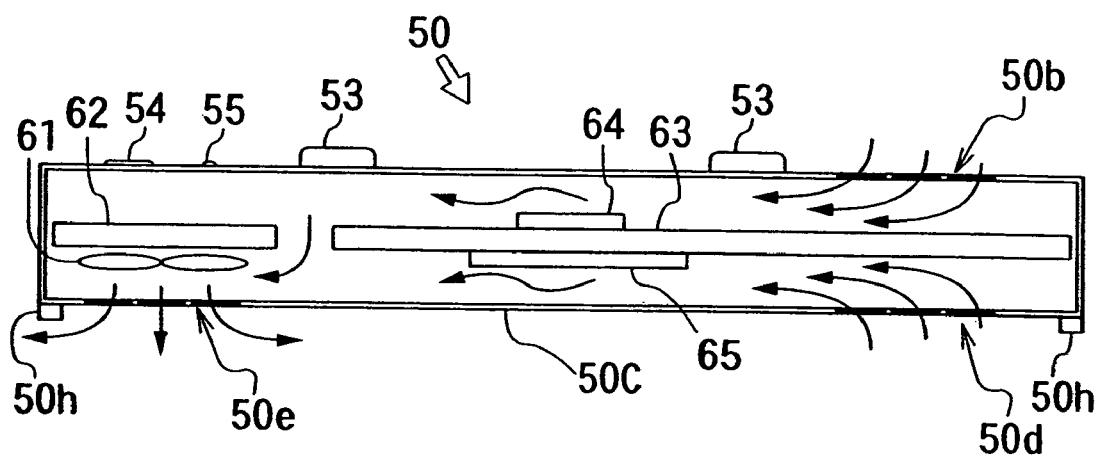
FIG. 30 is a sectional side view of a charging equipment for a plurality of secondary batteries 1 according to a fifteenth embodiment of the present invention.

Referring to FIG. 30, the charging equipment 50 of the fifteenth embodiment comprises a cooling fan 61 serving as cooling means. The equipment 50 of the fifteenth embodiment charges the secondary battery 1 without causing excessive chemical reaction therein by any of the above-mentioned methods employed by the charging equipments according to the first to fourteenth embodiments, thereby preventing the secondary battery 1 from generating heat by itself. However, in the charging equipment 50, electronic components, such as resistors, for controlling charge are exothermic. The cooling fan 61 is provided for cooling the exothermic components 64 and 65 such as resistors and the like.

In FIG. 30, a reference numeral 50C designates a casing of the charging equipment 50, a reference numeral 50b designates an air intake for taking in the open air made in a top surface of the casing 50C (referring to FIG. 29) adjacent to one side, a reference numeral 50d designates an air intake for taking in the open air made on a bottom surface of the casing 50C adjacent to the side, a reference numeral 50e designates an air outlet made on another bottom surface of the casing 50C adjacent to the other side, and a reference numeral 50h designates each of feet for supporting the casing 50C. Reference numerals 62 and 63 designate substrates, and reference numerals 64 and 65 designate exothermic components such as resistors.

The charging equipment 50 drives the cooling fan 61 so as to inhale the open air into the casing 50C through both the air intakes 50b and 50d adjacent to one side. The inhaled air is drifted along surfaces of the exothermic components 64 and 65, thereby cooling the exothermic components 64 and 65. The cooling fan 61 drifts the inhaled air drift toward the other side of the casing 50C, and exhausts it through the air outlet 50e.

The charging equipment 50 having the above-mentioned structure prevents the exothermic components 64 and 65 from generating heat, which may be transferred to the secondary battery 1 so as to promote excessive chemical reaction (oxidation-reduction reaction) therein. A user is prevented from such illusion that the secondary battery 1 runs a temperature. Consequently, the charging equipment charges the secondary battery 1 appropriately without damaging its internal structure till the fully charged condition of the secondary battery 1, thereby remarkably increasing effective battery cycles of the secondary battery 1.

SIXTEENTH EMBODIMENT OF CHARGING EQUIPMENT FOR SECONDARY BATTERY

A charging equipment for a secondary battery 1 according to the sixteenth embodiment of the present invention will be explained.

The charging equipment 50 of the sixteenth embodiment comprises a take-off means for taking off the secondary battery 1 set on the charging equipment 50 by one-touch operation. Referring to FIG. 29 and FIG. 30, the take-off means of the charging equipment 50 of the sixteenth embodiment comprises a take-off button 53, a boost member 57 for pushing up the secondary battery 1 set on the seat 50a of the charging equipment 50, a shaft 58 for rotatably supporting the boost member 57, and a torsion spring 59 attached to the shaft 58 for energizing the boost member 57 opposite to the movement of the boost member 57 when pushed up.

Figure 31:
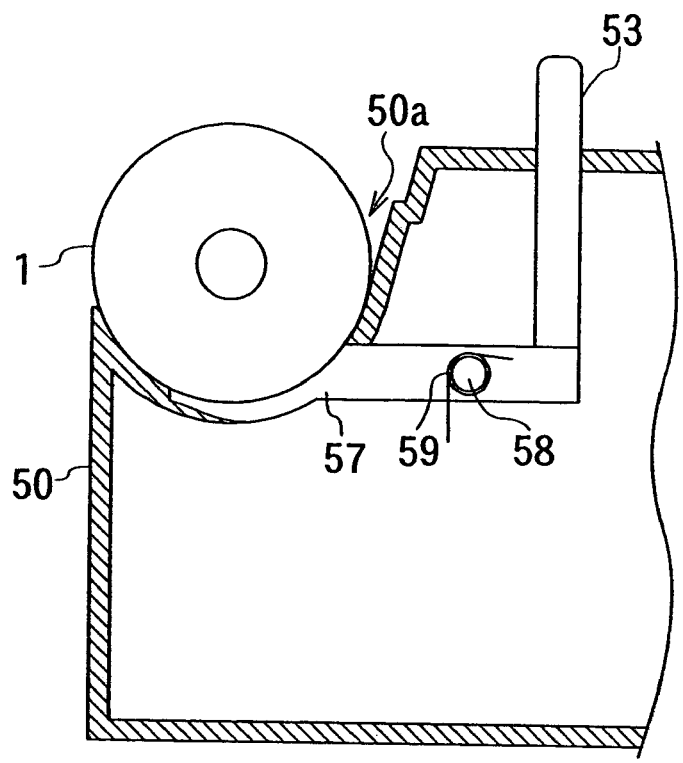
FIG. 31 is a sectional rear view of take-off means of a charging equipment for a plurality of secondary batteries 1 according to a sixteenth embodiment of the present invention.
Figure 31:
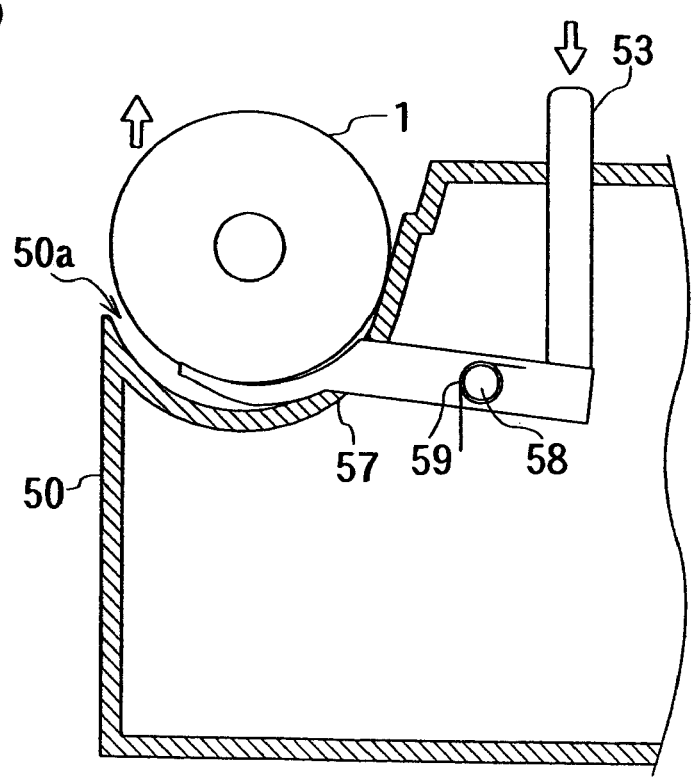

In this structure, as shown in FIG. 31(b), when a user pushes down the take-off button 53 serving as operation member, the bottom of the take-off button 53 pushes down one side of the boost member 57, and the boost member 57 pivots on the shaft 58 and arises at the other side thereof above the seat 50a so as to push up the secondary battery 1, thereby releasing terminals of the secondary battery 1.

When the take-off button 53 is released from a user's finger, the restoring force of the torsion spring 59 serving as energization means returns the rising side of the boost member 57 to the initial position, where this side of the boost member 57 is fit along a curved surface of the seat 50a, whereby the seat 50a is ready to receive a secondary battery 1.

In short, when a user operates the take-off button 53, one side of the boost member 57 moves above the seat 50a so as to release terminals of the secondary battery 1 set on the seat 50a. Due to this convenient structure, a user can take off the secondary battery 1 set on the charging equipment 50 easily by one-touch operation.

SEVENTEENTH EMBODIMENT OF CHARGING EQUIPMENT FOR SECONDARY BATTERY

A charging equipment for a secondary battery 1 according to the seventeenth embodiment of the present invention will be explained.

The charging equipment 50 of the seventeenth embodiment comprises a take-off means other than the take-off means of the charging equipment 50 of the sixteenth embodiment.

Figure 32:
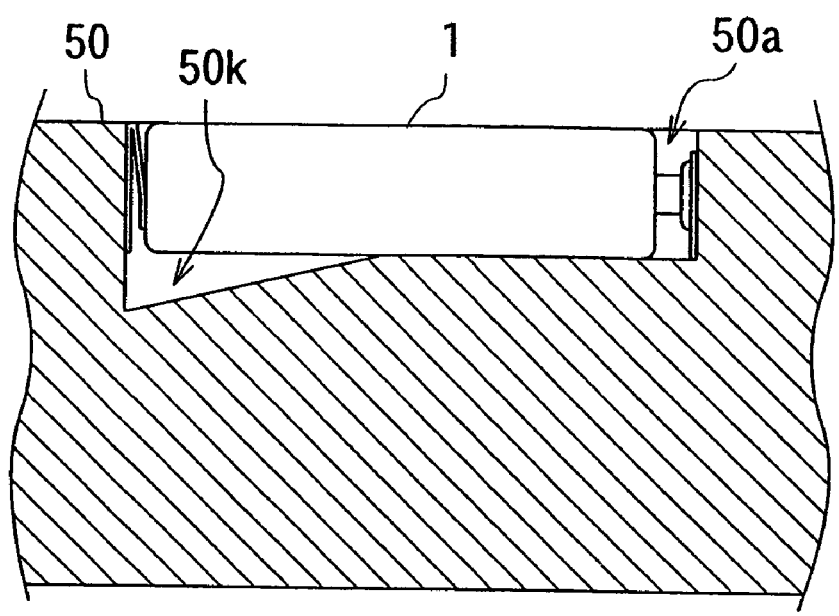
FIG. 32 is a sectional side view of take-off means of a charging equipment for a plurality of secondary batteries 1 according to a seventeenth embodiment of the present invention.
Figure 32:
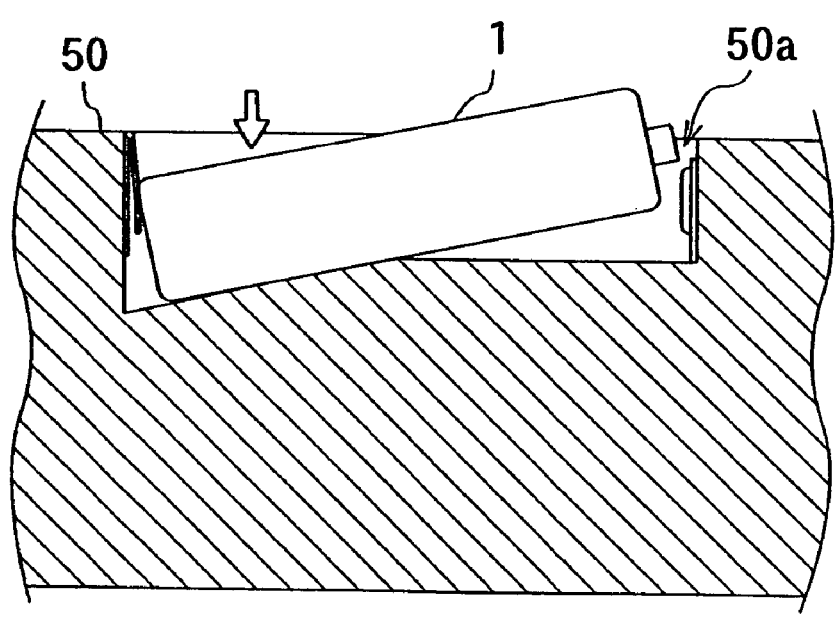

As shown in FIG. 32, in the charging equipment 50 of the seventeenth embodiment, the seat 50a is formed at one side portion of the seat 50a in its longitudinal direction with a downward recess 50k so that the bottom of the secondary battery 1 set on the seat 50a is disposed above the recess 50k.

As shown in FIGS. 32(a) and 32(b), one side of secondary battery 1 is pushed down by a user into the recess 50k, so that the other side of the secondary battery 1 rises above the seat 50a, thereby releasing terminals of the secondary battery 1. In this way, a user can conveniently take off the secondary battery 1 by one-touch operation.

The foregoing explanation of the charging equipments according to the first to seventh embodiments are provided as only preferred embodiments of the present invention. Each of the foresaid charging equipment or method may be modified or changed within the scope of attended claims.

As for the above-mentioned charging equipment shown in FIG. 1 according to the first and other embodiments, the necessary time t to fully charge the secondary battery 1 is calculated. Alternatively, the charging rate of the secondary battery 1 may be calculated basing on the detected electric current i by using the graph shown in FIG. 3 or the like, and charging of the secondary battery 1 may be stopped when the charging rate reaches a predetermined value.

Referring to the flow chart shown in FIG. 5, the step A7 for calculating the charging time t may be omitted because, in the charging flow shown in FIG. 5, judgment of the charged condition of the secondary battery 1 whether its charging is to be finished or not is enabled to depend on comparison of the detected electric current i with the preset standard electric current J for finishing charging.

As for the charging equipment of each embodiment, after the special charging voltage $E_s$ larger than the equilibrium voltage $E_{eq}$ is applied for a determined time T1, applied voltage is switched from the special charging voltage $E_s$ to the equilibrium voltage $E_{eq}$. Alternatively, the special charging voltage $E_s$ may be continuously applied without switching voltage, and the necessary time t to fully charge the secondary battery 1 may be calculated basing on the detected electric current i.

Incidentally, in the charging equipment of each embodiment, the terminals of the secondary battery 1 may be short-circuited before voltage applied to the secondary battery 1 from the special charging voltage $E_s$ to the equilibrium voltage $E_{eq}$, thereby desirably removing electricity from the electrode interface of the secondary battery 1 so as to smoothen switch of voltage from the charging voltage to the equilibrium voltage $E_{eq}$, and stabilize the electric current flowing through the secondary battery 1 immediately after change to the equilibrium voltage $E_{eq}$. Alternatively, the charging equipment may switch voltage without short-circuiting the secondary battery 1.

The invention claimed is:

1. A charging equipment for a secondary battery, comprising:
   a voltage supply means for applying voltage to the secondary battery;
   a current detection means for detecting electric current flowing through the secondary battery; and
   a charge control device for controlling charge of the secondary battery, the charge control device including
   a storage means storing equilibrium voltage and special charging voltage corresponding to the secondary battery to be charged, the equilibrium voltage for establishing equilibrium cell potential of the secondary battery in a fully charged condition, and the special charging voltage for supplying the secondary battery with charging electric current of peak or almost peak value, wherein the special charging voltage is larger than the equilibrium voltage and does not reach a region of voltage causing irreversible chemical reaction in the secondary battery,
   a switching means for switching charging voltage supplied by the voltage supply means between the equilibrium voltage and the special charging voltage, and
   a judging means for judging whether electric current detected by the current detection means during application of the equilibrium voltage is larger than a preset standard electric current for finishing charging or not,
   wherein the charge control device controls charge of a secondary battery by first to fourth steps:
   the first step of applying the special charging voltage to the secondary battery set in the charging equipment for a predetermined time;
   the second step of switching charging voltage applied to the secondary battery from the special charging voltage to the equilibrium voltage;
   the third step of detecting electric current flowing through the secondary battery by the current detection means while applying the equilibrium voltage to the secondary battery for a short time; and
   the fourth step of returning to the first step and repeating the above steps if the judging means judges that the detected electric current is larger than the standard electric current for finishing charging; otherwise, halting the secondary battery.

2. A charging equipment for a secondary battery according to claim 1,
   wherein the storage means of the charge control device previously stores the equilibrium voltages and the special charging voltages for charging various kinds of secondary batteries, and
   wherein data of a kind of secondary battery to be charged is inputted to the charge control device so that the equilibrium voltage and the special charging voltage in correspondence to the kind of secondary battery are selected from a table of the storage means so as to charge the kind of secondary battery basing on the selected equilibrium voltage and special charging voltage.

3. A charging equipment for a secondary battery according to claim 1 or 2, further comprising:

a short-circuit means for short-circuiting the secondary battery between its terminals after applying the special charging voltage for the predetermined time and before switching charging voltage to the equilibrium voltage.

4. A charging equipment for a secondary battery according to claim 1, further comprising:
   a cooling means for cooling an exothermic section in the charging equipment.

5. A charging equipment for a secondary battery, comprising:
   a voltage supply means for applying voltage to the secondary battery;
   a current detection means for detecting electric current flowing through the secondary battery;
   a voltage detection means for detecting voltage applied to the secondary battery; and
   a charge control device for controlling charge of the secondary battery, the charge control device including
   a storage means storing n (n is a natural number larger than 1) equilibrium voltages and n special charging voltages for charging n kinds of secondary batteries, each of the equilibrium voltages for establishing equilibrium cell potential of the secondary battery in a fully charged condition, and each of the special charging voltages for supplying the secondary battery with charging electric current of peak or almost peak value, wherein each of the special charging voltages is larger than the corresponding equilibrium voltage and does not reach a region of voltage causing irreversible chemical reaction in the corresponding secondary battery;
   a switching means for switching charging voltage supplied by the voltage supply means;
   a current judging means for judging whether electric current detected by the current detection means during application of charging the equilibrium voltage is larger than a preset standard electric current for finishing charging or not; and
   a voltage judging means for judging whether voltage detected by the voltage detection means during application of charging voltage of the predetermined value is larger than the special charging voltage or not,
   wherein the charge control device controls charge of a secondary battery by first to eighth steps:
   the first step of initializing a counter variable k (k1 ,2, . . . , n) to 1;
   the second step of applying the kth smallest voltage of the n special charging voltages to the secondary battery set in the charging equipment for a predetermined time;
   the third step to jumping to the sixth step if k is equal to n;
   the fourth step of detecting voltage applied to the secondary battery by the voltage detection means while applying the kth smallest special charging voltage to the secondary battery for the predetermined time;
   the fifth step of incrementing the rank of k by 1 and returning to the second step if the voltage judging means judges that the detected voltage is larger than the kth smallest special charging voltage; otherwise, passing to the sixth step;
   the sixth step of switching charging voltage applied to the secondary battery to the kth smallest voltage of the n equilibrium voltages;
   the seventh step of detecting electric current flowing through the secondary battery by the current detection means while applying the kth smallest equilibrium voltage to the secondary battery for a short time; and
   the eighth step of returning to the second step and repeating the above steps if the current judging means judges that the detected electric current is larger than the standard electric current for finishing charging; otherwise, halting charge of the secondary battery.

6. A charging equipment for a secondary battery according to claim 5, further comprising:
   a short-circuit for short-circuiting the secondary battery between its terminals after applying the special charging voltage for the predetermined time and before switching charging voltage to the equilibrium voltage.

7. A charging equipment for a secondary battery according to claim 5 or 6, further comprising:
   a cooling means for cooling an exothermic section in the charging equipment.

8. A charging equipment for a secondary battery, comprising:
   a voltage supply means for applying voltage to the secondary battery;
   a current detection means for detecting electric current flowing through the secondary battery;
   a voltage detection means for detecting voltage applied to the secondary battery; and
   a charge control device for controlling charge of the secondary battery, the charge control device including
   a storage means storing n (n is a natural number larger than 1) equilibrium voltages and n special charging voltages for charging n kinds of secondary batteries, each of the equilibrium voltages for establishing equilibrium cell potential of the secondary battery in a fully charged condition, and each of the special charging voltages for supplying the secondary battery with charging electric current of peak or almost peak value, wherein each of the special charging voltages is larger than the corresponding equilibrium voltage and does not reach a region of voltage causing irreversible chemical reaction in the corresponding secondary battery;
   a switching means for switching charging voltage supplied by the voltage supply means;
   a current judging means for judging whether electric current detected by the current detection means during application of the equilibrium voltage is larger than a preset standard electric current for finishing charging or not, and
   a voltage difference judging means for judging whether a difference of voltage detected by the voltage detection means during application of the special charging voltage between a present value and a past value is within a preset range or not,
   wherein the charge control device controls charge of a secondary battery by first to eighth steps:
   the first step of initializing a counter variable k (k=1,2, . . . , n) to 1;
   the second step of applying the kth smallest voltage of the n special charging voltages to the secondary battery set in the charging equipment for a predetermined time;
   the third step of jumping to the sixth step if k is equal to n;
   the fourth step of detecting voltage applied to the secondary battery by the voltage detection means while applying the kth smallest special charging voltage to the secondary battery for the predetermined time;
   the fifth step of passing to the sixth step if the voltage detection is the first time or the voltage difference judging means judges that the detected voltage difference is within the range; otherwise, incrementing the rank of k by 1 and returning to the second step;

the sixth step of switching charging voltage applied to the secondary battery from the kth smallest special charging voltage to the kth smallest voltage of the n equilibrium voltages;

the seventh step of detecting electric current flowing through the secondary battery by the current detection means while applying the kth equilibrium voltage to the secondary battery for a short time; and the eighth step of returning to the second step and repeating the above steps if the current judging means judges that the detected electric current is larger than the standard electric current for finishing charging; otherwise, halting charge of the secondary battery.

9. A charging equipment for a secondary battery according to claim 8, further comprising:
a short-circuit for short-circuiting the secondary battery between its terminals after applying the special charging voltage for the predetermined time and before switching charging voltage to the equilibrium voltage.

10. A charging equipment for a secondary battery according to claim 8 or 9, further comprising:
a cooling means for cooling an exothermic section in the charging equipment.

11. A charging equipment for a secondary battery, comprising:
a voltage supply means for applying voltage to the secondary battery;
a voltage detection means for detecting open-circuit voltage of the secondary battery; and
a charge control device for controlling charge of the secondary battery, the charge control device including
a storage means storing special charging voltage for supplying the secondary battery with charging electric current of peak or almost peak value, wherein the special charging voltage is larger than voltage for establishing equilibrium cell potential of the secondary battery in a fully charged condition and does not reach a region of voltage causing irreversible chemical reaction in the secondary battery, and
a voltage difference judging means for judging whether a voltage difference between the charging voltage and the open-circuit voltage of the secondary battery is larger than a preset standard value or not,
wherein the charge control device controls charge of a secondary battery by first to third steps:
the first step of applying the special charging voltage to the secondary battery set in the charging equipment for a predetermined time, and then shutting off the charging voltage from the secondary battery;
the second step of detecting the open-circuit voltage of the secondary battery by the voltage detection means, and computing the voltage difference between the charging voltage of the special charging voltage and the open-circuit voltage of the secondary battery; and
the third step of returning to the first step and repeating the above steps if the voltage difference judging means judges that the computed voltage difference is larger than the standard value; otherwise, halting charge of the secondary battery.

12. A charging equipment for a secondary battery according to claim 11, further comprising:
an informational means for giving information of the time required to charge the secondary battery, the charging rate of the secondary battery, or a charged condition of the secondary battery for deciding whether charge of the secondary battery is finished or not.

13. A charging equipment for a secondary battery according to claim 11 or 12, further comprising:
a cooling means for cooling an exothermic section in the charging equipment.

14. A charging equipment for a secondary battery, comprising:
a voltage supply means for applying voltage to the secondary battery;
a voltage detection means for detecting open-circuit voltage of the secondary battery; and
a charge control device for controlling charge of the secondary battery, the charge control device including
a storage means storing equilibrium voltage and special charging voltage corresponding to the secondary battery to be charged, the equilibrium voltage for establishing equilibrium cell potential of the secondary battery in a fully charged condition, and the special charging voltage supplying the secondary battery with charging electric current of peak or almost peak value, wherein the special charging voltage is larger than the equilibrium voltage and does not reach a region of voltage causing irreversible chemical reaction in the secondary battery,
a judging means for judging whether the open-circuit voltage of the secondary battery detected by the voltage detection means is larger than a standard voltage as the equilibrium voltage or not,
wherein the charge control device controls charge of a secondary battery by first to third steps:
the first step of applying the special charging voltage to the secondary battery set in the charging equipment for a predetermined time, and then shutting off the charging voltage from the secondary battery;
the second step of detecting the open-circuit voltage of the secondary battery by the voltage detection means, and computing the voltage difference between the special charging voltage and the open-circuit voltage of the secondary battery; and
the third step of returning to the first step and repeating the above steps if the judging means judges that the detected open-circuit voltage is smaller than the equilibrium voltage as the standard voltage; otherwise, halting charge of the secondary battery.

15. A charging equipment for a secondary battery according to claim 14, further comprising:
an informational means for giving information of the time required to charge the secondary battery, the charging rate of the secondary battery, or a charged condition of the secondary battery for deciding whether charge of the secondary battery is finished or not.

16. A charging equipment for a secondary battery according to claim 14 or 15, further comprising:
a cooling means for cooling an exothermic section in the charging equipment.

17. A charging equipment for a secondary battery comprising:
a voltage supply means for applying predetermined voltage to the secondary battery;
a current detection means for detecting a value of electric current flowing through the secondary battery during application of the predetermined voltage to the secondary battery; and
a charge time predicting means for estimating a time required to fully charge the secondary battery basing on the detected value of electric current, wherein the voltage supply means applies charging voltage, which is larger than the predetermined voltage, to the secondary battery for a predetermined time, and then applied voltage is switched to the predetermined voltage, and the current detection means detects a value of electric current flowing through the secondary battery during application of the special charging voltage.

18. A charging equipment for a secondary battery according to claim 17, wherein the time required to fully charge the secondary battery is a time for the electric current detected by the current detection means to reach standard electric current for finishing charging, whereby charge of the secondary battery is halted when the detected value of electric current is not larger than the standard electric current for finishing charging.

19. A charging equipment for a secondary battery according to claim 17, wherein the charging equipment halts charge of the secondary battery after the lapse of the time required to fully charge the secondary battery.

20. A charging equipment for a secondary battery according to claim 17, wherein the predetermined voltage is equilibrium voltage for establishing equilibrium cell potential of the secondary battery in a fully charged condition.

21. A charging equipment for a secondary battery according to claim 17, further comprising:
an informational means for giving information of the time required to fully charge the secondary battery, the charging rate of the secondary battery, or a charged condition of the secondary battery for deciding whether charge of the secondary battery is finished or not.

22. A charging equipment for a secondary battery according to claim 17, further comprising:
a cooling means for cooling an exothermic section in the charging equipment.

23. A charging equipment for a secondary battery comprising:
a voltage supply means for applying special charging voltage to the secondary battery;
a current detection means for detecting electric current flowing through the secondary battery during application of the special charging voltage to the secondary battery; and
a charging rate computing means for computing a charging rate of the secondary battery at the moment when the current detection means detects the electric current,
wherein the voltage supply means applies charging voltage, which is larger than the special charging voltage, to the secondary battery for a predetermined time, and then the charging voltage is switched to the special charging voltage, and the current detection means detects electric current flowing through the secondary battery during application of the special charging voltage.

24. A charging equipment for a secondary battery according to claim 23, further comprising:
an informational means for giving information of the time required to fully charge the secondary battery, the charging rate of the secondary battery, or a charged condition of the secondary battery for deciding whether charge of the secondary battery is finished or not.

25. A charging equipment for a secondary battery according to claim 23, further comprising:
a cooling means for cooling an exothermic section in the charging equipment.

26. A charging equipment for a secondary battery, comprising:
a voltage supply means for applying voltage to the secondary battery;
a current detection means for detecting electric current flowing through the secondary battery; and
a charge control device for controlling charge of the secondary battery, the charge control device including
a storage means storing equilibrium voltage and special charging voltage corresponding to the secondary battery to be charged, the equilibrium voltage for establishing equilibrium cell potential of the secondary battery in a fully charged condition, and the special charging voltage for supplying the secondary battery with charging electric current of peak or almost peak value, wherein the special charging voltage is larger than the equilibrium voltage and does not reach a region of voltage causing irreversible chemical reaction in the secondary battery,
a switching means for switching charging voltage supplied by the voltage supply means between the equilibrium voltage and the special charging voltage, and
a charge time predicting means for estimating a time required to fully charge the secondary battery basing on the detected electric current,
wherein the charge control device controls charge of a secondary battery by first to sixth steps:
the first step of applying the special charging voltage to the secondary battery set in the charging equipment for a predetermined time;
the second step of switching charging voltage applied to the secondary battery from the special charging voltage to the equilibrium voltage;
the third step of detecting electric current flowing through the secondary battery by the current detection means while applying charging the equilibrium voltage to the secondary battery for a short time;
the fourth step of predicting a time required to fully charge the secondary battery by the charge time predicting means basing on the detected electric current;
the fifth step of switching charging voltage applied to the secondary battery from the equilibrium voltage to the special charging voltage; and
the sixth step of halting charge of the secondary battery after the lapse of the time required to fully charge the secondary.

27. A charging equipment for a secondary battery according to claim 26, further comprising:
a short-circuit means for short-circuiting the secondary battery between its terminals after applying the special charging voltage for the predetermined time and before switching charging voltage to the equilibrium voltage.

28. A charging equipment for a secondary battery according to claim 26 or 27, further comprising:
an informational means for giving information of the time required to fully charge the secondary battery, the charging rate of the secondary battery, a charged condition of the secondary battery for deciding whether charge of the secondary battery is finished or not.

29. A charging equipment for a secondary battery according to claim 26, further comprising:
a cooling means for cooling an exothermic section in the charging equipment.

30. A charging equipment for a secondary battery, comprising:
a voltage supply means for applying voltage to the secondary battery;
a current detection means for detecting electric current flowing through the secondary battery; and a charge control device for controlling charge of the secondary battery, the charge control device including a storage means storing equilibrium voltage and special charging voltage corresponding to the secondary battery to be charged, the equilibrium voltage for establishing equilibrium cell potential of the secondary battery in a fully charged condition, and the special charging voltage for supplying the secondary battery with charging electric current of peak or almost peak value, wherein the special charging voltage is larger than the equilibrium voltage and does not reach a region of voltage causing irreversible chemical reaction in the secondary battery, a switching means for switching charging voltage supplied by the voltage supply means between the equilibrium voltage and the special charging voltage, a charging rate computing means for computing a charging rate of the secondary battery at the moment when the current detection means detects the electric current, and a judging means for judging whether the charging rate computed by the charging rate computing means is larger than a preset standard value or not, wherein the charge control device controls charge of a secondary battery by first to fifth steps:

the first step of applying the special charging voltage to the secondary battery set in the charging equipment for a predetermined time;

the second step of switching charging voltage applied to the secondary battery from the special charging voltage to the equilibrium voltage;

the third step of detecting electric current flowing through the secondary battery by the current detection means while applying the equilibrium voltage to the secondary battery for a short time;

the fourth step of computing the charging rate of the secondary battery by the charging rate computing means at the moment when the electric current is detected; and the fifth step of returning to the first step and repeating the above steps if the judging means judges that the computed value of charging rate is not larger than the standard value; otherwise, halting charge of the secondary battery.

31. A charging equipment for a secondary battery according to claim 30, further comprising:

a short-circuit means for short-circuiting the secondary battery between its terminals after applying the special charging voltage for the predetermined time and before switching charging voltage to the equilibrium voltage.

32. A charging equipment for a secondary battery according to claim 30 or 31, further comprising:

an informational means for giving information of the time required to fully charge the secondary battery, the charging rate of the secondary battery, or a charged condition of the secondary battery for deciding whether charge of the secondary battery is finished or not.

33. A charging equipment for a secondary battery according to claim 30, further comprising:

a cooling means for cooling an exothermic section in the charging equipment.

34. A charging equipment for a secondary battery comprising:

a circuit connecting a secondary battery and a capacitor to a power source in parallel, a switching means for making/breaking a closed loop circuit connecting the secondary battery to the capacitor, a checking power source for which applying special charging voltage to the secondary battery;

a current detection means for detecting electric current flowing to the secondary battery; and a current judging means for judging whether electric current detected by the current detection means during application of the special charging voltage is larger than preset standard electric current for finishing charging, wherein, while the closed loop circuit is broken, the power source applies voltage to the capacitor for a determined time so as to store electricity in the capacitor, and then the closed loop circuit is made so as to transmit the electricity stored in the capacitor to the secondary battery, thereby charging the secondary battery, wherein, while the closed loop circuit is broken, the checking power source applies the secondary battery with the special charging voltage, and electric current flowing to the secondary battery from the checking power source is detected and compared with the standard electric current for finishing charging, and wherein, if the detected electric current is larger than the standard electric current for finishing charging, said storage of electricity in the capacitor and transmission of electricity to the secondary battery are repeated; otherwise, charge of the secondary battery is halted.

35. A charging equipment for a secondary battery according to claim 34, wherein the special charging voltage is equilibrium voltage equaling electromotive force of the secondary battery in a fully charged condition.

36. A charging equipment for a secondary battery according claim 34 or 35, further comprising:

a cooling means for cooling an exothermic section in the charging equipment.

37. A charging equipment for a plurality of secondary batteries comprising:

a charging voltage control means for applying charging voltage to a secondary battery;

a control means for monitoring a charged condition of the secondary battery;

a battery switching means for switching a secondary battery selected among the plurality of secondary batteries to be charged basing on a signal for finishing charging issued from the control means;

a checking voltage control means for applying equilibrium voltage to a secondary battery while monitoring a charged condition of the secondary battery, the equilibrium voltage for establishing equilibrium cell potential of the secondary battery in a fully charged condition;

a voltage switching means for switching voltage between the charging voltage and the equilibrium voltage, that is, checking voltage; and a current detection means for detecting electric current flowing through the secondary battery to which the check voltage is applied, wherein the control means monitors a charged condition of the secondary battery basing on the signal from the current detection means.

38. A charging equipment for a plurality of secondary batteries according to claim 37, wherein the charging voltage is a special charging voltage for supplying the secondary battery with charging electric current of peak or almost peak value, and wherein the special charging voltage is larger than equilibrium voltage for establishing equilibrium cell potential of the secondary battery in a fully charged condition and does not reach a region of voltage causing irreversible chemical reaction in the secondary battery.

39. A charging equipment for a secondary battery according to claim 37, further comprising:
an informational means for giving information of a time required to charge each secondary battery, a charging rate of each secondary battery, a charged condition of each secondary battery whether charge of the secondary battery is finished or not.

40. A charging equipment for a secondary battery claim 37, further comprising:
a cooling means for cooling an exothermic section in the charging equipment.

41. A charging equipment for a secondary battery, comprising:
a voltage supply means for applying voltage to the secondary battery;
a voltage detection means for detecting voltage of the secondary battery; and
a judging means for judging whether voltage of the charged secondary battery detected by the voltage detection means is larger than recharging voltage, which is smaller than equilibrium voltage for establishing equilibrium cell potential of the secondary battery in a fully charged condition, or not,
wherein, if the judging means judges that the detected voltage of the charged secondary battery is not larger than the recharging voltage, the secondary battery is recharged by supplying charging voltage from the voltage supply means.

42. A charging method for a secondary battery, comprising the steps of:
(1) previously storing equilibrium voltage and special charging voltage corresponding to the secondary battery to be charged, the equilibrium voltage for establishing equilibrium cell potential of the secondary battery in a fully charged condition, and the special charging voltage for supplying the secondary battery with charging electric current of peak or almost peak value, wherein the special charging voltage is larger than the equilibrium voltage and does not reach a region of voltage causing irreversible chemical reaction in the secondary battery;
(2) applying the special charging voltage to the secondary battery for a determined time;
(3) switching charging voltage applied to the secondary battery from the special charging voltage to the equilibrium voltage;
(4) detecting electric current flowing through the secondary battery while applying the equilibrium voltage to the secondary battery for a short time;
(5) comparing the detected electric current with standard electric current for finishing charging; and
(6) returning to the step (2) and iterating the above steps when the detected electric current is larger than standard electric current; otherwise halting charge of the secondary battery.

43. A charging method for a secondary battery, comprising:
previously storing n (n is a natural number more than 1) equilibrium voltages and n special charging voltages for charging n different kinds of secondary batteries, each of the equilibrium voltages for establishing equilibrium cell potential of the secondary battery in a fully charged condition, and each of the special charging voltages for supplying the secondary battery with charging electric current of peak or almost peak value, wherein each of the special charging voltages is larger than the corresponding equilibrium voltage and does not reach a region of voltage causing irreversible chemical reaction in the corresponding secondary battery; and charging a secondary battery by first to eighth steps,
the first step of initializing a counter variable k (k=1,2, . . . , n) to 1;
the second step of applying the kth smallest special charging voltage of then special charging voltages to the secondary battery for a predetermined time;
the third step of jumping to the sixth step if k is equal to n;
the fourth step of detecting voltage applied to the secondary battery while applying the kth smallest special charging voltage to the secondary battery for the predetermined time;
the fifth step of incrementing the rank of k by 1 and returning to the second step if the detected voltage is larger than the kth smallest special charging voltage; otherwise passing to the sixth step;
the sixth step of switching charging voltage applied to the secondary battery from the kth smallest special charging voltage to the kth smallest equilibrium voltage of the n equilibrium voltages; and
the seventh step of detecting electric current flowing through the secondary battery while applying the kth smallest equilibrium voltage to the secondary battery for a short time; and
the eighth step of returning to the second step and iterating the above steps if the detected electric current is larger than standard electric current for finishing charging; otherwise, halting charge of the secondary battery.

44. A charging method for a secondary battery, comprising:
previously storing n (n is a natural number more than 1) equilibrium voltages and n special charging voltages for charging n different kinds of secondary batteries, each of the equilibrium voltages for establishing equilibrium cell potential of the secondary battery in a fully charged condition, and each of the special charging voltages for supplying the secondary battery with charging electric current of peak or almost peak value, wherein each of the special charging voltages is larger than the corresponding equilibrium voltage and does not reach a region of voltage causing irreversible chemical reaction in the corresponding secondary battery; and charging a secondary battery by first to eighth steps,
the first step of initializing a counter variable k (k=1,2, . . . , n) to 1;
the second step of applying the kth smallest special charging voltage of then special charging voltages to the secondary battery for a predetermined time;
the third step of jumping to the sixth step if k is equal to n;
the fourth step of detecting voltage applied to the secondary battery while applying the kth smallest special charging voltage to the secondary battery for the predetermined time;
the fifth step of passing to the sixth step if the voltage detection is the first time or a voltage difference between present and past voltages detected during application of the kth smallest special charging voltage is within a preset range; otherwise, incrementing the rank of k by 1 and returning to the second step;

the sixth step of switching charging voltage applied to the secondary battery from the kth smallest special charging voltage to the kth smallest equilibrium voltage of the n equilibrium voltages; and the seventh step of detecting electric current flowing through the secondary battery while applying charging voltage of the kth smallest equilibrium voltage to the secondary battery for a short time; and the eighth step of returning to the second step and iterating the above steps if the detected electric current is larger than standard electric current for finishing charging; otherwise, halting charge of the secondary battery.

* * * * *